(12) United States Patent
Greenwood

(10) Patent No.: US 11,501,659 B2
(45) Date of Patent: Nov. 15, 2022

(54) MAGNETIC BUILDING SET AND METHOD FOR TEACHING NUMERACY AND SPELLING

(71) Applicant: Kontu, Inc., Wilmington, DE (US)

(72) Inventor: Patrick Greenwood, Boulder, CO (US)

(73) Assignee: KONTU, INC., Wilmington, DE (US)

( * ) Notice: Subject to any disclaimer, the term of this patent is extended or adjusted under 35 U.S.C. 154(b) by 841 days.

(21) Appl. No.: 16/119,997

(22) Filed: Aug. 31, 2018

(65) Prior Publication Data

US 2019/0073922 A1 Mar. 7, 2019

Related U.S. Application Data

(60) Provisional application No. 62/554,289, filed on Sep. 5, 2015.

(51) Int. Cl.
| | | |
|---|---|---|
| G09B 19/02 | (2006.01) | |
| A63H 33/04 | (2006.01) | |
| G09B 1/08 | (2006.01) | |

(52) U.S. Cl.
CPC ......... *G09B 19/02* (2013.01); *A63H 33/046* (2013.01); *G09B 1/08* (2013.01)

(58) Field of Classification Search
CPC ......... G09B 19/02; G09B 1/08; A63H 33/046
(Continued)

(56) References Cited

U.S. PATENT DOCUMENTS

| | | |
|---|---|---|
| 2,819,904 A | 1/1958 | Nelson et al. |
| 3,254,440 A | 6/1966 | Duggar |

(Continued)

FOREIGN PATENT DOCUMENTS

| | | |
|---|---|---|
| CN | 3595912 | 1/2007 |
| CN | 101797431 | 8/2010 |

(Continued)

OTHER PUBLICATIONS

"Learning Resources Connecting Ten-Frame Trays, 165 Pieces," Learning Resources, https://www.amazon.com/Learning-Resources-Connecting-Ten-Frame-Pieces/dp/B01N9KC0DL, Dec. 23, 2016 (Year: 2016).*

(Continued)

*Primary Examiner* — Kurt Fernstrom
(74) *Attorney, Agent, or Firm* — Trenner Law Firm, LLC; Mark D. Trenner

(57) ABSTRACT

A magnetic building set and method for teaching numeracy and spelling is disclosed. An example magnetic building set includes a plurality of trays that receive a plurality of unit markers implemented in various manipulative exercises and games that teach numeracy, elementary arithmetic, story arithmetic problems, geometric shapes, and spelling. The magnetic building set enables a user to build a plurality of geometric shapes, structures, and other constructions. Trays can be provided to represent a plurality of numeric quantities. A tray and marker assembly representing a specific numeric quantity can be manipulated as a whole, while the unit markers contained therein are visible to the student and can be viewed, manipulated, arranged and counted individually. Students are instructed to manipulate the trays and markers in various exercises in order to learn counting, number composition and decomposition, subitizing of quantities, arithmetic operations, place value, story arithmetic problems, geometric shapes, and spelling.

17 Claims, 87 Drawing Sheets

(58) Field of Classification Search
USPC .......................................................... 434/168
See application file for complete search history.

(56) References Cited

U.S. PATENT DOCUMENTS

| | | | |
|---|---|---|---|
| 3,694,932 A | 10/1972 | McGrath | |
| 3,877,170 A | 4/1975 | Bakker | |
| 4,021,042 A | 5/1977 | Sweeton | |
| 4,462,596 A | 7/1984 | Yamamoto | |
| 4,487,585 A | 12/1984 | Goldwasser | |
| D284,207 S | 6/1986 | Kassai | |
| D284,393 S | 6/1986 | Kassai | |
| 4,808,111 A | 2/1989 | Pratt | |
| 4,822,051 A * | 4/1989 | Nowak | A63F 9/10 273/157 R |
| 5,149,102 A | 9/1992 | McGowan et al. | |
| 5,366,226 A | 11/1994 | McGowan et al. | |
| 5,409,234 A | 4/1995 | Bechter | |
| D370,034 S | 5/1996 | Kipfer | |
| D371,583 S | 7/1996 | Knudsen | |
| 5,662,326 A | 9/1997 | Gebran | |
| 5,746,638 A | 5/1998 | Shiraishi | |
| 5,848,788 A | 12/1998 | Hess | |
| 5,949,050 A | 9/1999 | Fosbenner et al. | |
| D420,062 S | 2/2000 | Glickman | |
| D426,588 S | 6/2000 | Glickman | |
| 6,086,444 A | 7/2000 | Glickman | |
| D706,363 S | 6/2014 | Norman | |
| 8,850,683 B2 | 10/2014 | Haughey et al. | |
| D747,420 S | 1/2016 | Zhang | |
| 9,286,032 B2 | 2/2016 | Haughey et al. | |
| D778,368 S | 2/2017 | Edevoid | |
| D786,364 S | 5/2017 | Richards | |
| 9,662,592 B2 | 5/2017 | Haughey et al. | |
| D833,540 S | 11/2018 | Zhang | |
| D849,850 S | 5/2019 | Holowka | |
| 2004/0067120 A1* | 4/2004 | Speer | F16B 1/0071 411/14 |
| 2007/0085269 A1 | 4/2007 | Martin, Jr. et al. | |
| 2010/0242250 A1 | 9/2010 | Haughey et al. | |
| 2014/0213139 A1 | 7/2014 | Ferguson | |
| 2014/0377736 A1* | 12/2014 | Essen | B43L 1/008 434/408 |
| 2016/0310864 A1 | 10/2016 | Cheung | |

FOREIGN PATENT DOCUMENTS

| | | | |
|---|---|---|---|
| CN | 303182186 | 4/2015 | |
| CN | 109568982 | 4/2019 | |
| DE | 3643005 | 8/1987 | |
| DE | 20101964 | 6/2001 | |
| DE | 202013104293 | 10/2013 | |
| EM | 000820451-0001 | 3/2008 | |
| FR | 065877-001 | 1/2010 | |
| GB | 2396569 | 6/2004 | |
| GB | 2527106 A * | 12/2015 | ............... A63F 3/02 |
| KR | 20130133355 | 12/2013 | |
| KR | 20160080661 | 7/2016 | |
| WO | 9322018 | 11/1993 | |
| WO | 2010111189 | 9/2010 | |

OTHER PUBLICATIONS

"Math Stories," Mathematics Enhanced Scope and Sequence, Viriginia Department of Education, https://web.archive.org/web/20161226210744/https://www.doe.virginia.gov/testing/solsearch/sol/math/K/mess_k-6.pdf, Dec. 26, 2016 (Year: 2016).*
Photographs of Smart Game, Little Red Riding Hood, known to the inventor to be publicly available at least as early as Jul. 2018, 4 pgs.
Product page from website at https://kodokids.com/links, copyright 2019, 2 pgs.
Written Opinion of the International Searching Authority for PCT/US18/49235 and Patent Cooperation Treaty International Search Report for PCT/US18/49235, dated Nov. 21, 2018, 6 pages.
Extended European Search Report, including the supplementary European search report and the European search opinion in corresponding co-owned EPO Application No. 18854187.4, 22 pages.
Espace English Machine Translation of KR20160080661, 15 pages.
Unofficial translation from Chinese—First Office Action in corresponding co-owned Chinese Application No. 201880068912.9, 7 pages.

* cited by examiner

MAGNETIC BUILDING SET AND METHOD FOR TEACHING NUMERACY AND SPELLING

CROSS REFERENCE TO RELATED APPLICATIONS

This application claims the priority benefit of U.S. Provisional Patent Application No. 62/554,289 filed Sep. 5, 2017 for "Magnetic Building Set and Method for Teaching Numeracy," hereby incorporated by reference in its entirety as though fully set forth herein.

BACKGROUND

The informal understanding children gain through experimentation, observation, and comparison in play lays the foundation for higher-order thinking and later learning of formal STEM concepts

BRIEF DESCRIPTION OF THE DRAWINGS

FIG. 1 shows trays and 10-frame of an example magnetic building set.

FIG. 164 shows a tray and unit markers of an example magnetic building set.

DETAILED DESCRIPTION

Figure 1:
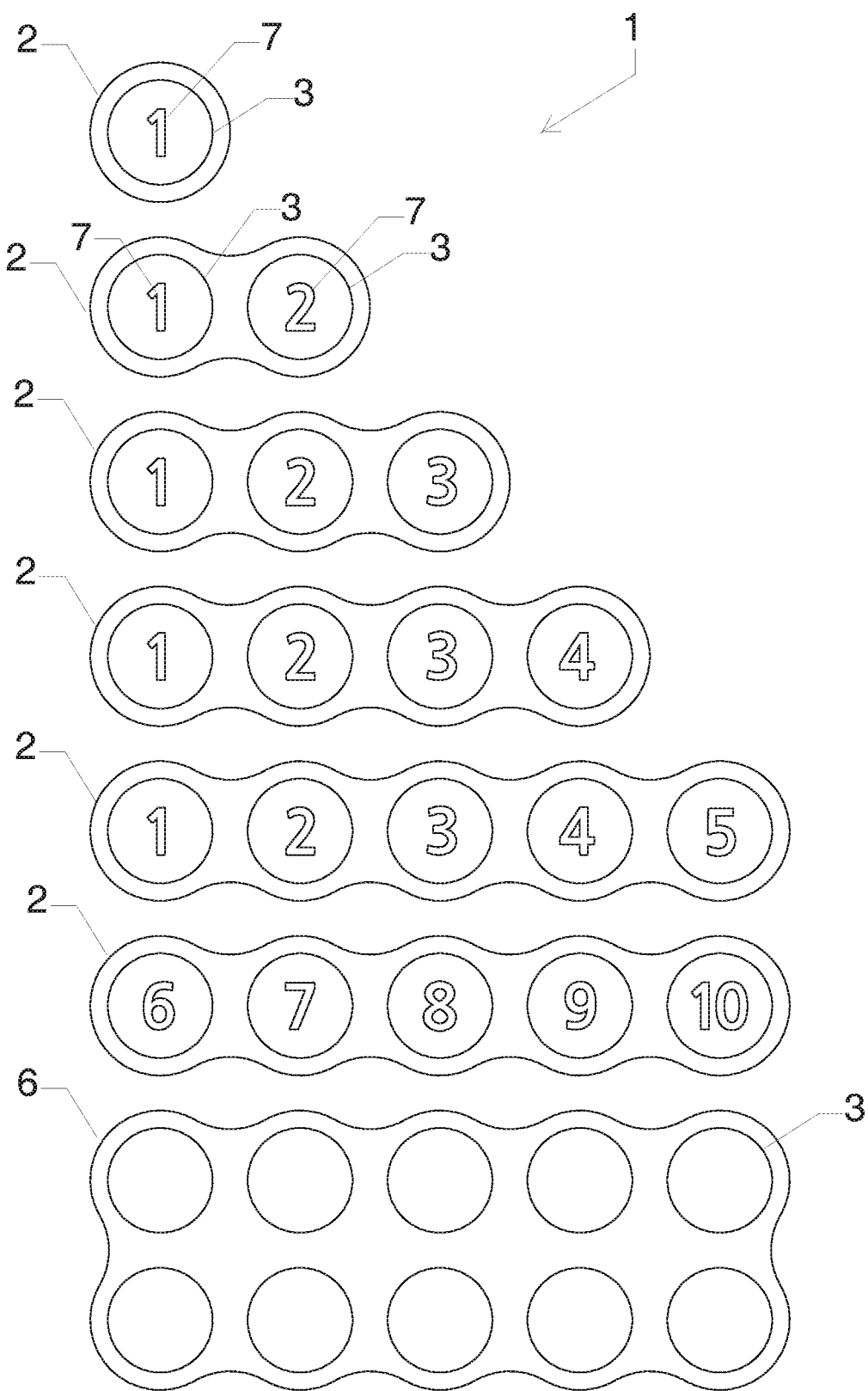
FIGS. 1-164 show example magnetic building sets and illustrate example methods for teaching numeracy, geometric shapes, arithmetic, spelling, and basic structural design and assembly techniques.
Figure 2:
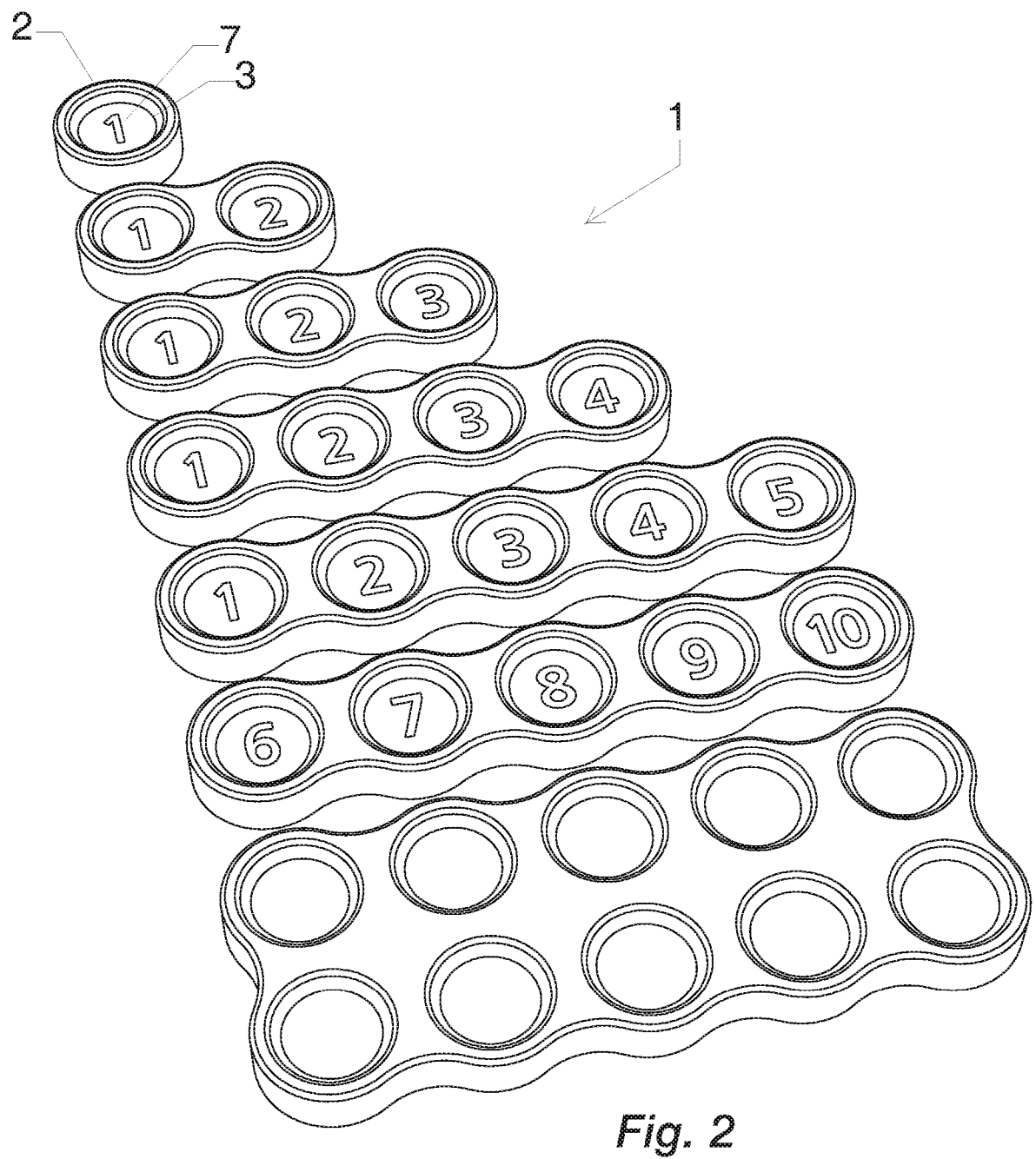
FIG. 2 shows trays and 10-frame of an example magnetic building set.
Figure 3:
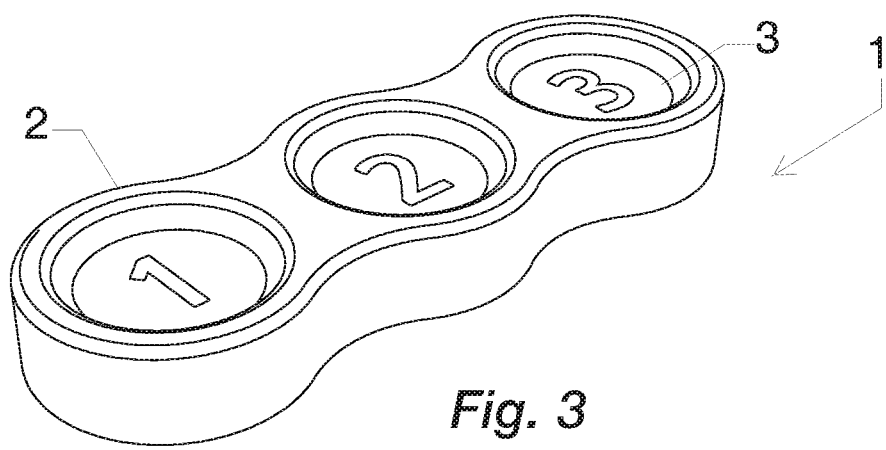
FIG. 3 shows a tray of an example magnetic building set.
Figure 4:
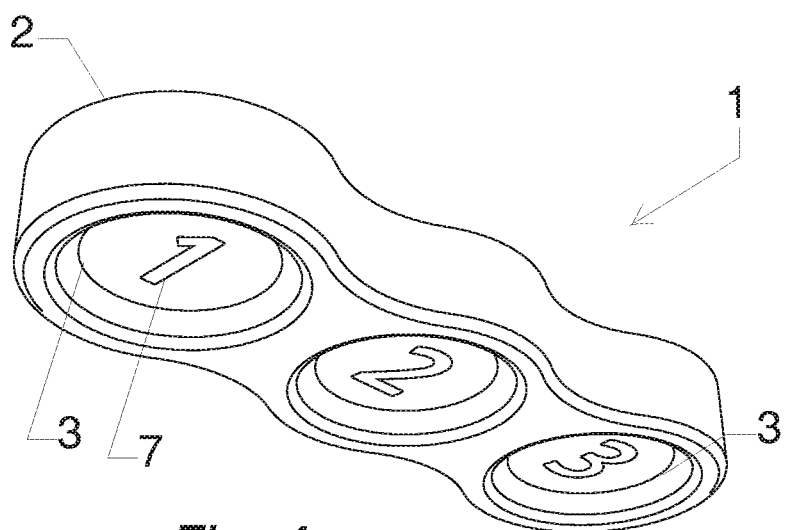
FIG. 4 shows a tray of an example magnetic building set.
Figure 5:
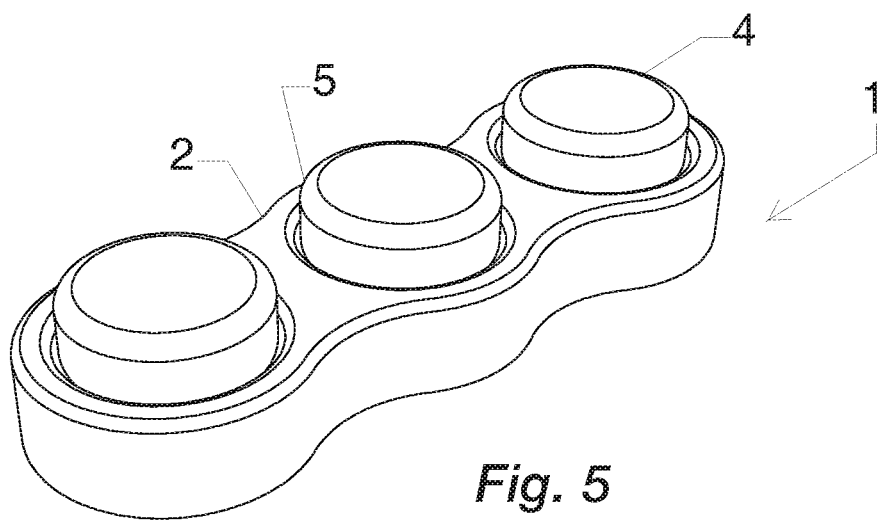
FIGS. 5-8 show a tray and unit markers of an example magnetic building set.
Figure 6:
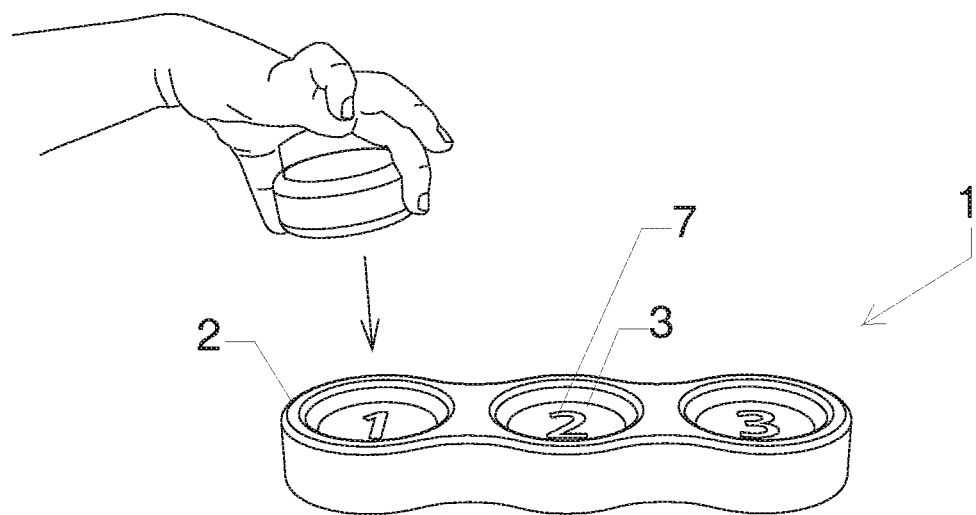
Figure 7:
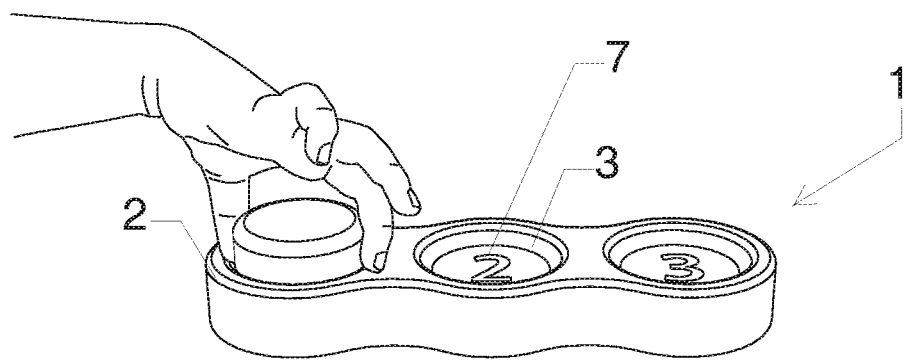
Figure 8:
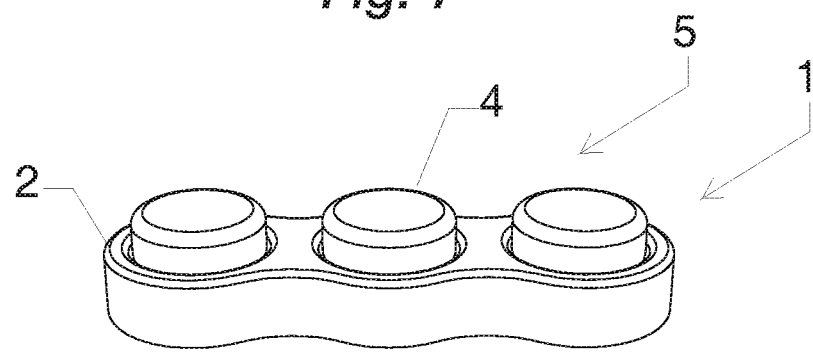
Figure 9:
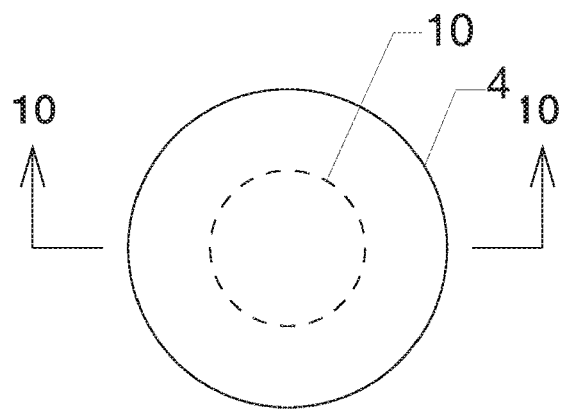
FIG. 9 shows a unit marker of an example magnetic building set.
Figure 10:
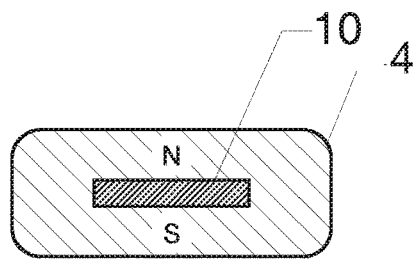
FIG. 10 shows a cutaway view of a unit marker of an example magnetic building set.
Figure 11:
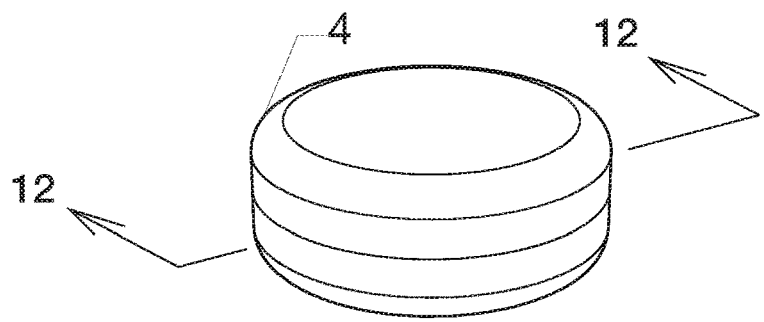
FIG. 11 shows a unit marker of an example magnetic building set.
Figure 12:
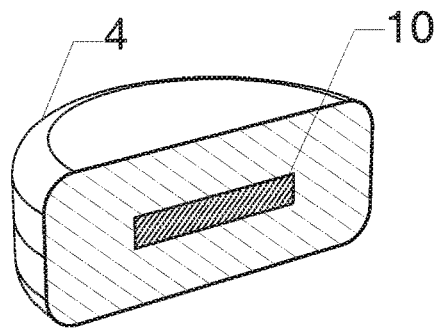
FIG. 12 shows a cutaway view of a unit marker of an example magnetic building set.
Figure 13:
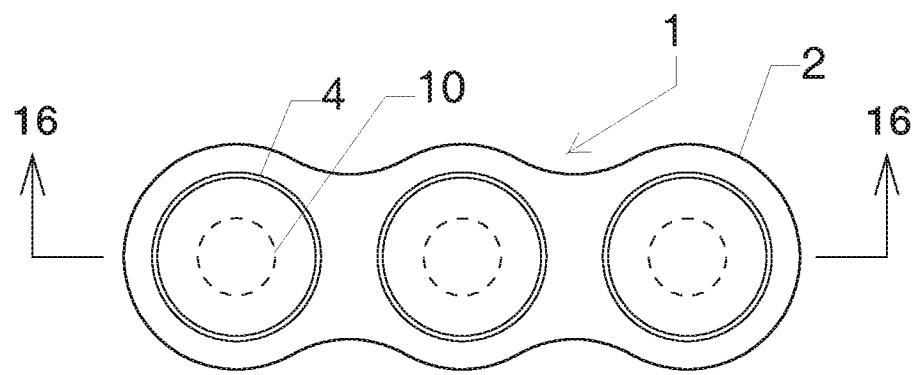
FIG. 13 shows a tray and unit markers of an example magnetic building set.
Figure 14:
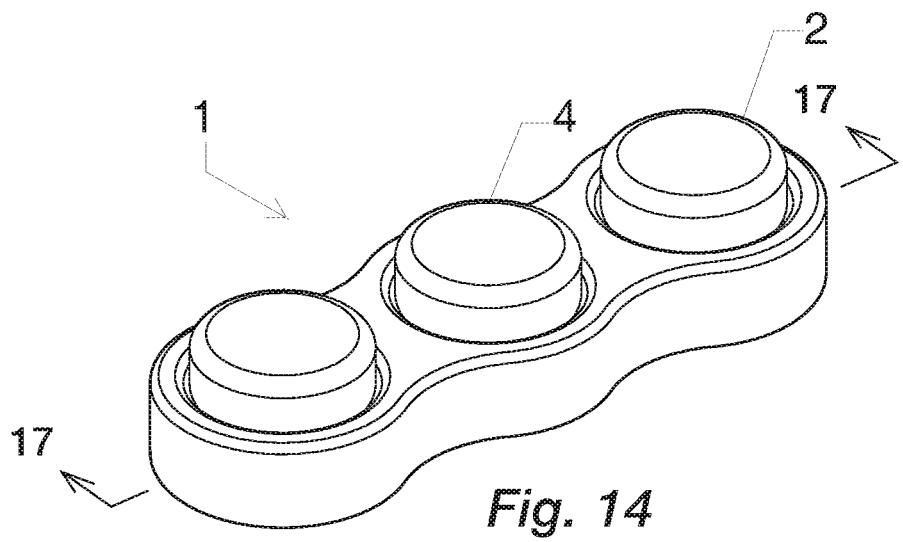
FIG. 14 shows a tray and unit markers of an example magnetic building set.
Figure 15:
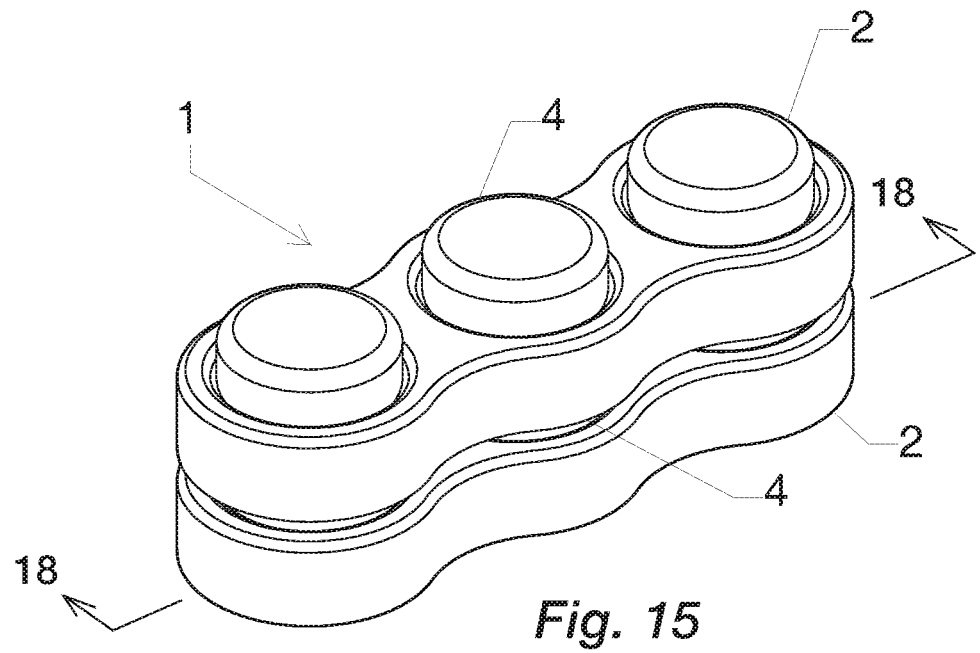
FIG. 15 shows trays and unit markers of an example magnetic building set.
Figure 16:
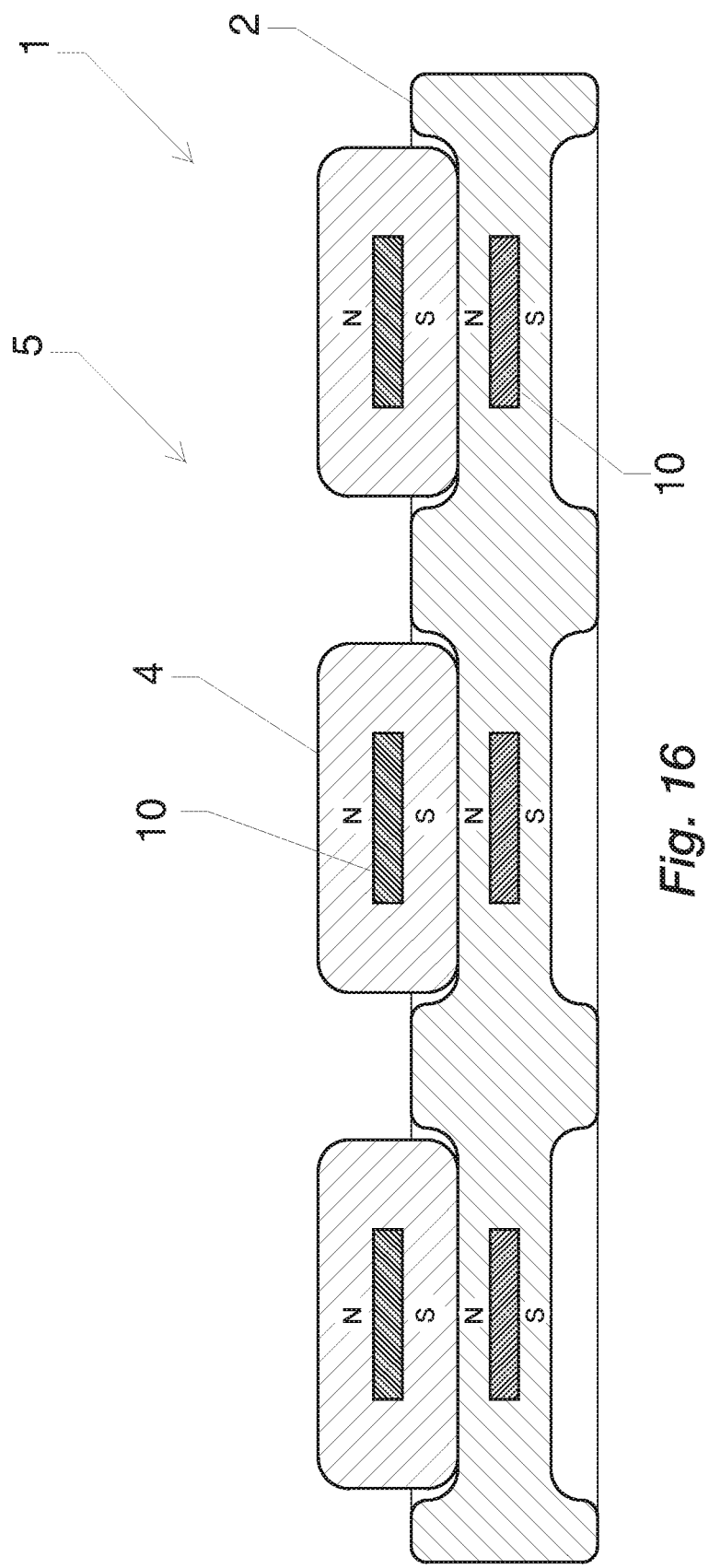
FIG. 16 shows a cutaway view of a tray and unit markers of an example magnetic building set.
Figure 17:
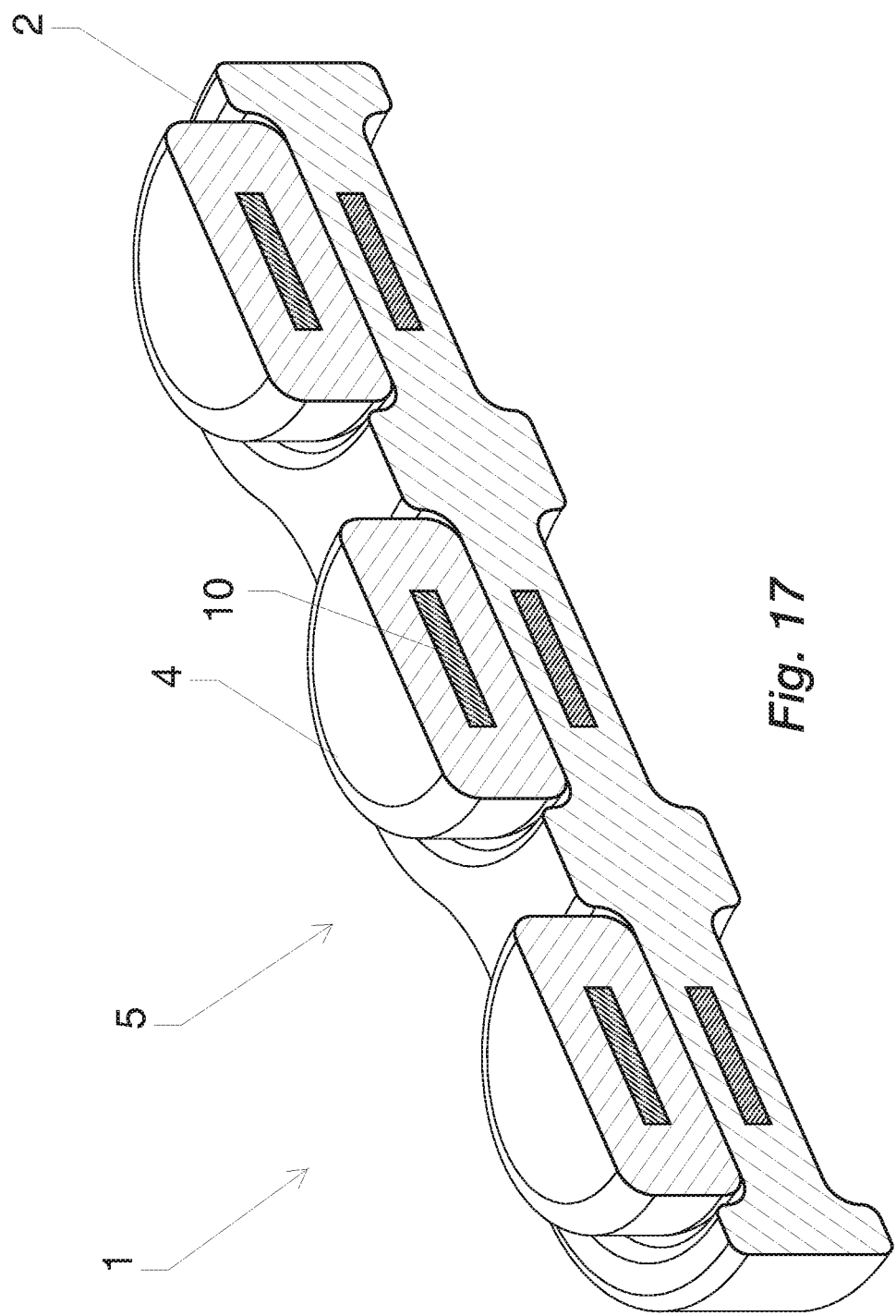
FIG. 17 shows a cutaway view of a tray and unit markers of an example magnetic building set.
Figure 18:
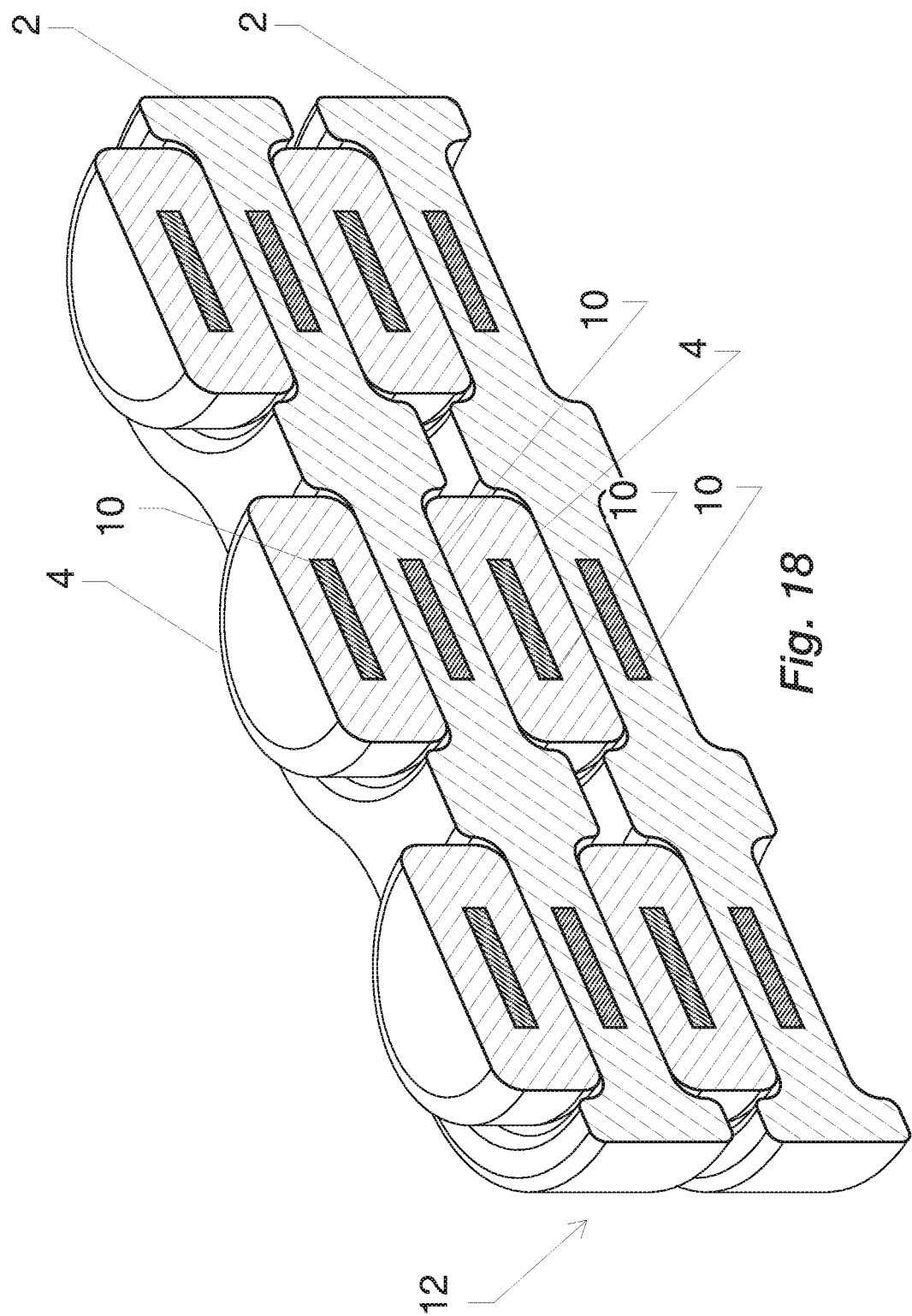
FIG. 18 shows a cutaway view of trays and unit markers of an example magnetic building set.
Figure 19:
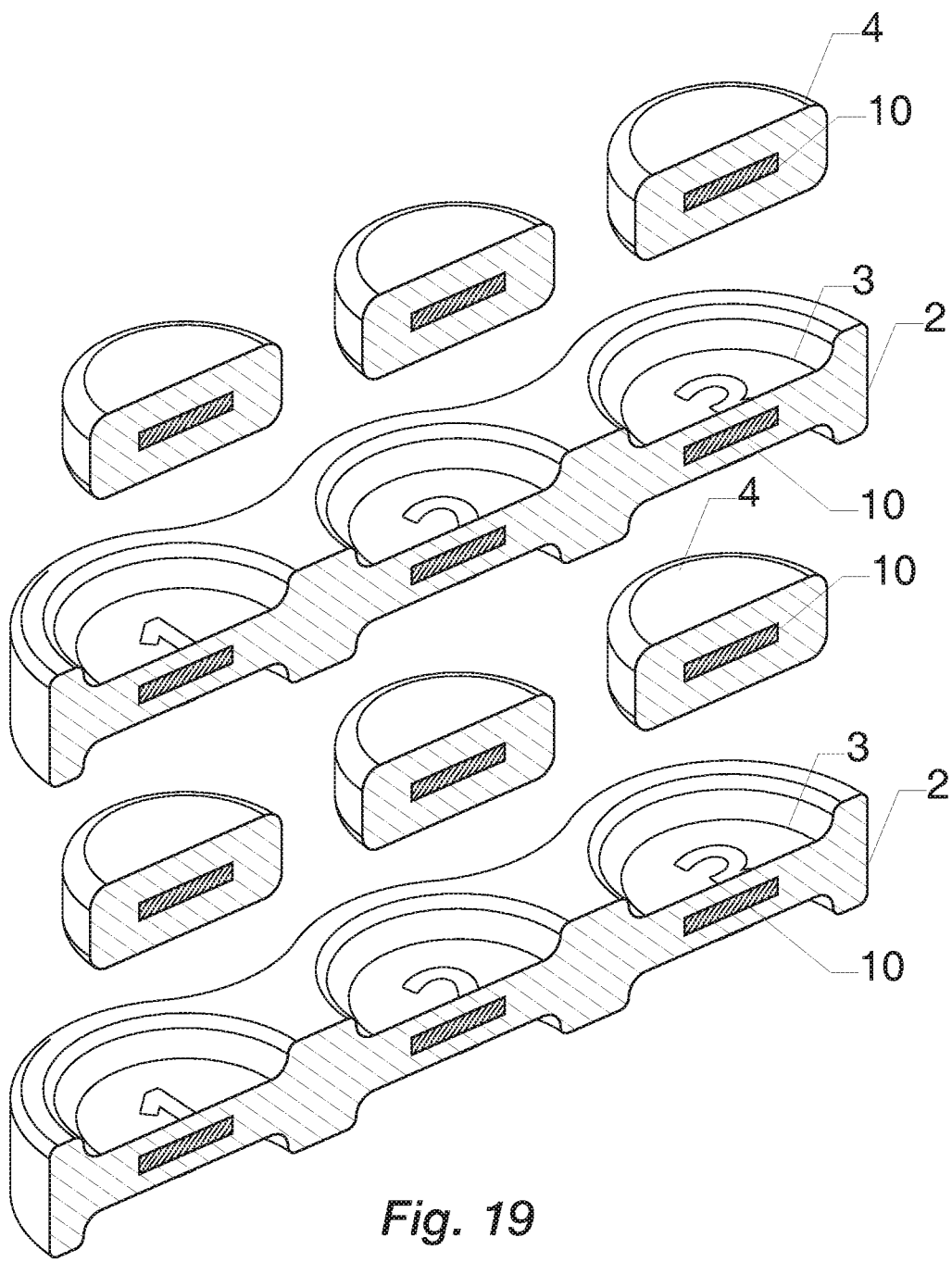
FIG. 19 shows a cutaway view of trays and unit markers of an example magnetic building set.
Figure 20:
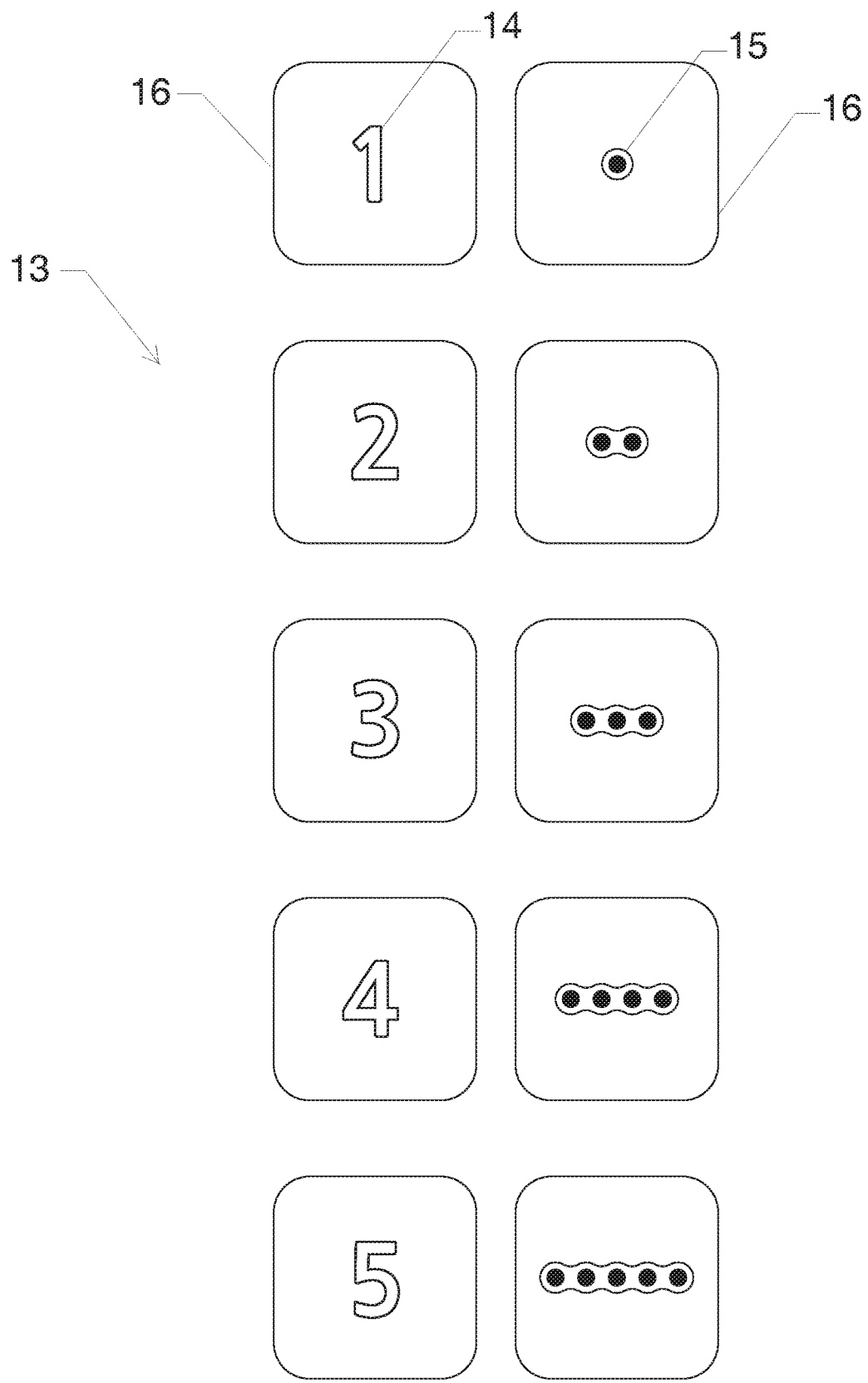
FIGS. 20-23 show quantity cards of an example magnetic building set.

A magnetic building set and method for teaching numeracy is disclosed. An example magnetic building set 1 includes a plurality of trays 2 with indents 3 that receive a plurality of unit markers 4 which can be implemented in various manipulative exercises and games that teach numeracy, elementary arithmetic, geometric shapes, and spelling. The magnetic building set 1 enables the user (e.g., teachers and/or students) to build a plurality of geometric shapes, structures and other constructions. Trays 2 can be provided to represent a plurality of numeric quantities whereby a single tray provides, on one side, a corresponding quantity of indents 3 that are capable of receiving an equal quantity of unit markers 4. Trays 2 can be provided with an equal number of indents 3 on a second side as are present on the first side, allowing them to be reversible, such that unit markers can be inserted in either side, therefore allowing tray and marker assemblies to be stacked one on top of the other. When resting on a work surface such as a table, the quantity of indents 3 within a single tray 2 that face upward, and therefore the quantity of unit markers 4 that can be inserted into the upward facing indents, represents the unit quantity for that particular tray 2. When resting on a work surface such as a table, the indents 3 on the underside of the tray 2 are present to provide the stacking and reversibility properties and are not considered when calculating the total unit quantity for the tray 2. For example, when resting on a work surface, a tray 2 that is considered to have a unit quantity of two, may have two indents 3 on a first upward facing side and a corresponding two indents 3 on the second side which rests upon the work surface. For the purposes of the numeracy exercises and games described herein, this tray 2 with a unit quantity of two can be considered a two-unit tray. The markers 4 within a tray 2 may be collectively referred to as a marker assembly 5.

A tray 2 and marker assembly 5 representing a specific numeric quantity can be manipulated as a whole, while the unit markers contained therein are visible to the student and can be viewed, manipulated, arranged and counted individually. Students are instructed to manipulate the trays and markers in various exercises in order to learn counting, number composition and decomposition, subitizing of quantities, arithmetic operations, place value, arithmetic story problems, geometric shapes, and spelling.

Before continuing, it is noted that as used herein, the terms "includes" and "including" mean, but is not limited to, "includes" or "including" and "includes at least" or "including at least" The term "based on" means "based on" and "based at least in part on."

The examples described herein are provided for purposes of illustration, and are not intended to be limiting. Other devices and/or device configurations may be utilized to carry out the operations described herein. The operations shown and described herein are provided to illustrate example implementations. It is noted that the operations are not limited to the ordering shown. Still other operations may also be implemented.

Figure 164:
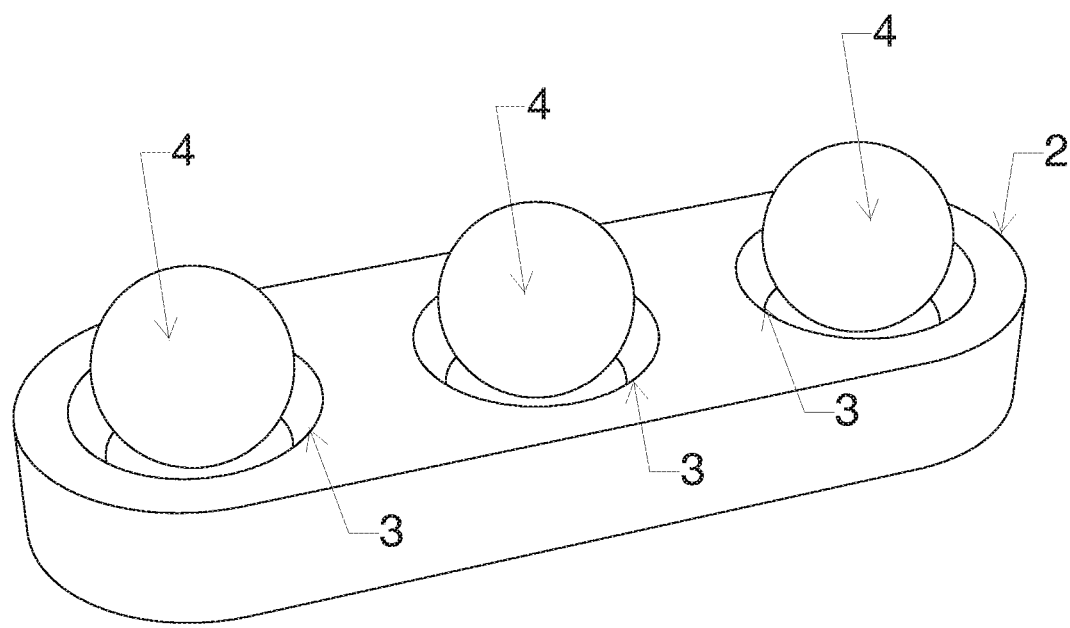

FIGS. 1-164 show example magnetic building sets 1 and illustrate example methods for teaching numeracy, shapes, and spelling. Trays 2 can be provided that represent any known quantity and may be provided with as many indents 3 as desired. In an example, trays 2 can be provided that represent the following quantities: a tray 2 representing the quantity of one and having one indent 3 on a first side and one indent 3 on a second side, a tray 2 representing the quantity of two and having two indents 3 on a first side and two indents 3 on a second side, a tray 2 representing the quantity of three and having three indents 3 on a first side and three indents 3 on a second side, a tray 2 representing the quantity of four and having four indents 3 on a first side and four indents 3 on a second side, a tray 2 representing the quantity of five and having five indents 3 on a first side and five indents 3 on a second side, a special tray 2 in the form of a ten-frame 6 representing the quantity of ten and having ten indents 3 arranged in two rows of five on a first side and ten indents 3 arranged in two rows of five on a second side.

The surface of the indents 3 within a tray 2 may be printed, painted, debossed, etched or otherwise inscribed or denoted with numerical indicia 7 beginning with the numeral "1" and increasing sequentially by one in each subsequent indent such that the last indent can be printed, painted, debossed, etched or otherwise inscribed or denoted with the numeral corresponding to the numeric quantity represented by the tray 2. When resting on a work surface such as a table, a tray 2 without markers inserted into the indents 3 and with numeric indicia 7 visible can represent a number line. Indents 3 within the trays 2 can also be marked with indicia 7 beginning with a numeral other than "1" and can represent a quantity transposed along a number line. For example, a tray 2 with five indents can be provided that is marked with the numerals "6", "7", "8", "9" and "10." When placed in a linear relationship and adjacent to a preceding tray 2 with five indents that has been provided with the numerals "1", "2", "3", "4" and "5," a modular number line can be represented. Additional trays 2 with five indents and sequences of numerals of an order greater than ten can be provided to further extend the number line represented.

It is noted that the references are not shown for each instance in the figures where the element referred to by the reference is shown multiple times in the same drawings (e.g., one of the trays 2 or one of the markers 4 may only be labeled once even if multiple trays or markers are shown), in order to simplify the drawings. Multiple instances of the same element are clearly understood from the drawing to be multiple instances, and therefore each instances does not need to be separately labeled as such.

A student may practice counting by inserting markers 4 into the indents 3 provided within a tray. The student can be instructed to begin by inserting a marker into the indent that contains the indicium 7 for the numeral "1" while speaking aloud the word for the numeral "1." The student can then be instructed to proceed to the next adjacent indent 3 that contains an indicium 7 for the numeral "2," and insert a new marker 4, speaking aloud the word for the numeral "2." The student can repeat this process until all indents within the tray have been filled with markers 4 and the student has completed the counting exercise for a given tray and quantity represented. When all markers 4 have been inserted into the indents in a tray, the student can further practice numeracy skills by memorizing the quantity represented while looking at the markers 4, by quickly counting them again without speaking aloud or by subitizing the quantity represented by the tray 2 and markers 4.

Figure 77:
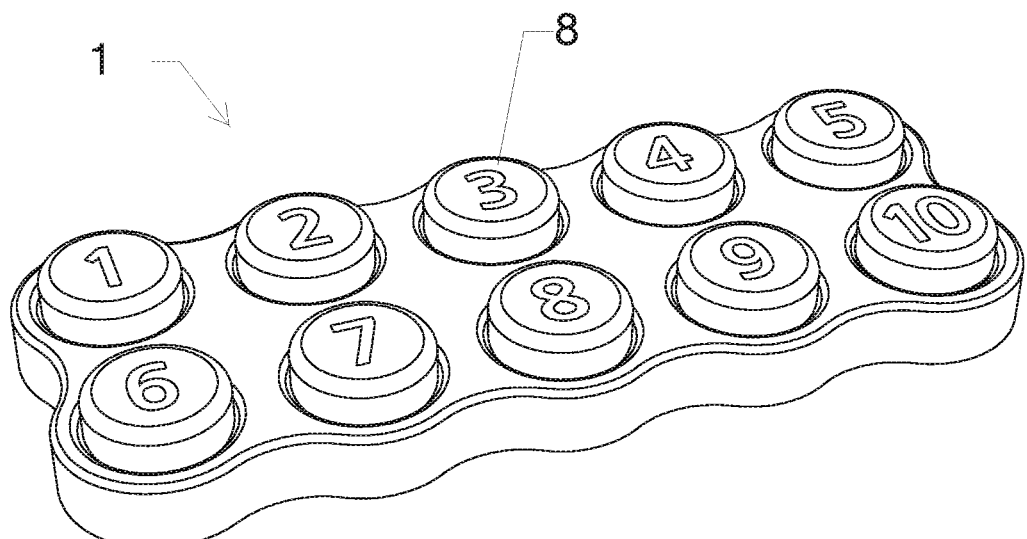
FIG. 77 shows a ten frame and unit markers of an example magnetic building set.
Figure 78:
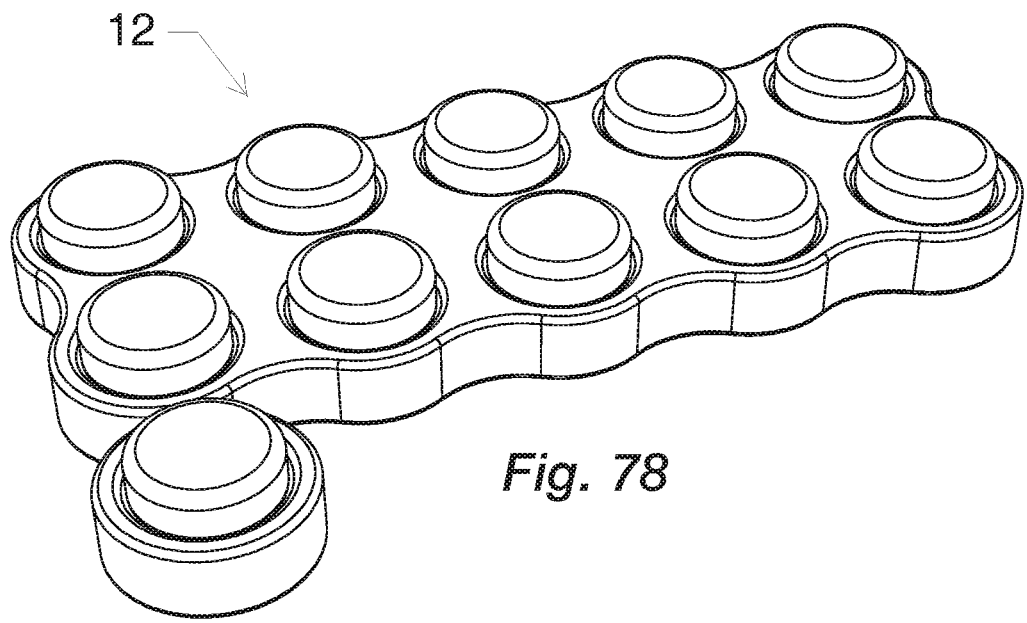
FIG. 78 shows a ten-frame, tray, and unit markers of an example magnetic building set.
Figure 79:
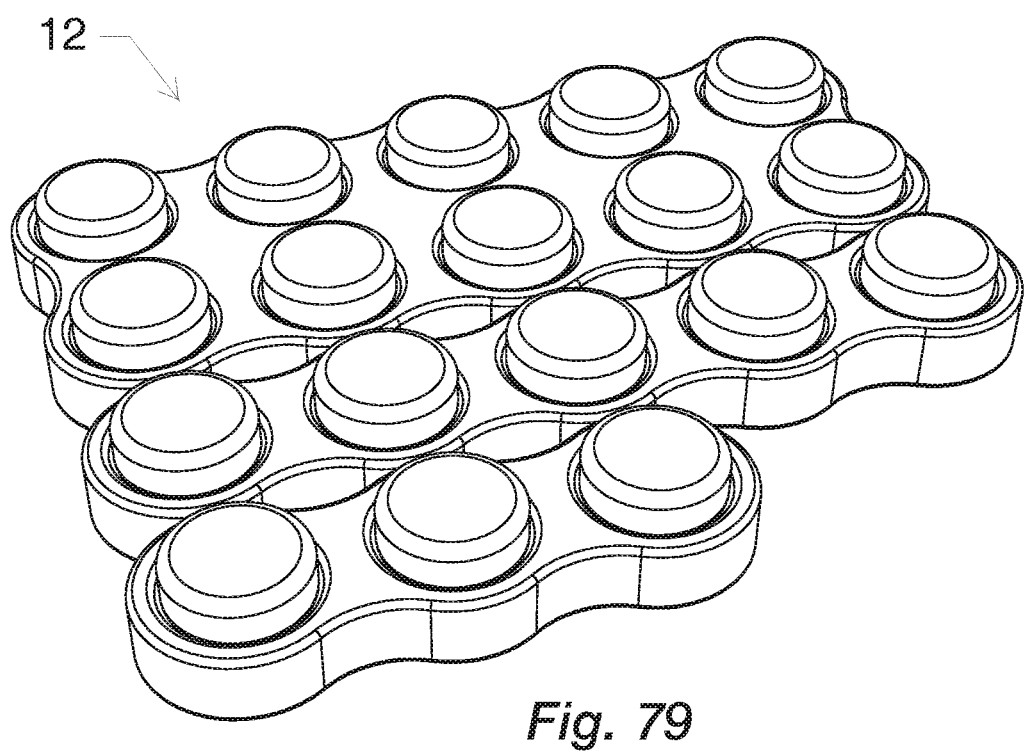
FIG. 79 shows a ten-frame, trays, and unit markers of an example magnetic building set.
Figure 80:
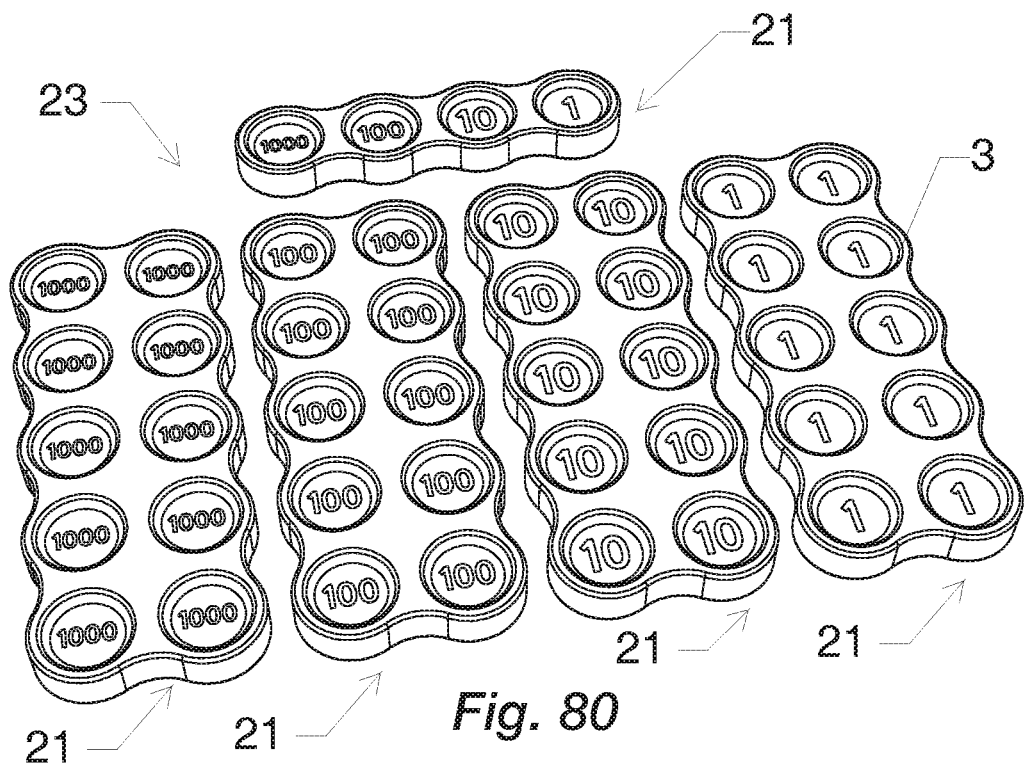
FIG. 80 shows place value trays of an example magnetic building set.

As shown for example in FIG. 77, a unit marker 4 can be printed, painted, debossed or otherwise inscribed on a first side, a second side or both sides with numerical indicia 8. When a student is practicing the counting exercise disclosed hereinabove, the student places the marker 4 with numerical indicia 8 into the tray indent that possesses a matching numerical indicium 7 thereby enhancing their recognition and memorization of the numerals and reinforcing the counting exercise.

A unit marker 4 can be printed, painted, debossed, etched or otherwise inscribed on a first side, a second side or on both a first and second side with a picture 9 of a face, animal, insect, plant, fruit, flower, food item, astral body, popular character or other object recognizable and known to a student. When performing the counting exercise disclosed hereinabove using unit markers printed with pictures thereon, a student may count a quantity of known and relatable objects, as pictured on the markers, further enhancing their cognition of and engagement with the numeracy exercises.

Magnets Enclosed within Trays and Markers.

In an example, magnets 10 can be enclosed within the tray indents 3 and unit markers 4 such that the markers 4 remain secured within the indents 3 during casual manipulation but are easily removed when desired. When the markers 4 are inserted into the indents 3, the attractive force of the magnets 10 within the markers 4 to the magnets 10 within the indents 3 also provides auditory and kinesthetic feedback which may further enhance both the learning experience and enjoyment during play. Using their imagination, a student may build a plurality of geometric shapes, constructions or other structures 11 by stacking tray assemblies 12 and marker assemblies 5. The magnets 10 within the tray indents and the magnets 10 within the markers 4 can have dipole axes where a first side of a marker 4 may be attracted to an indent 3 within a first side of a tray 2, the second side of the same marker 4 may be repelled from an indent in the first side of the same tray 2. Additionally, the second side of a marker 4 may be attracted to an indent 3 within the second side of the same tray 2 and the second side of a marker 4 may be repelled from an indent in the first side of the same tray 2.

A student may, through experimentation and exploration, determine the side and orientation of a magnetic marker 4 that may fit into a corresponding magnetic indent 3 within a tray.

It is noted that the magnet configuration disclosed herein is an example configuration. In another example, steel slugs or other magnetic material may be provided in the discs and only magnets provided in the trays, or vice versa. In addition, the device is not limited to implementation with magnets. Other mechanisms for removably attaching trays and markers may be implemented. The specific materials may be altered based on design considerations as will be readily appreciated by those having ordinary skill in the art after becoming familiar with the teachings herein.

Number composition describes the property of mathematics whereby a set of two or more numbers can be composed into a greater number. Number decomposition describes the property of mathematics whereby a number can be decomposed into two or more smaller numbers. A student may, with the assistance of a teacher, implement the tray and marker assemblies to illustrate number composition and decomposition by placing two or more trays 2 adjacent to each other on a work surface and inserting unit markers 4 into each of the indents 3 in all of the trays 2. The student and teacher may then count the unit markers 4 in each individual tray 2, noting the quantity represented by each tray 2, and then counting the total number of unit markers 4 present in all trays 2.

Figure 25:
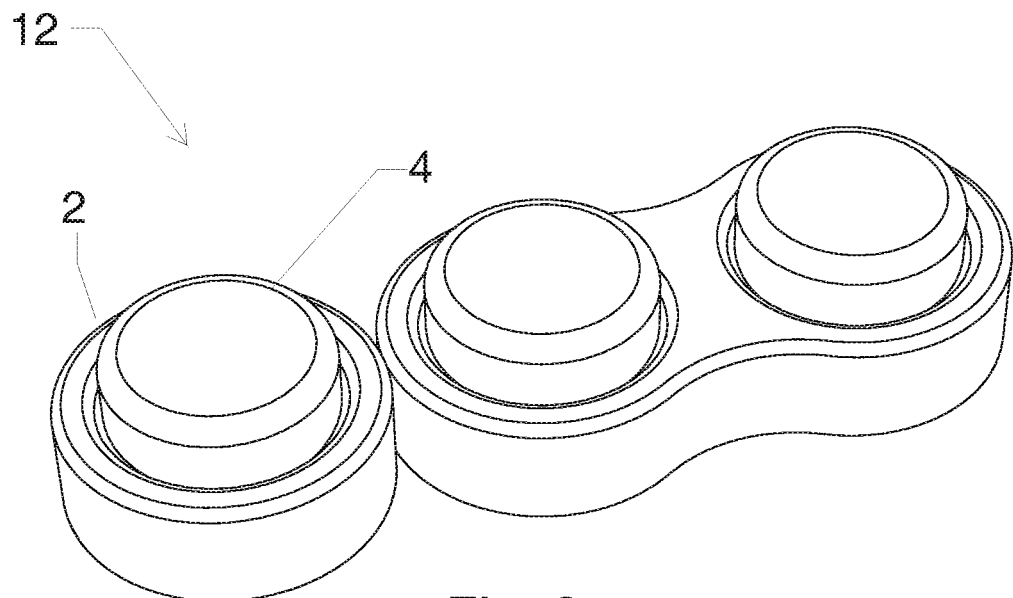
FIG. 25 shows trays and unit markers of an example magnetic building set.
Figure 28:
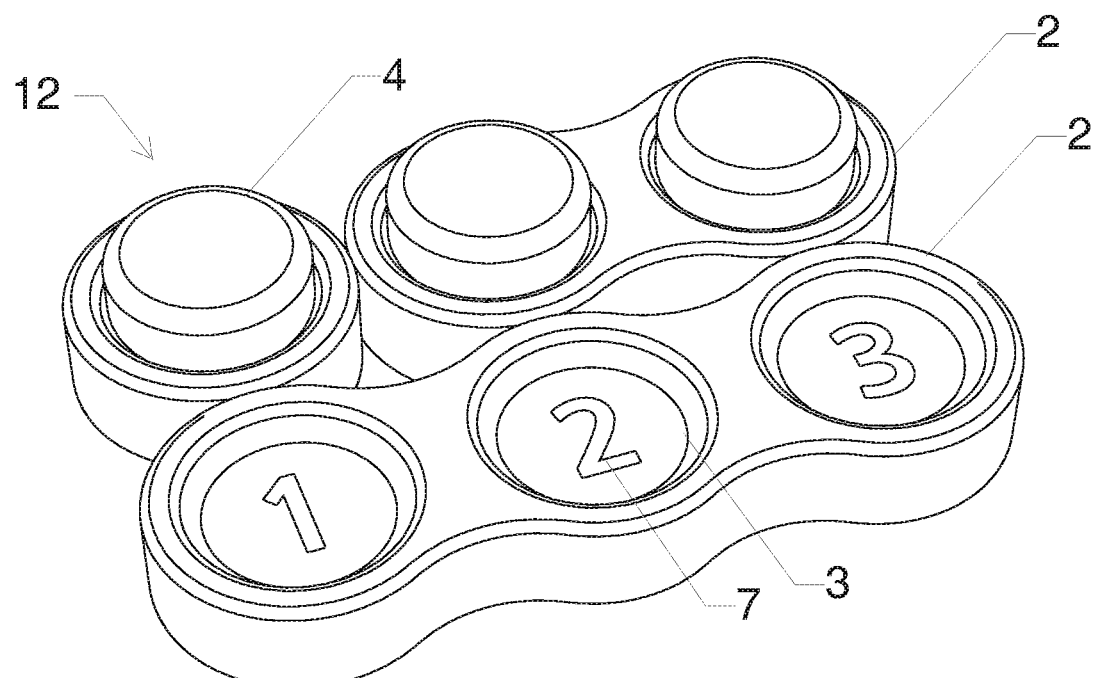
FIG. 28 shows trays and unit markers of an example magnetic building set.
Figure 29:
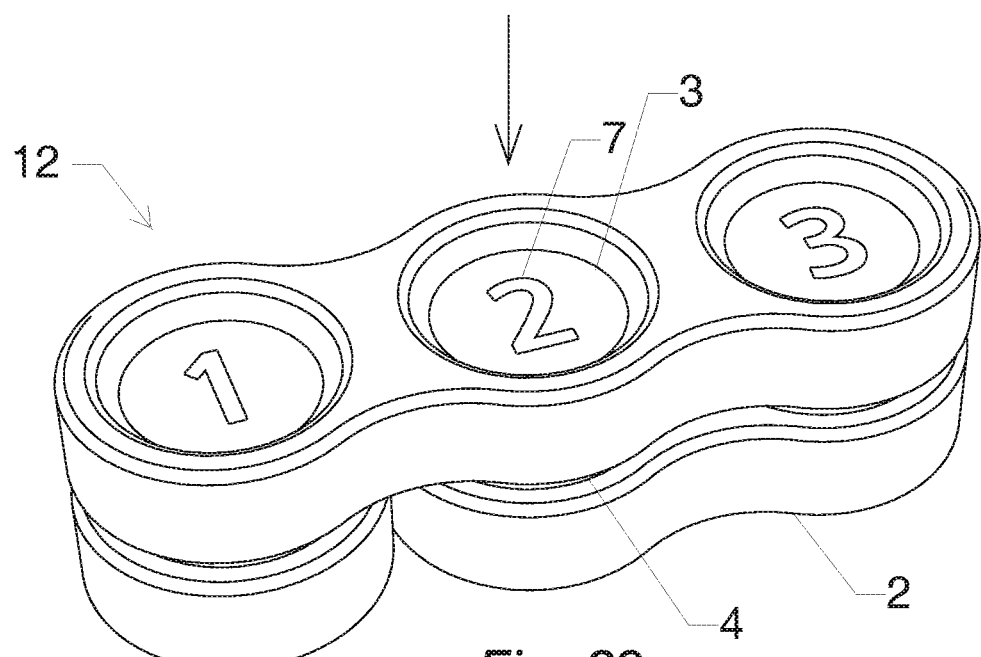
FIG. 29 shows trays and unit markers of an example magnetic building set.
Figure 30:
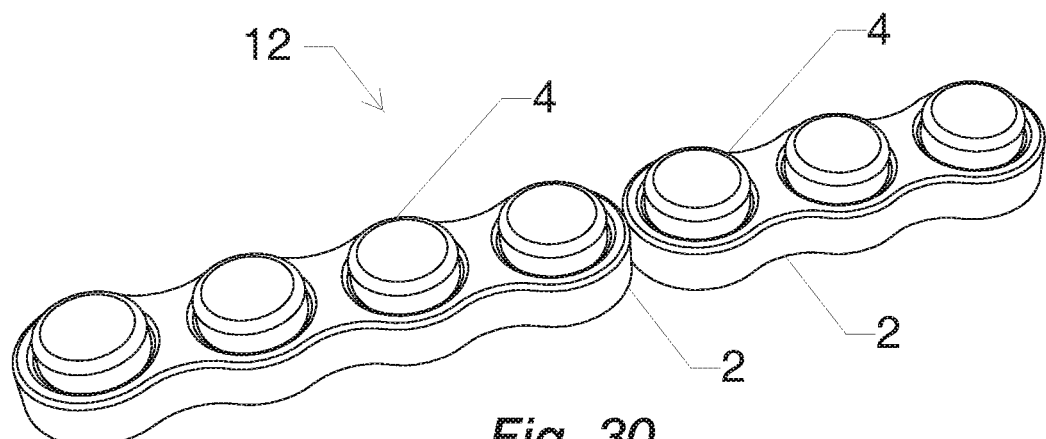
FIG. 30 shows trays and unit markers of an example magnetic building set.
Figure 31:
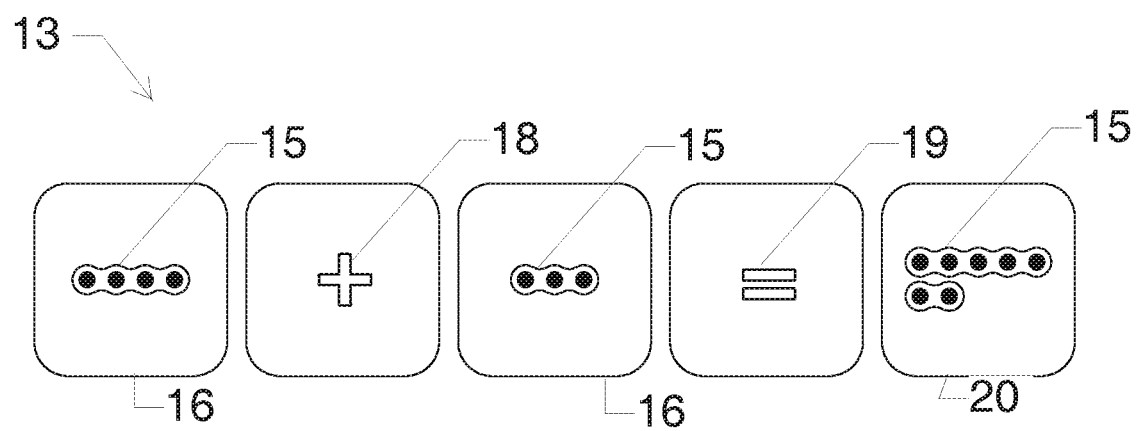
FIG. 31 shows cards of an example magnetic building set.
Figure 32:
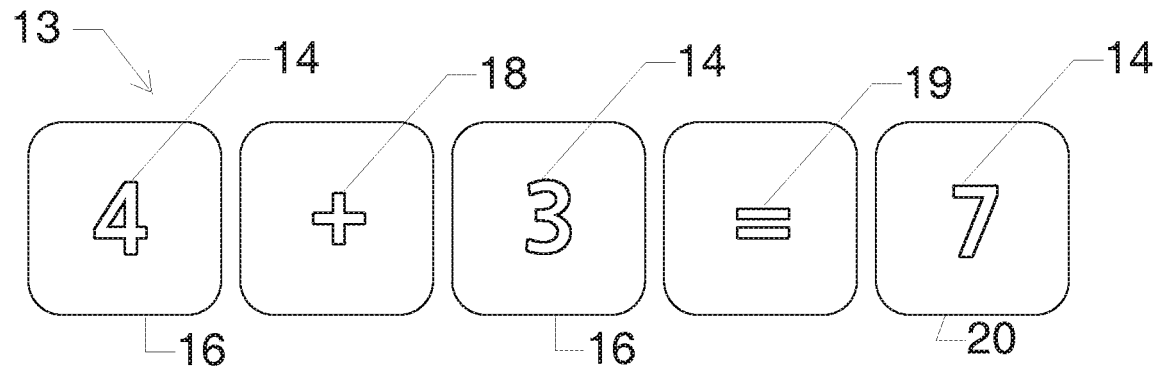
FIG. 32 shows cards of an example magnetic building set.
Figure 33:
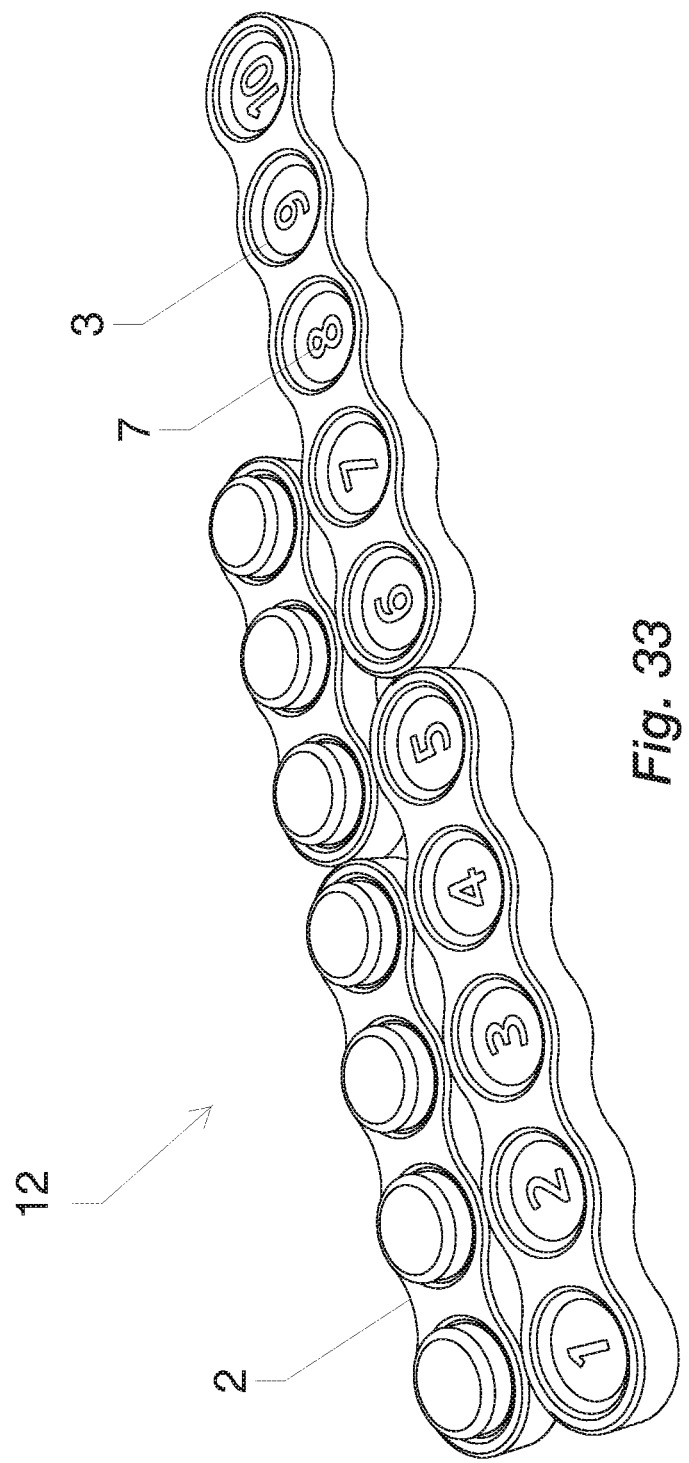
FIG. 33 shows trays and unit markers of an example magnetic building set.

For example, the teacher may place a one-unit tray 2 upon the work surface. With instruction from the teacher, the student may insert a single unit marker 4 into the indent 3 within the one-unit tray 2 and count the unit marker, speaking the name of the number aloud. The teacher may then place a two-unit tray 2 upon the work surface and instruct the student to place unit markers 4 within the indents 3 of the two-unit tray 2 using the exercise described hereinabove. At this stage in the exercise, the student may have placed on the work surface a single one-unit tray 2 with a marker 4 inserted and a single two-unit tray 2 with two markers 4 inserted, as shown in FIG. 25. The teacher can now instruct the student to count aloud the total number of markers 4 present on the work surface. With assistance from the teacher, the student may count a total of three unit markers 4 present on the work surface. Three is the correct answer for the exercise described. The teacher and student may further discuss the phenomenon demonstrated by the trays 12 and markers 4 whereby the quantity of three markers 4 that are present on the work surface is composed of a one-unit tray 2 and marker assembly 5 and a two-unit tray 2 and marker assembly 5. As shown in FIG. 28, the student may place a three-unit tray 2 on the work surface and aligned with the one-unit and two-unit trays 2 and notice the length of the three-unit tray 2 is equal to the length of the one-unit and two-unit trays 2 when added together. Finally, the student may further emphasize the equality by stacking the three-unit tray 2 on top of the one-unit and two-unit trays 2 and their markers 4 as illustrated in FIG. 29.

Quantity and Operator Cards.

Figure 21:
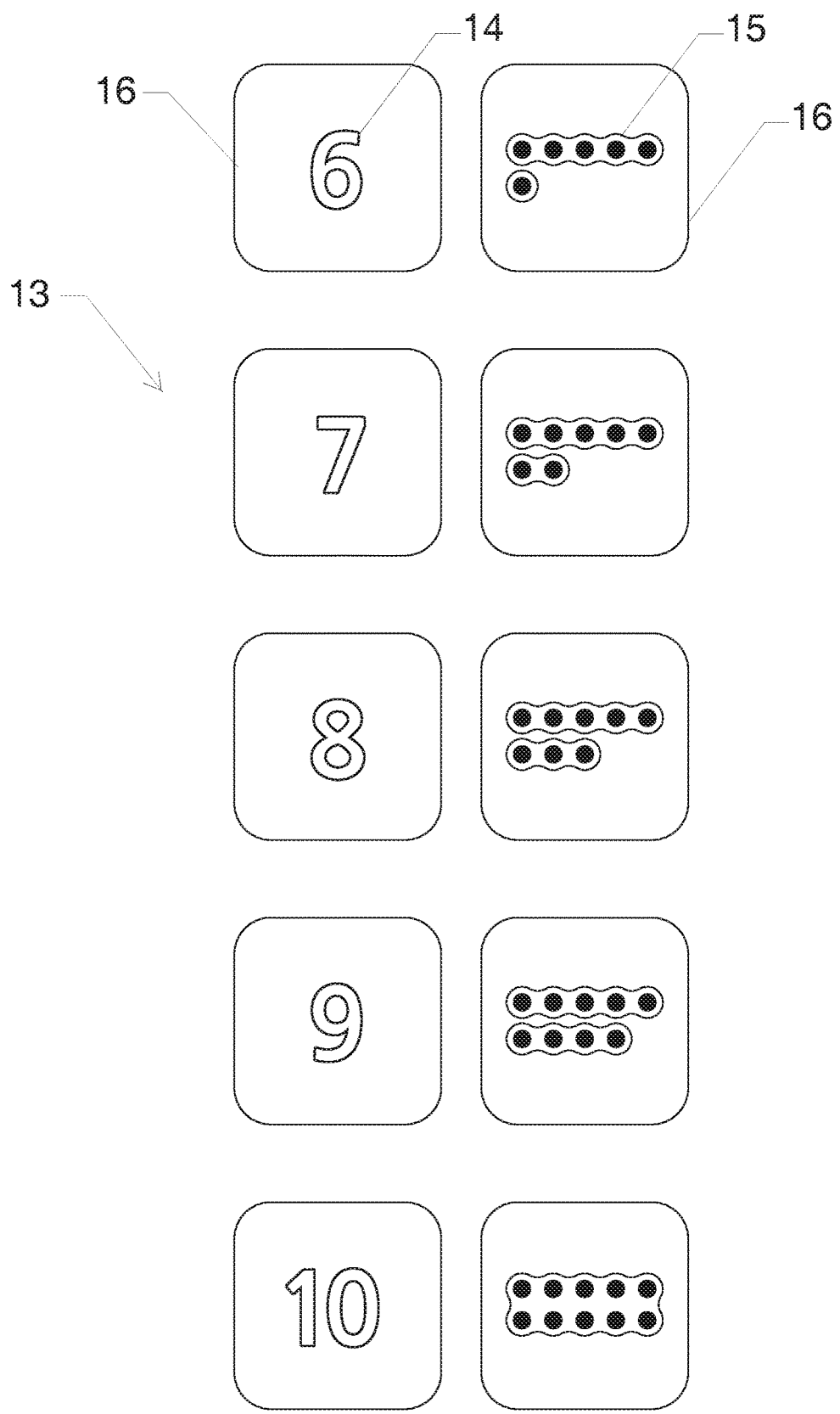
Figure 22:
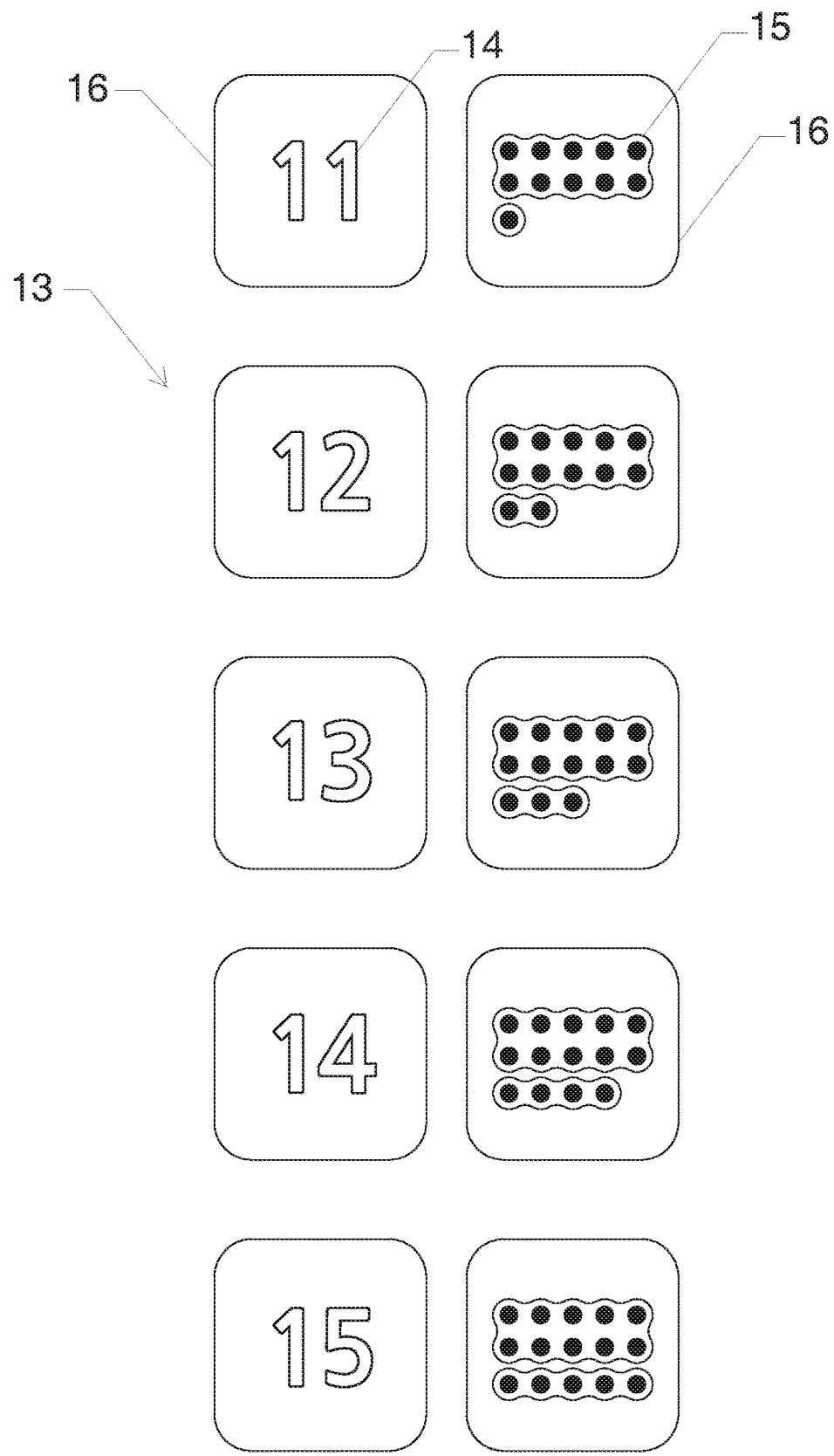
Figure 23:
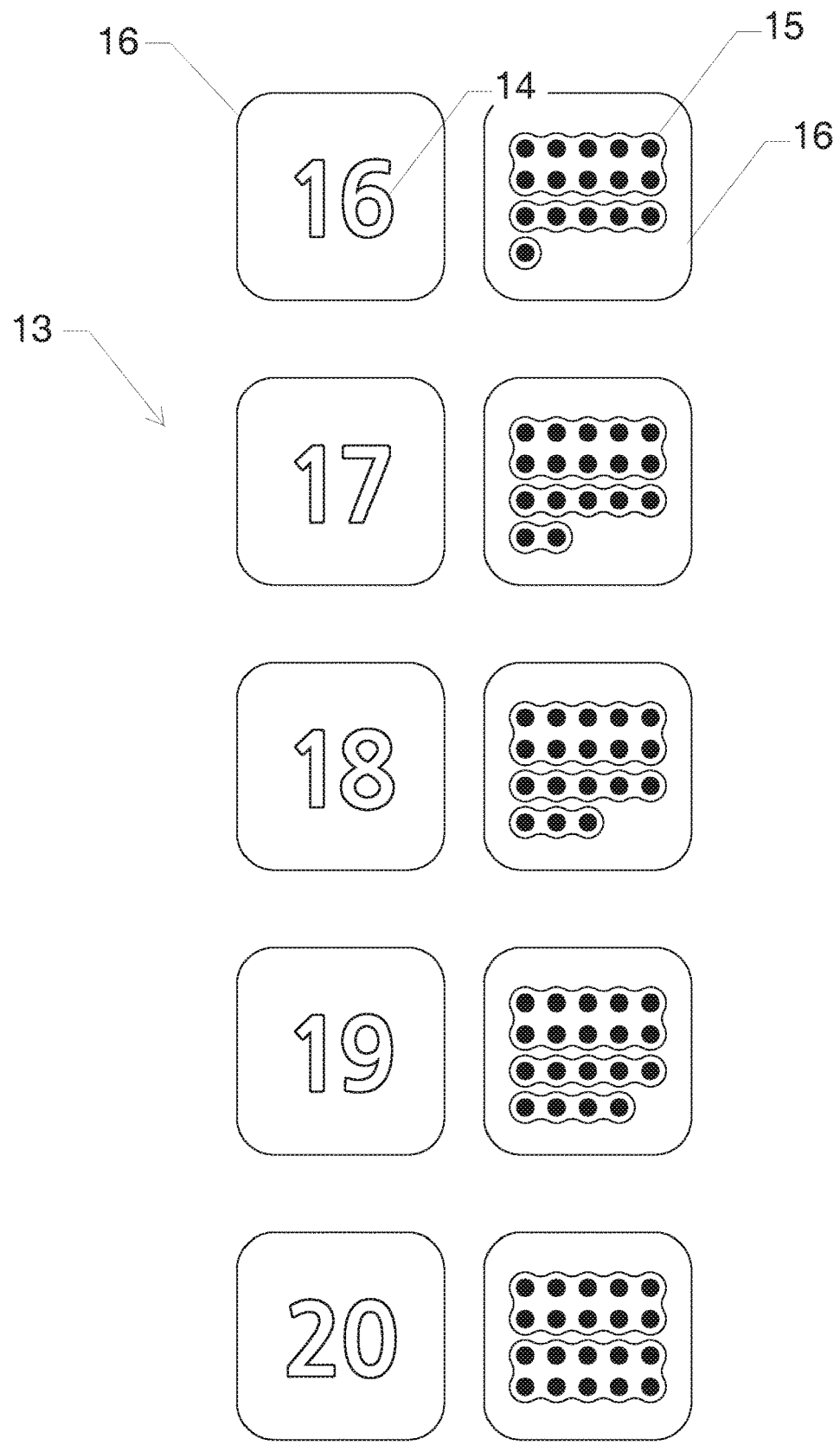

In an example shown in FIGS. 21-23, a set of cards 13 may be provided with the building set 1 that can demonstrate to the student the relationship between the concrete representation of a given quantity in the form of a tray 2 filled with unit markers 4 or a tray assembly 12 filled with unit markers 4 and the corresponding symbolic numeral representation of an equal quantity. In an example, the set of cards 13 provided each have printed on a first side a numeral indicia 14 in a sequence beginning with the numeral "1" and increasing by one consecutively up to and including, but not limited to the numeral "20." The set of cards can each have printed on a second side a pictorial representation 15 of a tray or an assembly of trays filled with unit markers representing a quantity equal to the quantity represented by the numeral on the first side of each respective card. These cards 13 with pictorial and numeral representations of quantity 15 and 14 can hereafter be referred to as quantity cards 16. The drawings for the cards 13 show an optimized set of pictorial representations 15 whereby the least number of trays 2 that can be implemented to represent the quantity is displayed in the picture 15 and where possible, the quantity is grouped into five-unit trays 2 and ten-unit trays 2. For example, the card 13 for the quantity "4" shows a single four-unit tray 2 and the card for the quantity "6" shows a five-unit tray 2 and a one-unit tray 2. In some of the mathematical exercises and for some levels of learners, it might be advantageous to provide permutations of the quantity cards 13 that show groupings of trays 2 other than the optimized set. For example, the quantity card "4" may show two two-unit trays 2 in its pictorial representation 15 rather than a single four-unit tray 2. The advantage of this pictorial representation 15 is apparent when examining the addition operation exercise. When using two two-unit trays 2 in the exercise, the resulting solution may have on the work surface two two-unit trays 2 instead of a single four-unit tray 2.

Figure 24:
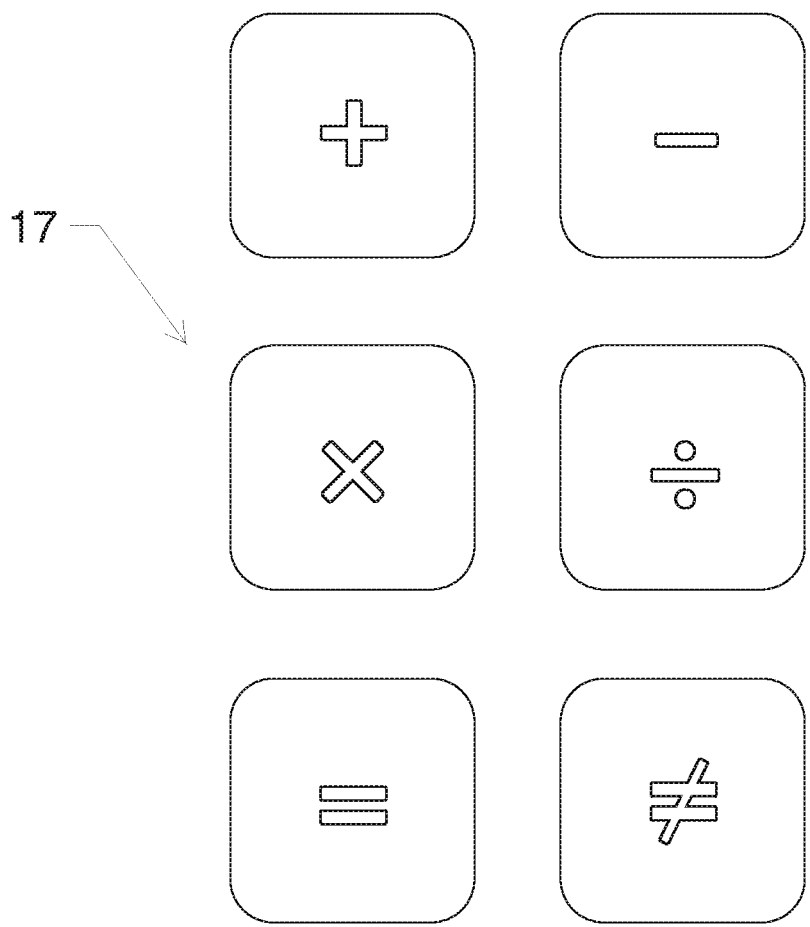
FIG. 24 shows operator cards of an example magnetic building set.

As shown in FIG. 24, A set of cards 13 is also provided with the building set that can have printed on each side one of the arithmetic signs which are the plus sign, the minus sign, the multiplication sign and the division sign also known as an obelus, an equal sign and a slashed equal sign to represent inequality. In an example, a card may have printed on a first side one of the arithmetic signs and may have printed on a second side the sign that is inverse to the sign printed on the first side. Generally, these may be referred to as sign cards 17. The sign cards may be arranged on a work surface in conjunction with tray 2 and unit marker assemblies 5 in order to illustrate basic arithmetic equations. When a sign card 17 bearing one of the arithmetic operation signs is used in an equation, such as that shown in FIG. 26, this sign card may also be referred to hereinafter as an operator card 18. When a sign card 17 bearing one of the arithmetic equality signs is used in an equation, such as that shown in FIG. 26, this sign card may also be referred to hereinafter as an equality card 19.

When employing a quantity card 16 in an arithmetic equation, a student may implement a first side of the card that has been printed with the pictorial representation 15 of a tray 2 and unit marker assembly 5 to denote the quantity represented. When further employing a quantity card 16 in an arithmetic equation, a student may also implement a second side of the card 14 that has been printed with a numeral to denote the quantity represented. A student may also implement a combination of pictorial and numeral cards 13, depending on the student's achievement level, learning style, the exercise being taught or the teacher's discretion. As part of a teaching exercise, a student can arrange the cards 13 into an arithmetic equation by placing the cards 13 on a work surface in a sequence where a plurality of quantity cards 16 is combined with one or more arithmetic operator cards 18 followed by an equality card 19 and ending with a quantity card 16 that represents the solution to the equation.

Addition Operation Exercise.

With instruction from a teacher, a student may learn to perform the addition operation of arithmetic by placing two or more trays 2 filled with unit markers 4 upon a work surface and counting the total quantity of unit markers 4. In an example, the student can begin by placing a first tray 2 on the work surface. The student may then proceed to insert unit markers 4 into the indents 3 of the first tray, counting aloud in sequence beginning with one and proceeding until they have filled all indents 3 within the first tray 2. The teacher may assist the student at this point, noting the total quantity of unit markers 4 which have been counted in the first tray 2. The teacher may then present to the student a selection of the quantity cards 16 described hereinabove by placing them on the work surface. The presented cards can have the side facing upwards which has been printed with the pictorial representation 15 of a tray and unit marker assembly or plurality of assemblies. The student can be asked to select the quantity card 16 that matches the representation 15 and quantity of the first tray 2 which they have just counted and the teacher can remove the cards 16 that do not match the quantity of the first tray.

In another example, the teacher may simply place the matching quantity card 16 on the work surface without the student having to select a matching quantity card 16. In either case, the matching quantity card 16 now rests on the work surface.

The teacher next places an operator card 18 which has been printed with the plus sign onto the work surface and adjacent to the first card. With or without the teacher's assistance, the student may select a second tray 2 and place it on the work surface adjacent to the first tray 2. The teacher may instruct the student to align the trays 2 along their longest axes to form a line. The student next inserts unit markers 4 into the indents 2 within the second tray 2, again counting aloud in sequence beginning with one and proceeding until they have filled all indents within the second tray 2. The teacher and student next repeat the process for selecting a quantity card 16 that matches the quantity of the most recently counted tray and marker assembly and placing the quantity card 16 upon the work surface and adjacent to the operator card 18 having the plus sign printed thereon. The student may repeat the described process of placing trays, inserting markers, selecting and placing the matching quantity card and placing the plus sign operator card 18 on the work surface until the desired quantity of trays 2 to be added together has been reached.

In an example, when the desired quantities of tray 2 and unit marker assemblies 5 and corresponding cards 13 has been placed on the work surface, the teacher may next place the equals sign card 19 adjacent to the previously placed assembly composed of quantity cards 16 and plus sign operator card 17 or plurality of plus sign operator cards 17. The teacher may then disclose to the student the significance of the plus sign operator card 18 and the significance of the equals sign card 19. The teacher may next instruct the student to count the total quantity of unit markers 4 present on the work surface. When the student has counted the total quantity of unit markers 4 correctly, the teacher may present to the student a plurality of quantity cards 16 wherein one card has printed on it the quantity representation of the quantity that equals the total quantity of unit markers 4 present on the work surface.

Figure 26:
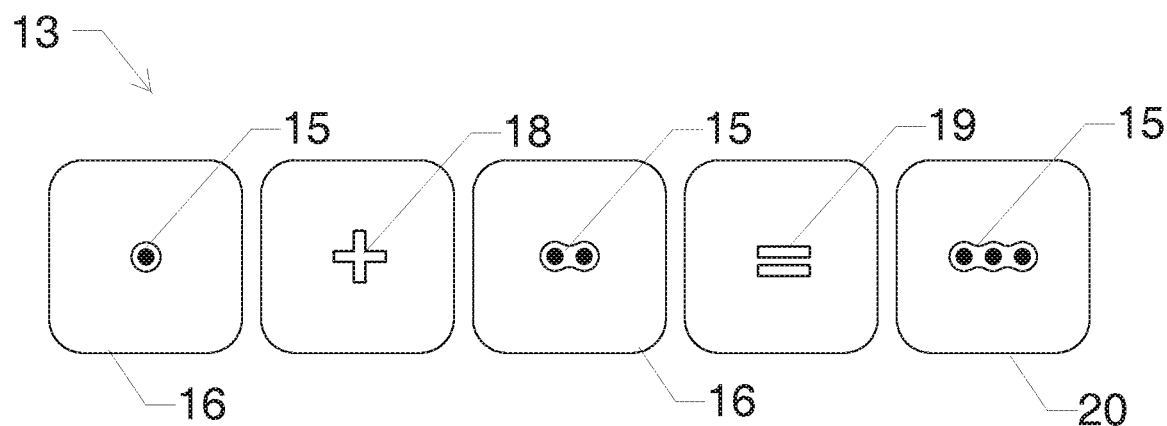
FIG. 26 shows cards of an example magnetic building set.
Figure 27:
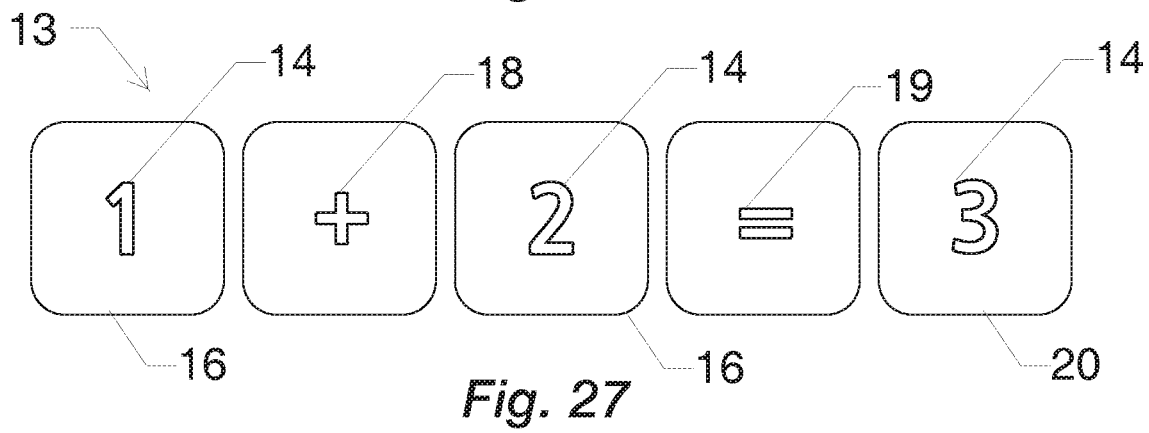
FIG. 27 shows cards of an example magnetic building set.

In another example, the teacher may simply present the quantity card 16 to the student which equals the total quantity of unit markers 4 present on the work surface. In either case, the card 16, which equals the total quantity of unit markers 4 present on the work surface, can be considered the solution to the arithmetic addition problem represented by the tray 2 and unit marker assemblies 5 and the previously placed assembly of cards 13. This quantity card 16 may hereafter be referred to as the solution card 20. The teacher or student may then place the solution card on the work surface with the side having printed the pictorial representation of the quantity facing upward and adjacent to the equals sign card. FIGS. 25-27 illustrate an example addition exercise using tray 2 and marker assemblies 5 and cards 13.

At this stage of the exercise, the addition operation is complete. The teacher may now instruct the student to flip the quantity cards 16 over such that the sides which have been printed with the numeral representation 14 of the quantities are facing upwards. The teacher may discuss with the student the significance of the numeral quantity cards 16 and their relationship to the quantities represented by the tray 2 and unit marker assemblies 5.

In another example of the addition operation teaching exercise, the teacher may find it advantageous to substitute the quantity cards 16 with the tray and marker assemblies themselves, therefore placing the plus sign card 17 or plurality of plus sign cards 17 and the equals sign card 19 adjacent to and between the tray 2 and marker assemblies 5.

Equality and Inequality Exercises.

Figure 34:
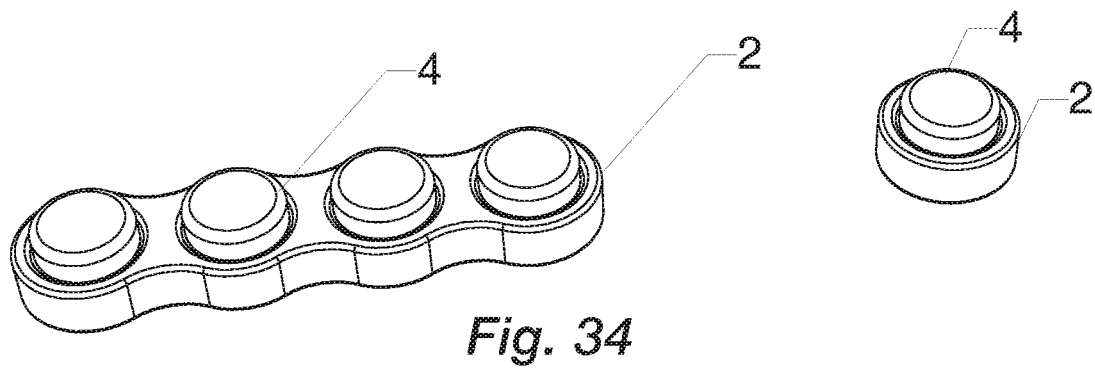
FIG. 34 shows trays and unit markers of an example magnetic building set.
Figure 35:
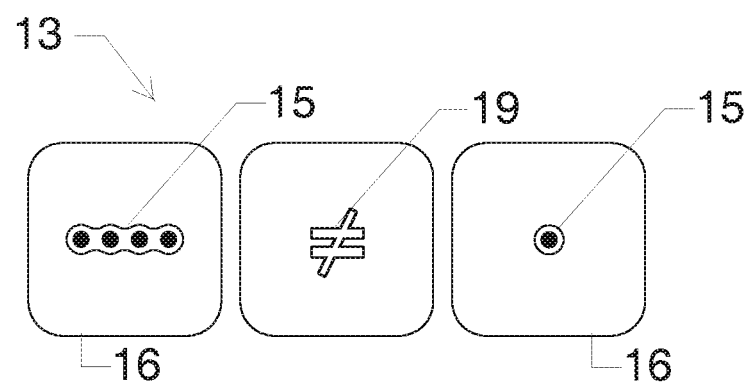
FIG. 35 shows cards of an example magnetic building set.
Figure 36:
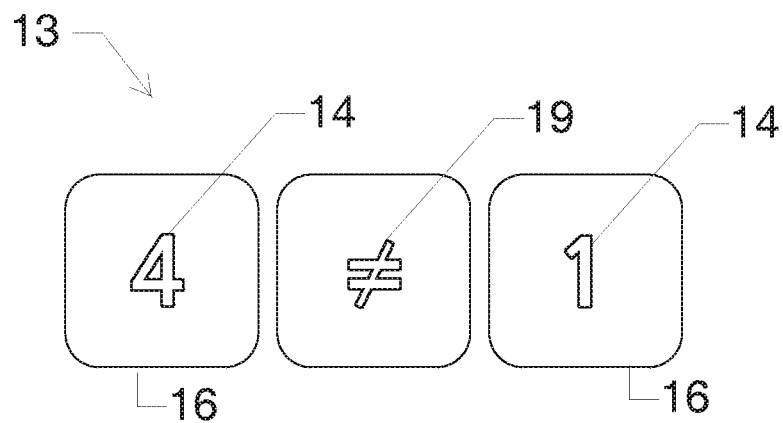
FIG. 36 shows cards of an example magnetic building set.

With instruction from a teacher, a student may explore the concepts of equality and inequality in mathematics using the building set 1 and cards 13 disclosed hereinabove. For example, the student may place a four-unit tray 2 and marker assembly 5 on the work surface. The student may then place a one-unit tray 2 and marker assembly 5 on the work surface near to but not touching the four-unit tray 2 such that they can be examined separately as two distinct representations of quantity, "4" and "1" respectively as shown in FIG. 34. Next, the teacher may ask the student to examine the four-unit and one-unit trays 2 on the work surface and to determine if they are the same or not the same. Naturally, they are not the same as "4" is not equal to "1". The teacher may ask the student to select a quantity card 16 for each of the two quantities present on the work surface, "4" and "1", and place them onto the work surface, each quantity card 16 being adjacent to its respective tray 2. At the discretion of the teacher or student, they may place the cards 13 on the work surface with the pictorial representation 15 of the tray 2 and marker assemblies 5 facing up FIG. 35 or the quantity numerals 14 facing up FIG. 26. The teacher may next offer the student the equality card 19 that has printed on a first side the equals sign and on a second side the slashed equal sign and explain that the equals sign means "the same" and that the slashed equals sign means "not the same." The teacher may then ask the student to place the equality card 19 onto the work surface between the two quantities cards 16 and with the side facing up that has printed thereon the slashed equals sign.

Figure 37:
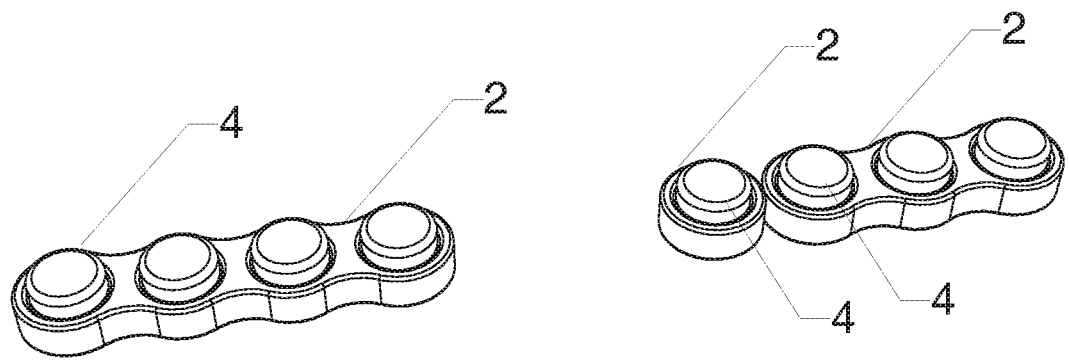
FIG. 37 shows trays and unit markers of an example magnetic building set.
Figure 38:
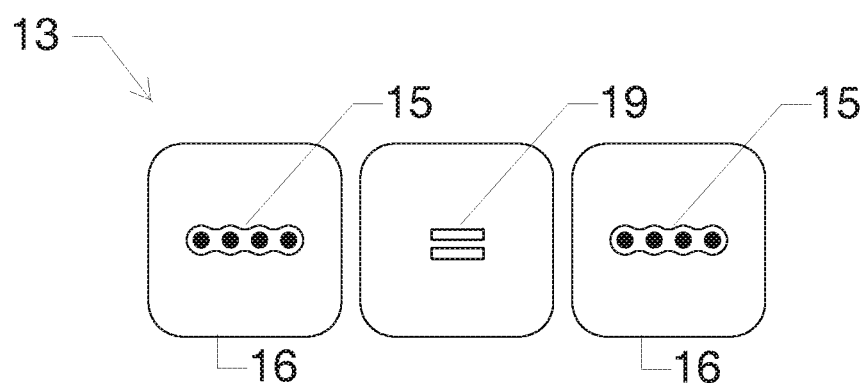
FIG. 38 shows cards of an example magnetic building set.
Figure 39:
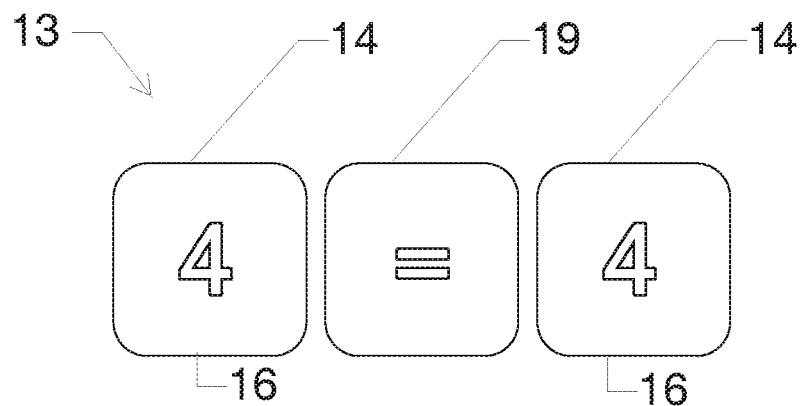
FIG. 39 shows cards of an example magnetic building set.
Figure 40:
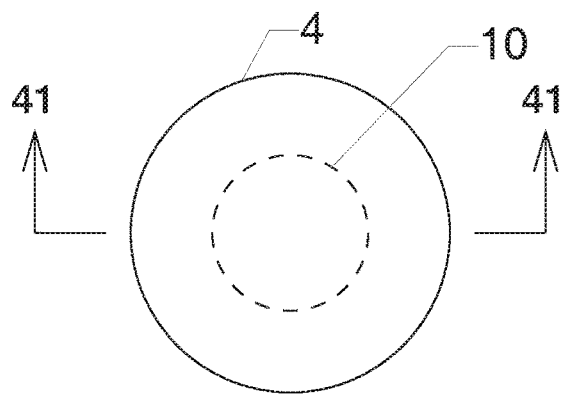
FIG. 40 shows a unit marker of an example magnetic building set.
Figure 41:
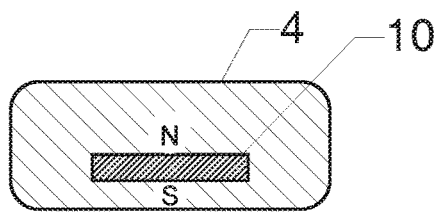
FIG. 41 shows a cutaway view of a unit marker of an example magnetic building set.
Figure 42:
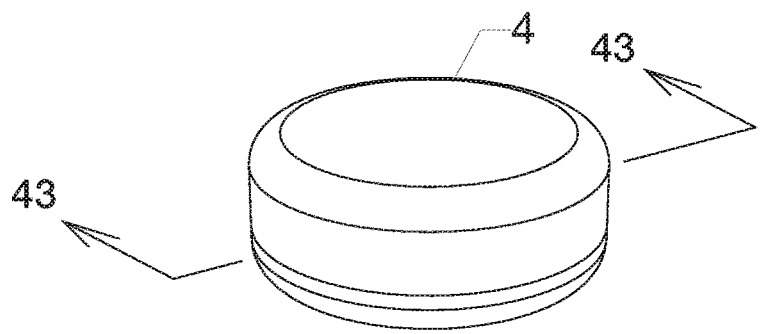
FIG. 42 shows a unit marker of an example magnetic building set.
Figure 43:
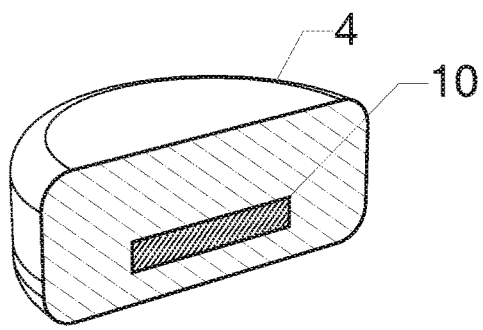
FIG. 43 shows a cutaway view of a unit marker of an example magnetic building set.
Figure 44:
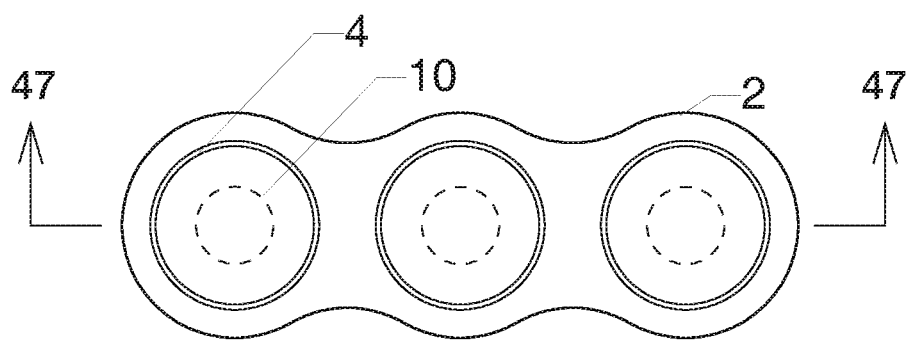
FIG. 44 shows a tray and unit markers of an example magnetic building set.
Figure 45:
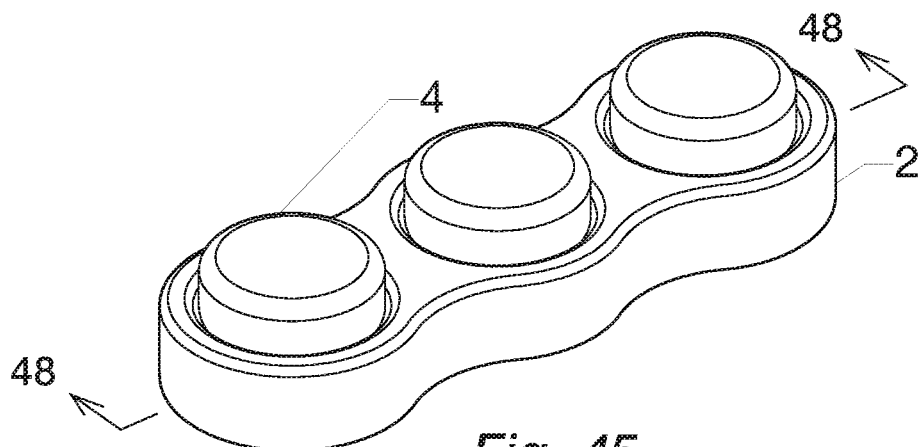
FIG. 45 shows a tray and unit markers of an example magnetic building set.
Figure 46:
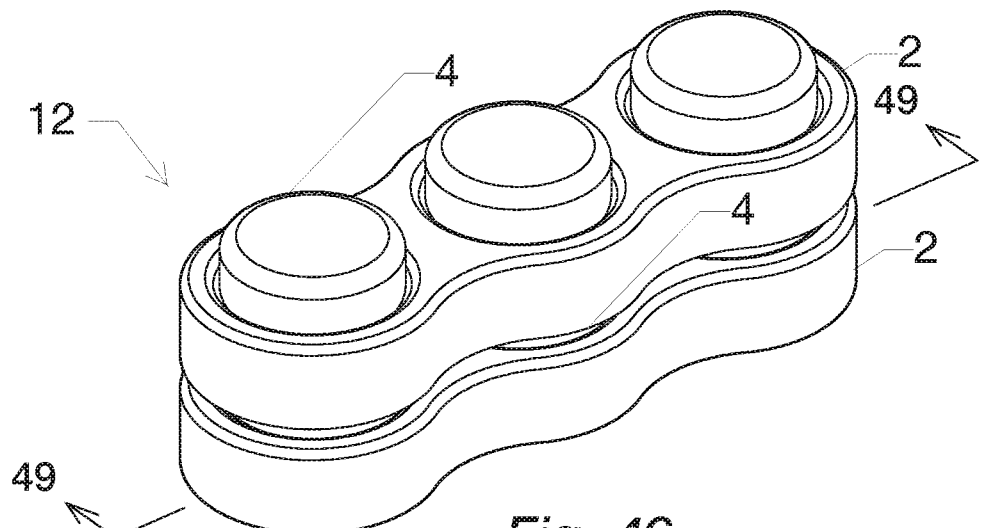
FIG. 46 shows a tray and unit markers of an example magnetic building set.
Figure 47:
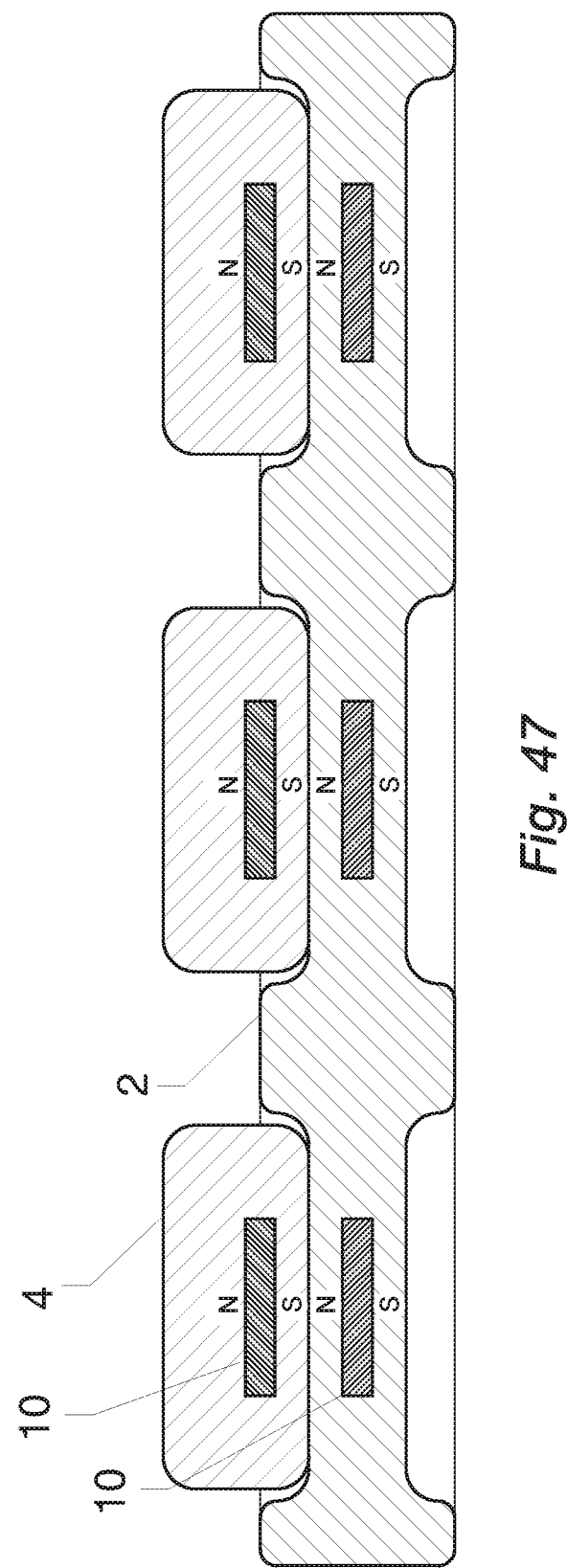
FIG. 47 shows a cutaway view of a tray and unit markers of an example magnetic building set.
Figure 48:
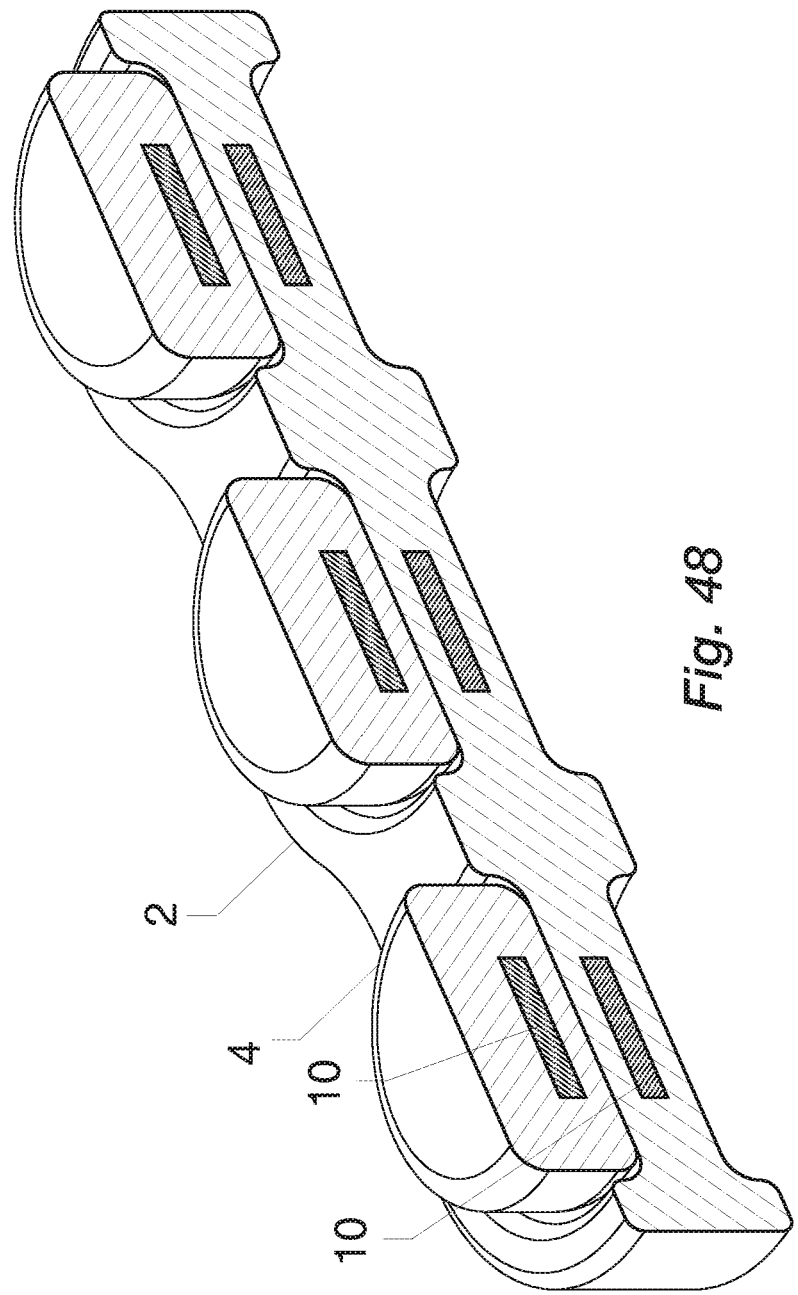
FIG. 48 shows a cutaway view of a tray and unit markers of an example magnetic building set.
Figure 49:
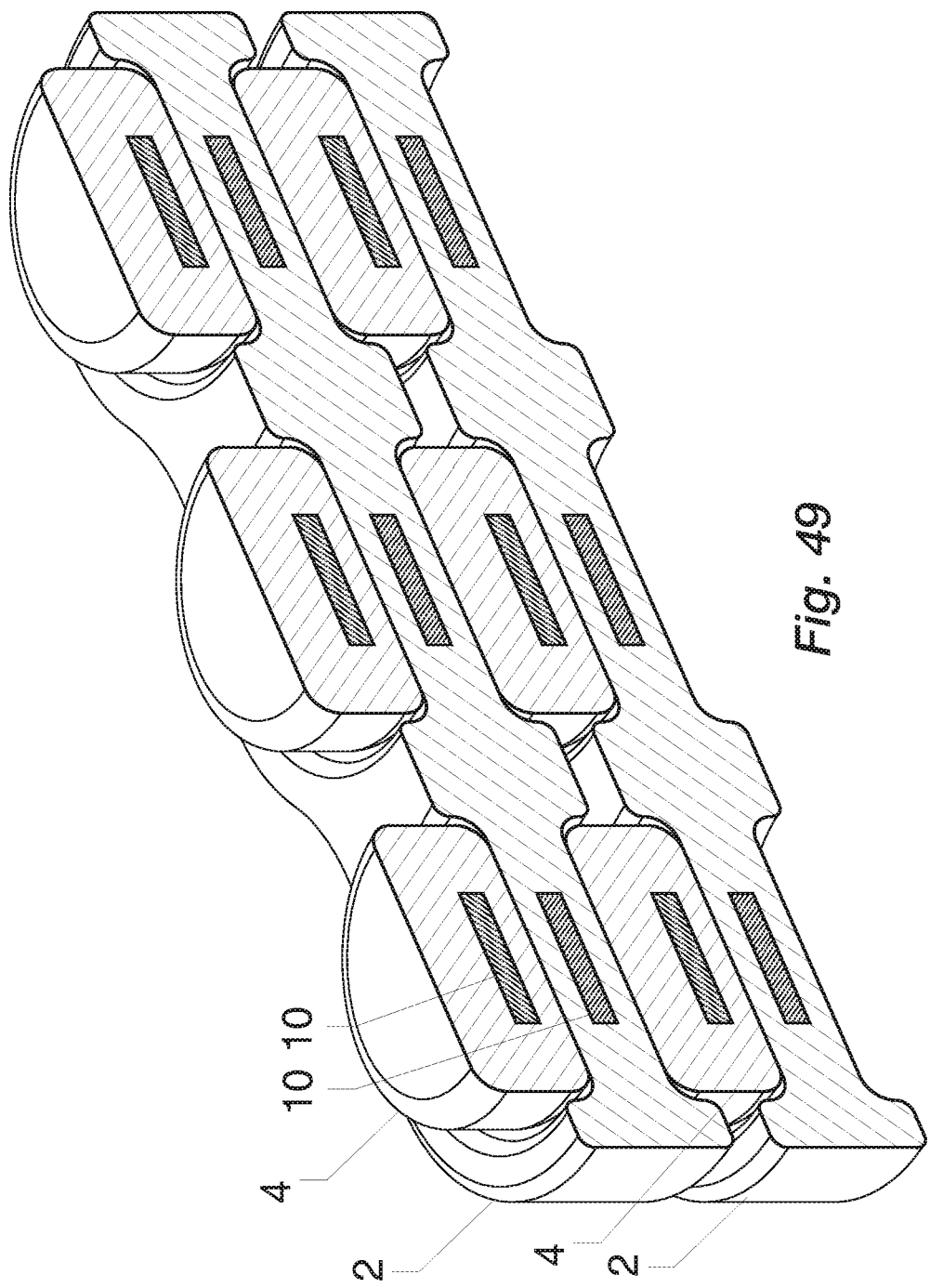
FIG. 49 shows a cutaway view of trays and unit markers of an example magnetic building set.

In the next phase of the exercise, the teacher may ask the student to examine the tray 2 and marker assemblies 5 on the work surface and try to determine what tray 2 or combination of trays 2 may be added to the one-unit tray 2 in order to arrive at the same quantity represented by the four-unit tray 2. There are multiple correct solutions to this challenge which invites the student to engage in divergent problem-solving. In the solution presented in FIG. 37, the student has selected a three-unit tray 2 and placed it adjacent to the one-unit tray 2 therefore equaling "4". When the two arrangements of tray and marker assemblies are equal, the teacher may instruct the student to flip the operator card 19 over, as shown in FIGS. 38 & 39 such that the equals sign is facing upward thus completing the exercise.

Offset Magnets within Markers.

As shown in FIGS. 40-61, in an example, some or all of the magnetic unit markers 4 provided in the building set can have the magnets 10 provided therein offset within the unit marker 4 body and biased towards one face of the marker 4 FIGS. 41, 43, 52 & 54. The offset magnet 10 in a unit marker 4 of this design can be positioned such that a first face of the magnet 10 lies closer to a first face on the exterior of the unit marker 4 than the second face of the magnet 10, which lies further from the second face on the exterior of the unit marker 4. The distance between the first exterior face of the unit marker 4 and the first face of the magnet 10 therein may be less than the distance between the second exterior face of the unit marker 4 and the second face of the magnet 10 therein. Therefore, the strength of the magnetic force measured at the first exterior face of the unit marker 4 may be stronger than the magnetic force measured at the second exterior face of the unit marker 4. When the first face of the unit marker 4, having a magnetic polarity of South is inserted into a corresponding indent 3 within a tray 2 having a magnetic polarity of North, the attractive force present between the first face of the unit marker 4 and the face of the indent 3 may be of a magnitude which we can call magnitude A. Conversely, when the second face of the unit marker 4, having a magnetic polarity of North is inserted into a corresponding indent 3 within a tray 2 having a magnetic polarity of South, the attractive force present between the second face of the unit marker 4 and the face of the indent 3 may be of a magnitude which we can call magnitude B. Magnitude A may be greater than magnitude B.

Figure 50:
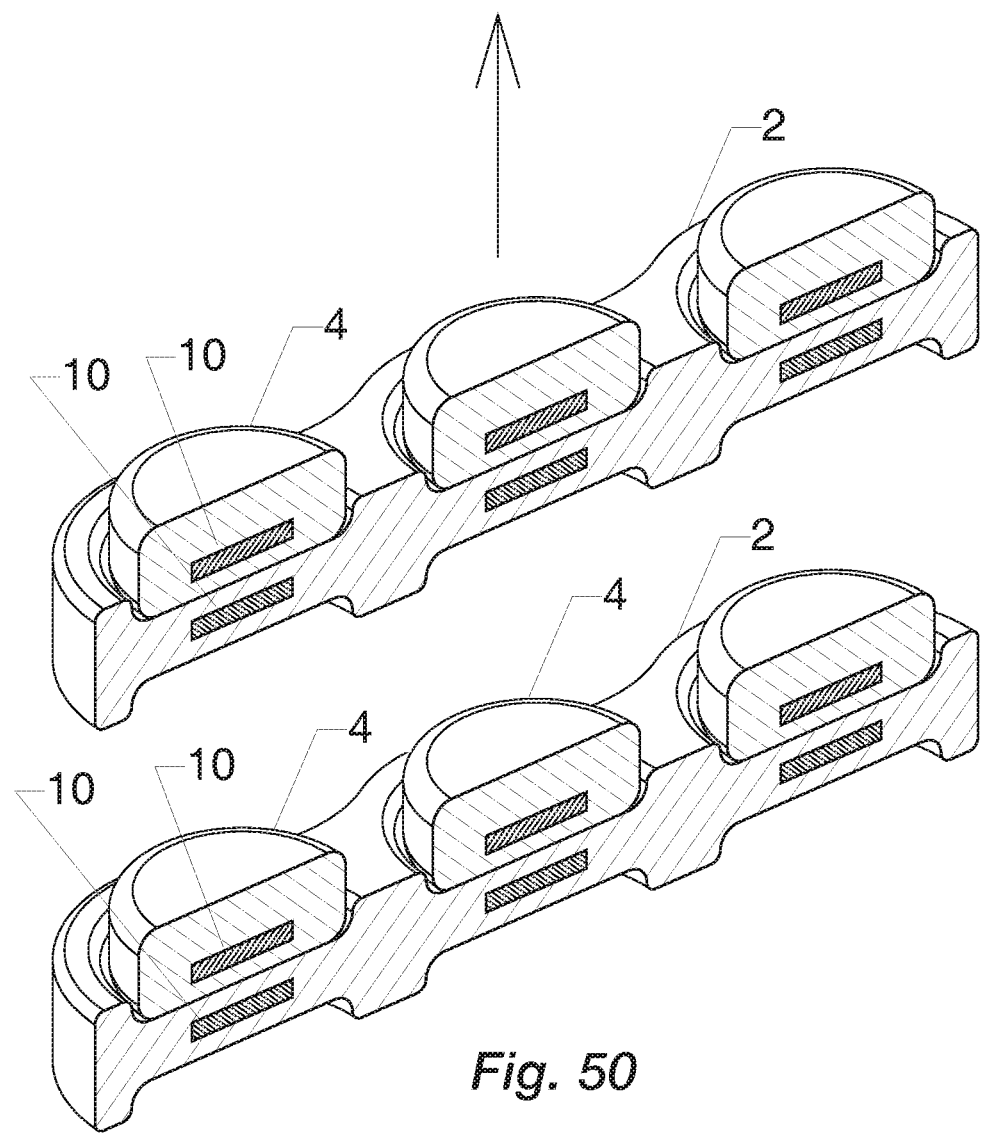
FIG. 50 shows a cutaway view of a tray and unit markers of an example magnetic building set.
Figure 51:
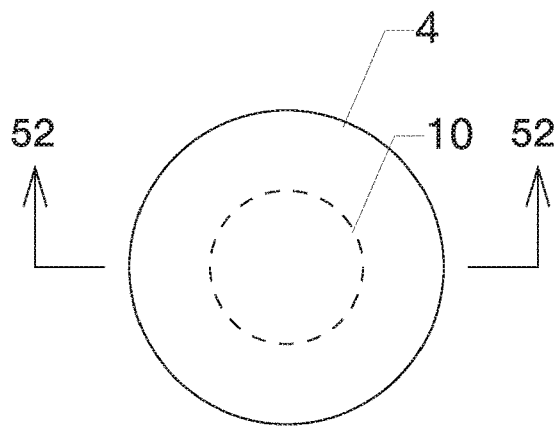
FIG. 51 shows a unit marker of an example magnetic building set.
Figure 52:
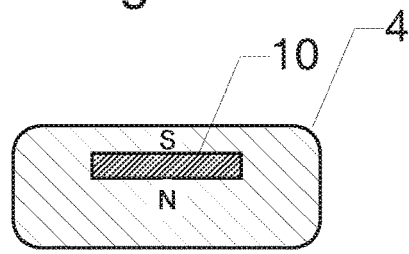
FIG. 52 shows a cutaway view of a unit marker of an example magnetic building set.
Figure 53:
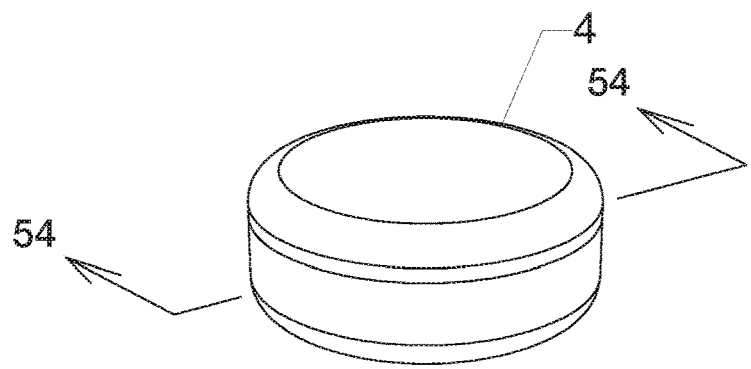
FIG. 53 shows a unit marker of an example magnetic building set.
Figure 54:
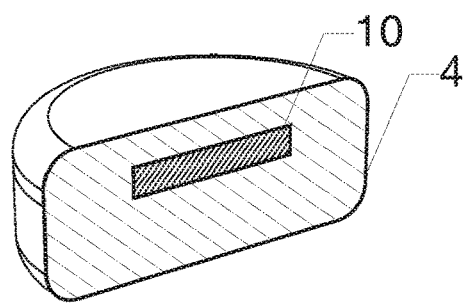
FIG. 54 shows a cutaway view of a unit marker of an example magnetic building set.
Figure 55:
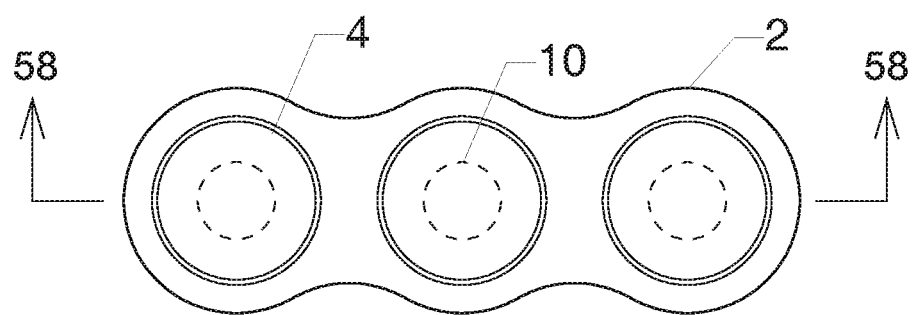
FIG. 55 shows a tray and unit markers of an example magnetic building set.
Figure 56:
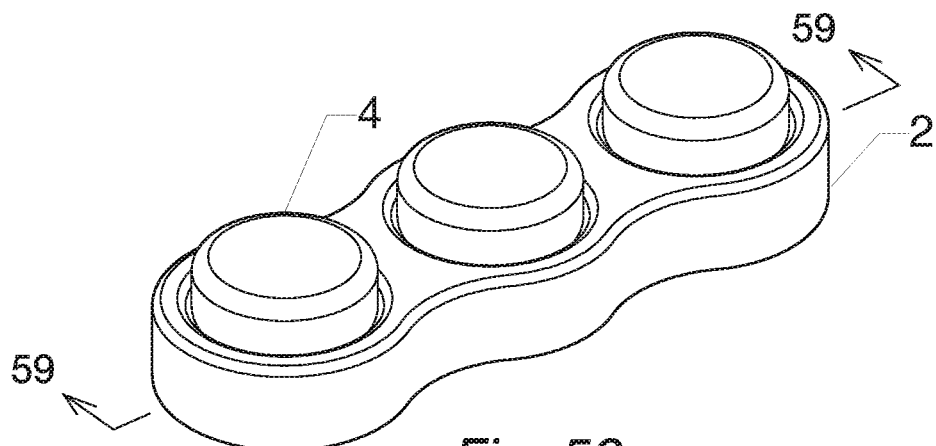
FIG. 56 shows a tray and unit markers of an example magnetic building set.
Figure 57:
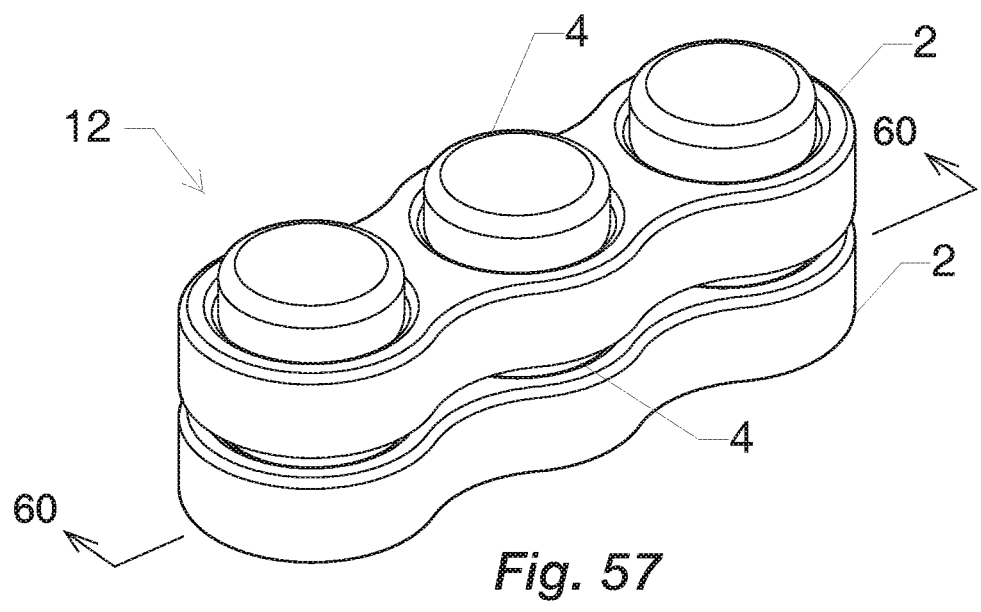
FIG. 57 shows trays and unit markers of an example magnetic building set.
Figure 58:
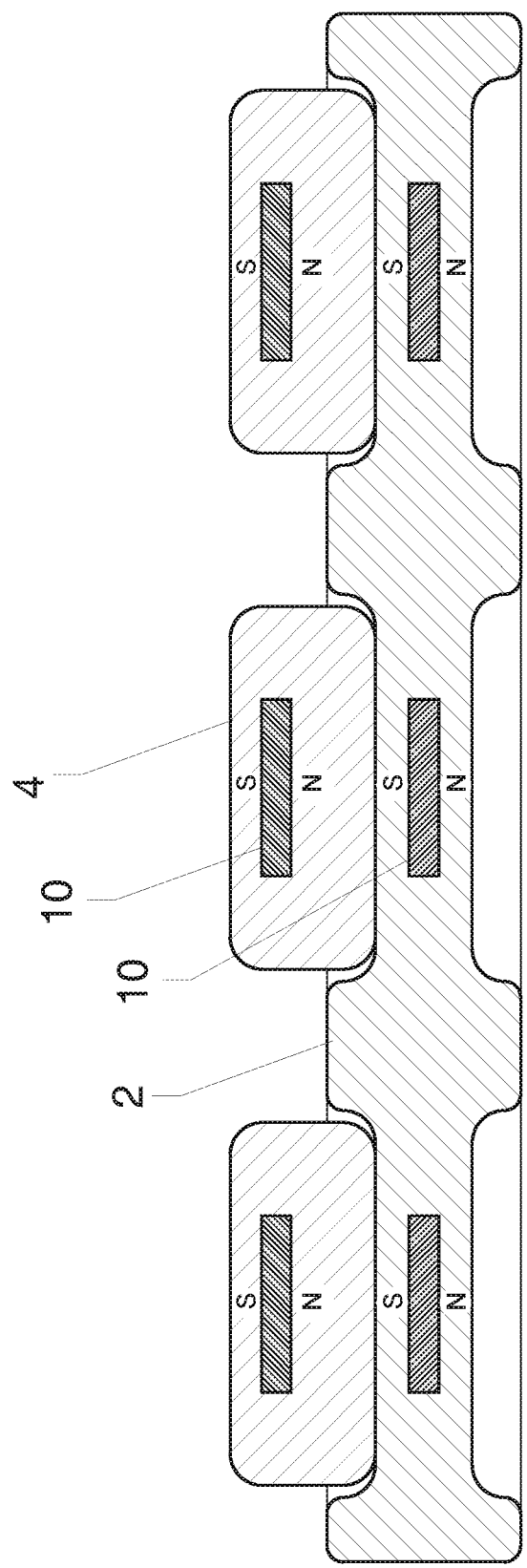
FIG. 58 shows a cutaway view of a tray and unit markers of an example magnetic building set.
Figure 59:
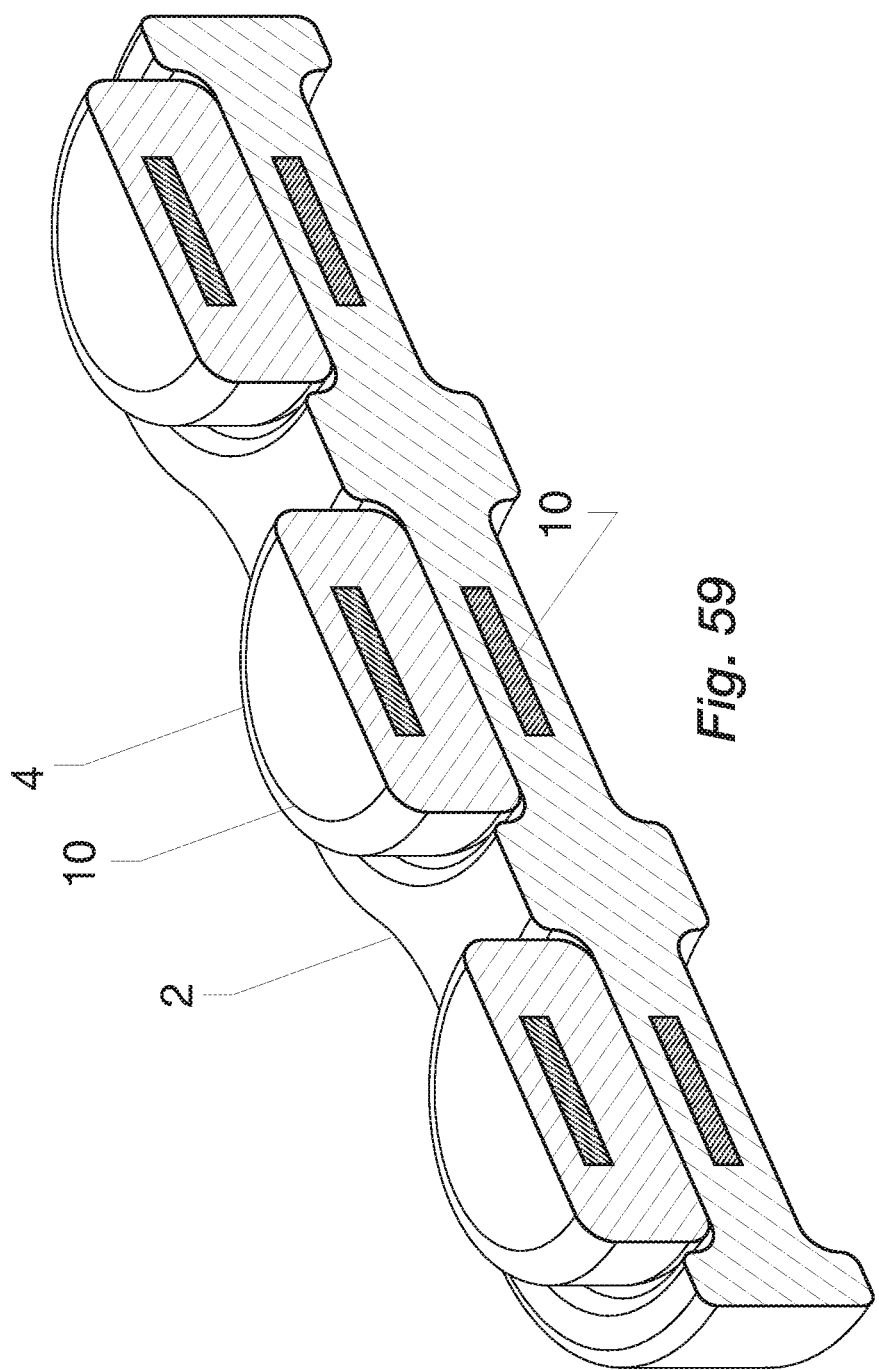
FIG. 59 shows a cutaway view of a tray and unit markers of an example magnetic building set.
Figure 60:
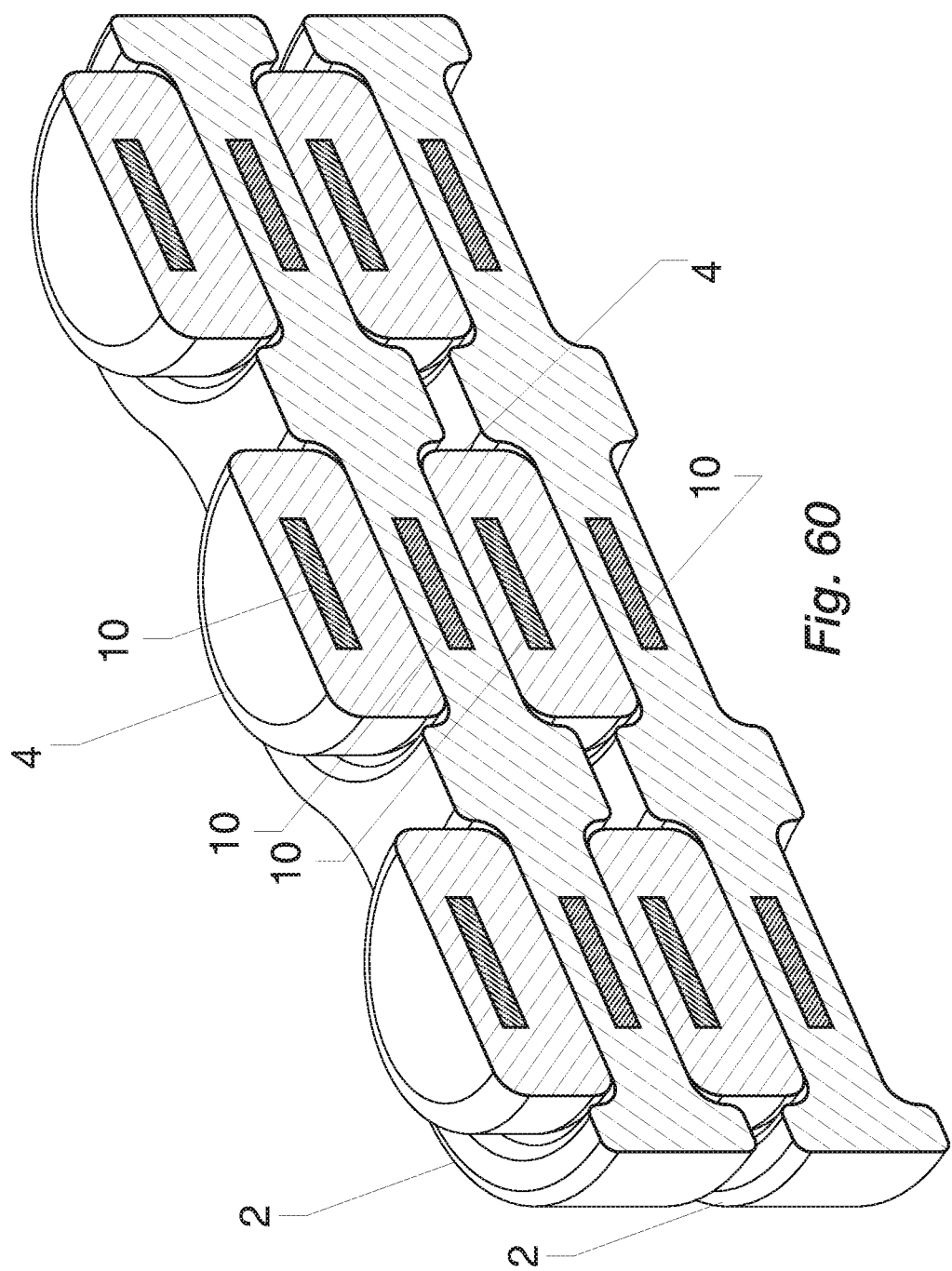
FIG. 60 shows a cutaway view of trays and unit markers of an example magnetic building set.

Two trays 2 can be stacked together with an intervening set of unit markers 4 with offset magnets 10 resting within the upward facing indents 3 of the first tray 2, which rests on a work surface, and accordingly resting in the downward facing indents 3 of the second tray 2 which have been stacked atop the unit markers 4. In this arrangement, the magnets 10 in both the trays 2 and the unit markers 4 may have their North poles facing upward and their South poles facing downward. The downward faces of the unit markers 4 and the faces of the indents 3 within the first tray 2 may have an attractive force of magnitude A. The upward faces of the unit markers 4 and the faces of the indents 3 within the second tray 2 may have an attractive force of magnitude B. When a student holds the first tray 2 secure to the work surface, grasps the second tray 2 and removes it from the tray assembly 12, the unit markers 4 are more likely to remain within the indents 3 of the first tray by nature of the relationship where magnitude A is greater than magnitude B as shown in FIG. 50.

Figure 61:
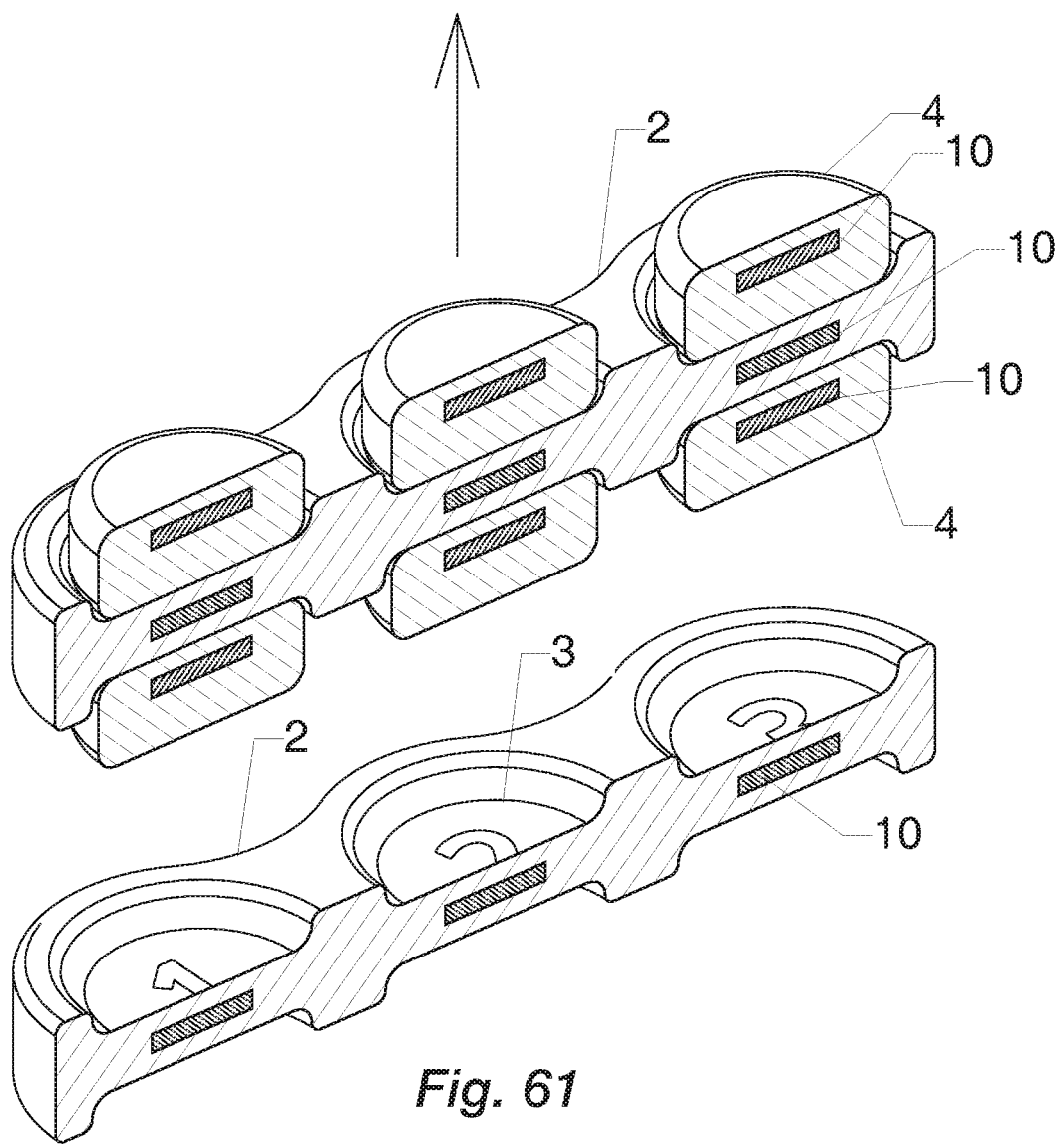
FIG. 61 shows a cutaway view of trays and unit markers of an example magnetic building set.
Figure 62:
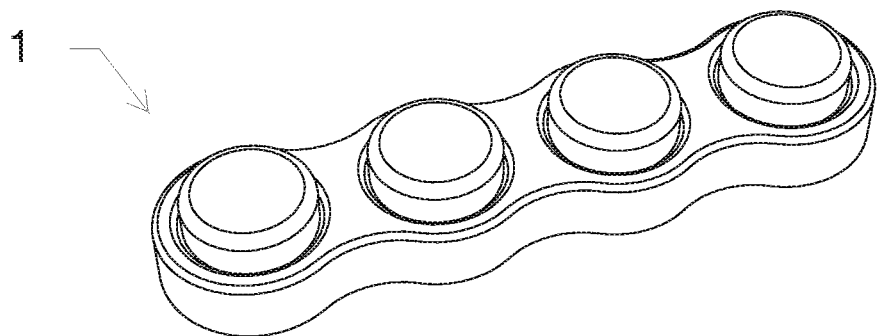
FIG. 62 shows a tray and unit markers of an example magnetic building set.
Figure 63:
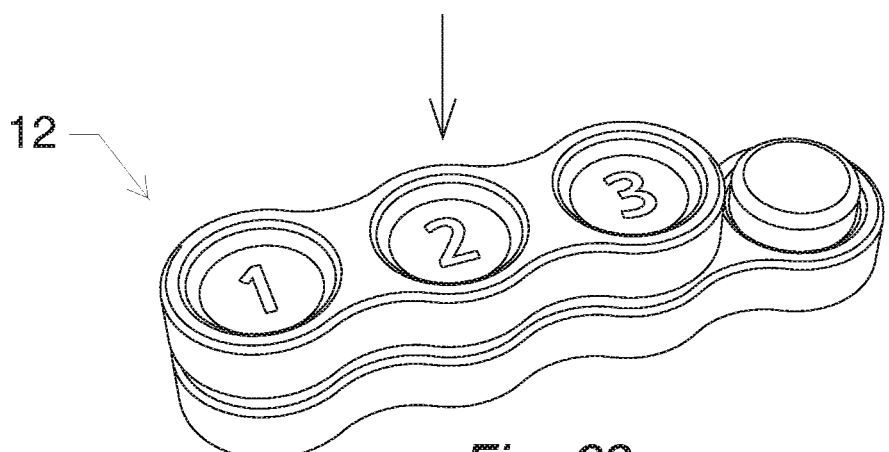
FIG. 63 shows trays and unit markers of an example magnetic building set.

Conversely, the entire two tray assembly 12 and unit marker assembly 5 just described can be reoriented such that the second tray 2 rests on the work surface and the first tray 2 is stacked atop the unit markers 5 resting within the upward facing indents 3 on the second tray 2. In this second arrangement, the magnets 10 in both the trays 2 and the unit markers 4 may have their South poles facing upward and their North poles facing downward. The downward faces of the unit markers 4 and the faces of the indents 3 within the second tray 2 may continue to have an attractive force of magnitude B. The upward faces of the unit markers 4 and the faces of the indents 3 within the first tray 2 may continue to have an attractive force of magnitude A. When a student holds the second tray 2 secure to the work surface, grasps the first tray 2 and removes it from the assembly 12, the unit markers 4 are more likely to remain within the downward facing indents 3 of the first tray 2 and be removed from the upward facing indents 3 of the second tray 2, again by nature of the relationship where magnitude A is greater than magnitude B, as shown in FIG. 61. The magnets 10 within the markers 4 and the magnets 10 within the trays 2 can be embedded such that their polarities are reversed, counter to those polarities disclosed above, and all functionality disclosed herein can be maintained.

Subtraction Operation Exercise.

As shown in FIGS. 61-67, with instruction from of a teacher, a student may learn to perform the subtraction operation of arithmetic using tray and unit marker assemblies 12. If desired, the teacher and student may augment the subtraction operation exercise using the quantity cards 16, operator cards 18, and equality cards 19 disclosed hereinabove. To begin the subtraction operation exercise, the student places on the work surface a first tray 2 that represents the quantity from which another quantity may be subtracted. The student places the tray 2 on the work surface such that magnets 10 therein have the South poles facing upward and the North poles facing downward. The student can then perform the counting exercise disclosed hereinabove whereby the student inserts unit markers 4 into the upward facing indents 3 of the first tray 2 while counting aloud for each unit marker 4 that has been inserted FIG. 62. The student may implement unit markers 4 whereby the magnets 10 are centered within the marker body or the student may implement unit markers 4 whereby the magnets 10 are offset within the marker body as previously disclosed. In an example of the subtraction exercise, the student implements the unit markers 4 which have their magnets offset within their bodies.

The student inserts the unit markers 4 into the indents 3 in the first tray 2 such that the faces of the markers 4 with the greater distance between exterior marker face and interior magnet 10 are resting within the indents 3. The North poles of the magnets 10 within the unit markers 4 inserted may be facing downward and attracted to the upward facing South poles of the magnets 10 within the indents 3 within the first tray 2. The attractive force between the faces of the markers 4 and the faces of the indents 3 in which they are resting provides an attractive force which we have called magnitude B hereinabove. The South poles of the magnets 10 within the unit markers 4 may be facing upward.

Next, the student may select the quantity card 16 that equals the quantity of unit markers 4 within the indents 3 of the first tray 2 and place it onto the work surface with the side which has been printed with a pictorial representation 15 of the first tray facing upwards. The teacher may then present to the student the sign operator card 17 that has the minus sign printed thereon. The student can then place the minus operator card 17 adjacent to the first quantity card 16.

Continuing with the subtraction exercise, the student next chooses a second tray 2 that represents the quantity that may be subtracted from the first tray 2 and of a lesser quantity than is represented by the first tray 2. The student can then stack the second tray 2 atop the assembly 12 of unit markers and first tray such that the unit markers 4 within the first tray 2 are inserted into the indents 3 in the underside of the second tray 2. The magnets 10 within the indents 3 in the second tray 2 may have their North poles facing downward and may be attracted to the upward-facing South poles of the magnets within the unit markers 4 by a force we have called magnitude A hereinabove. Because the distance between the upward facing exterior faces of the unit markers 4 and the interior magnets 10 within the bodies of the markers 4 is the lesser distance, the magnets 10 within the unit markers 4 and the magnets 10 within the indents 3 of the second tray 2 are in closer proximity to each other than are the magnets 10 within the unit markers 4 and the magnets 10 within the indents 3 of the first tray 2. Magnitude A may be greater than magnitude B.

Figure 66:
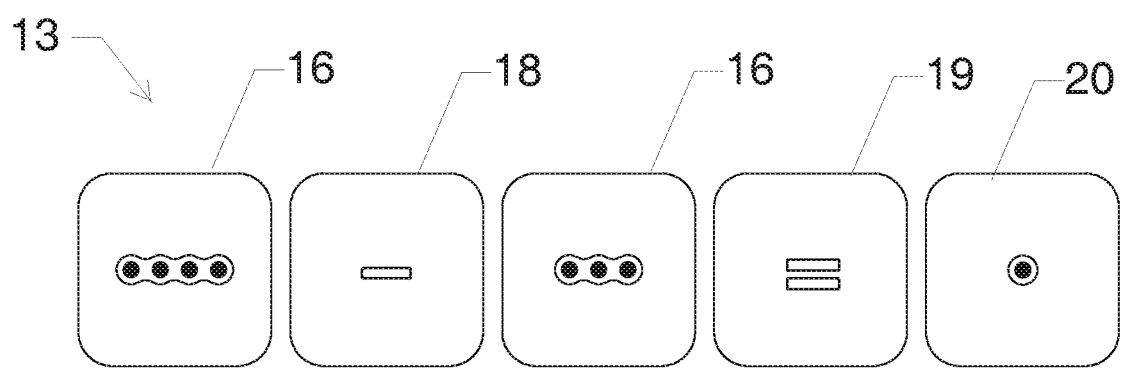
FIG. 66 shows cards of an example magnetic building set.
Figure 67:
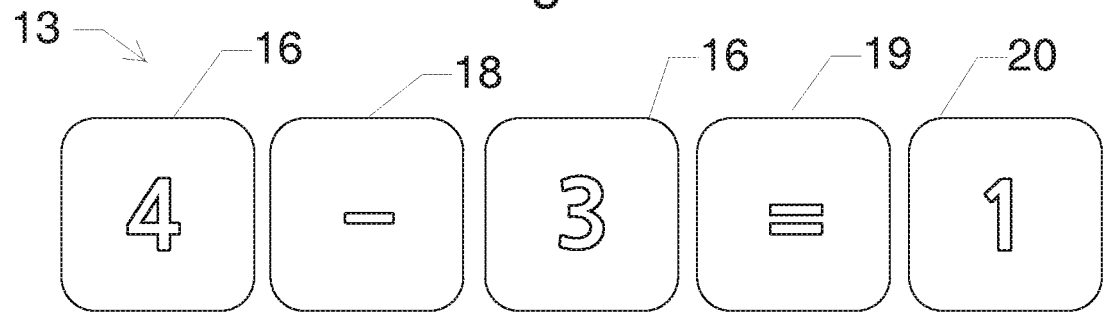
FIG. 67 shows cards of an example magnetic building set.
Figure 68:
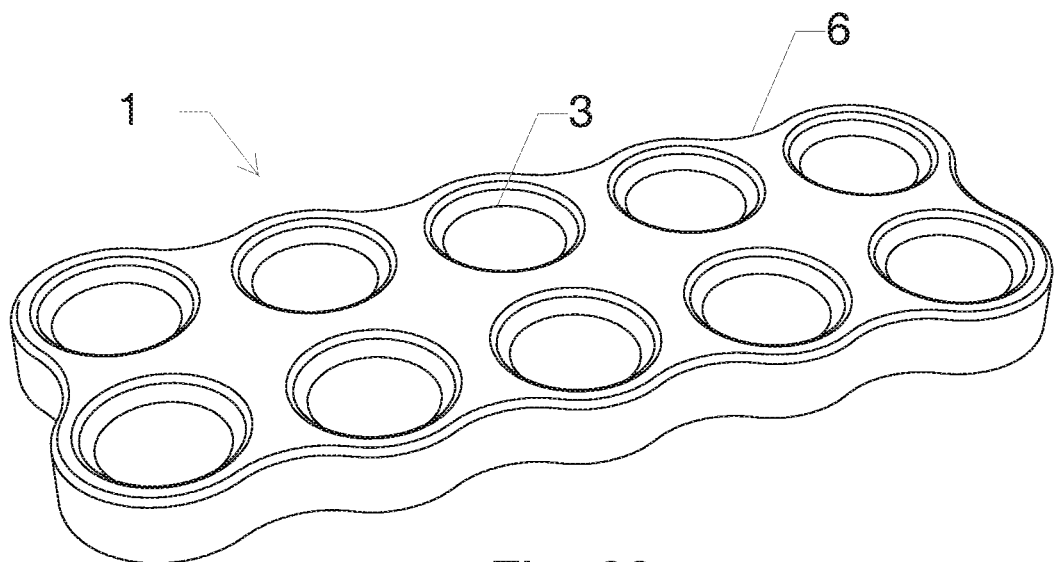
FIG. 68 shows a ten-frame of an example magnetic building set.
Figure 69:
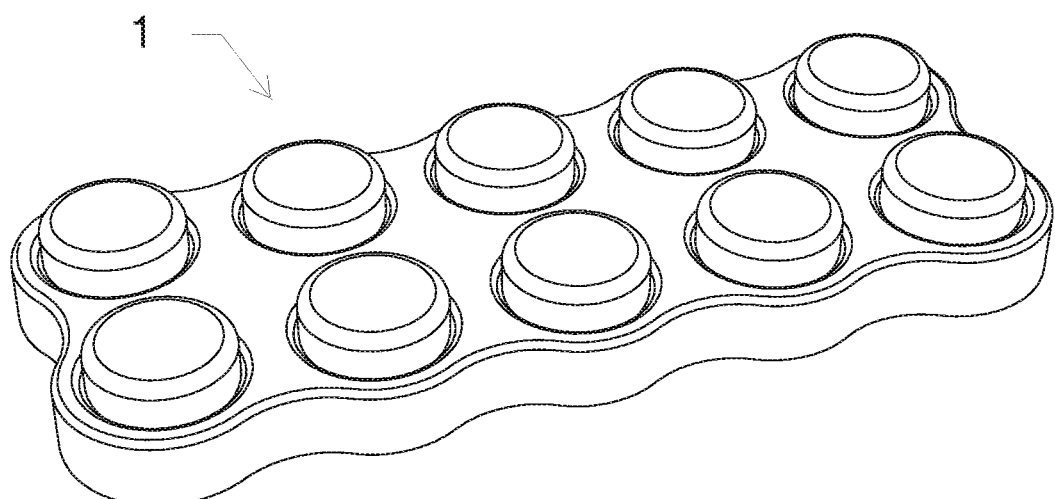
FIGS. 69-71 show a ten-frame and unit markers of an example magnetic building set.
Figure 70:
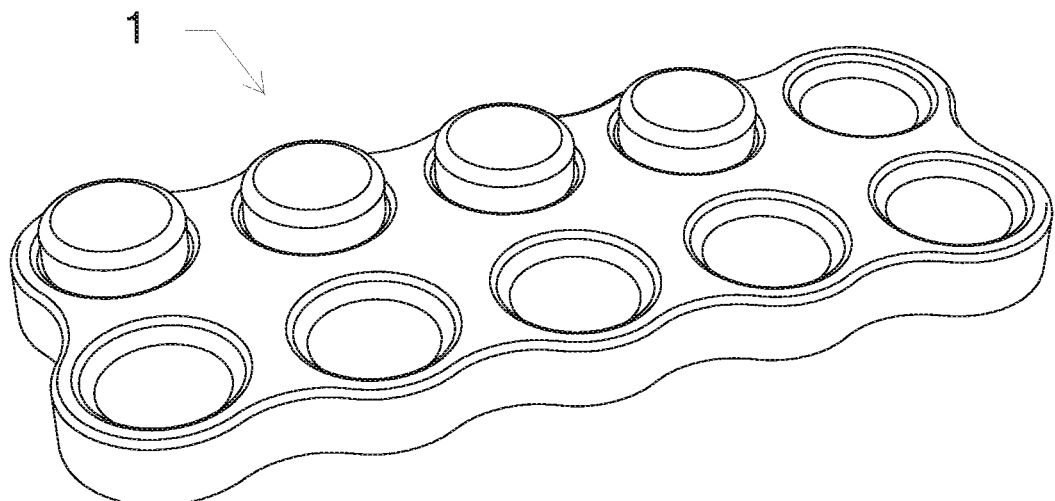
Figure 71:
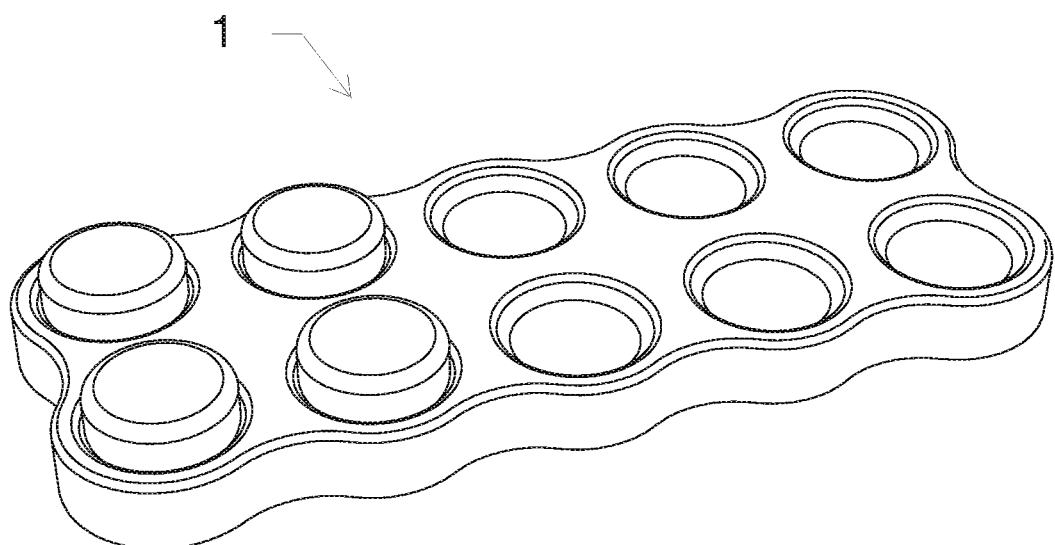
Figure 72:
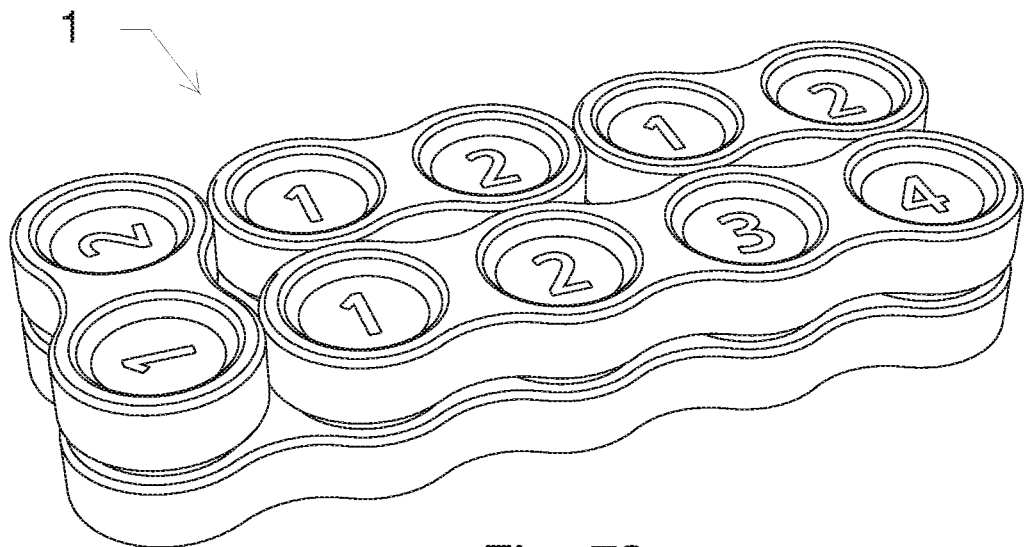
FIGS. 72-75 show trays and unit markers of an example magnetic building set.
Figure 73:
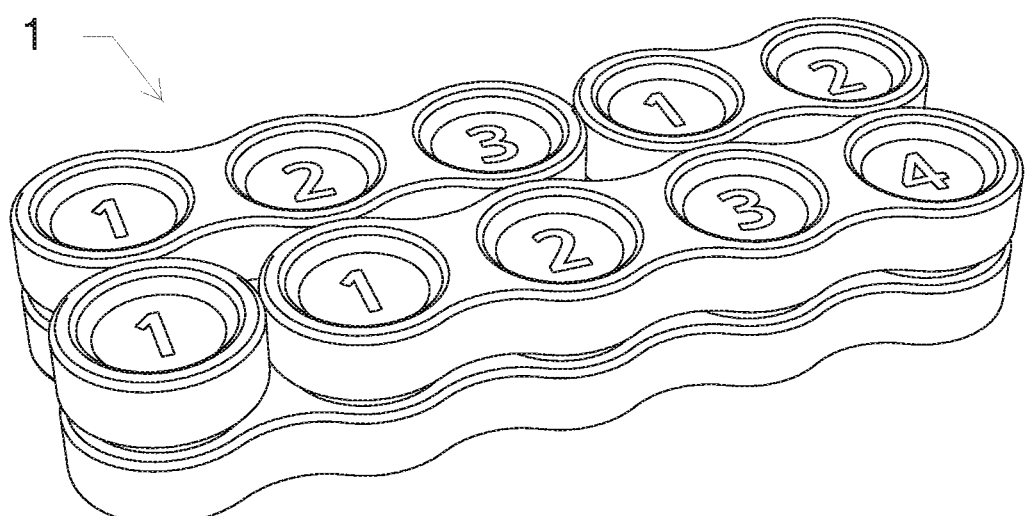
Figure 74:
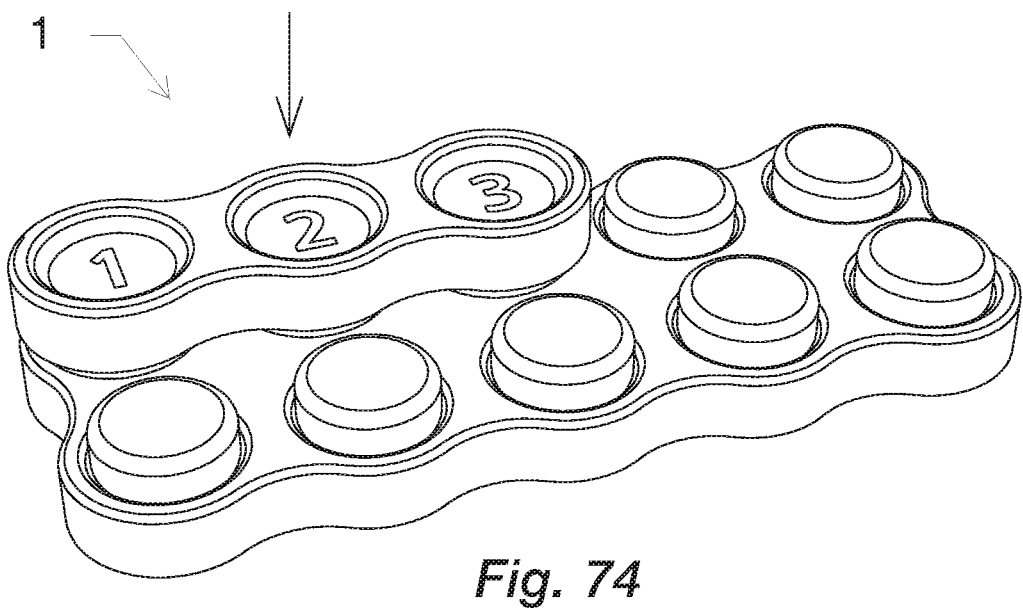
Figure 75:
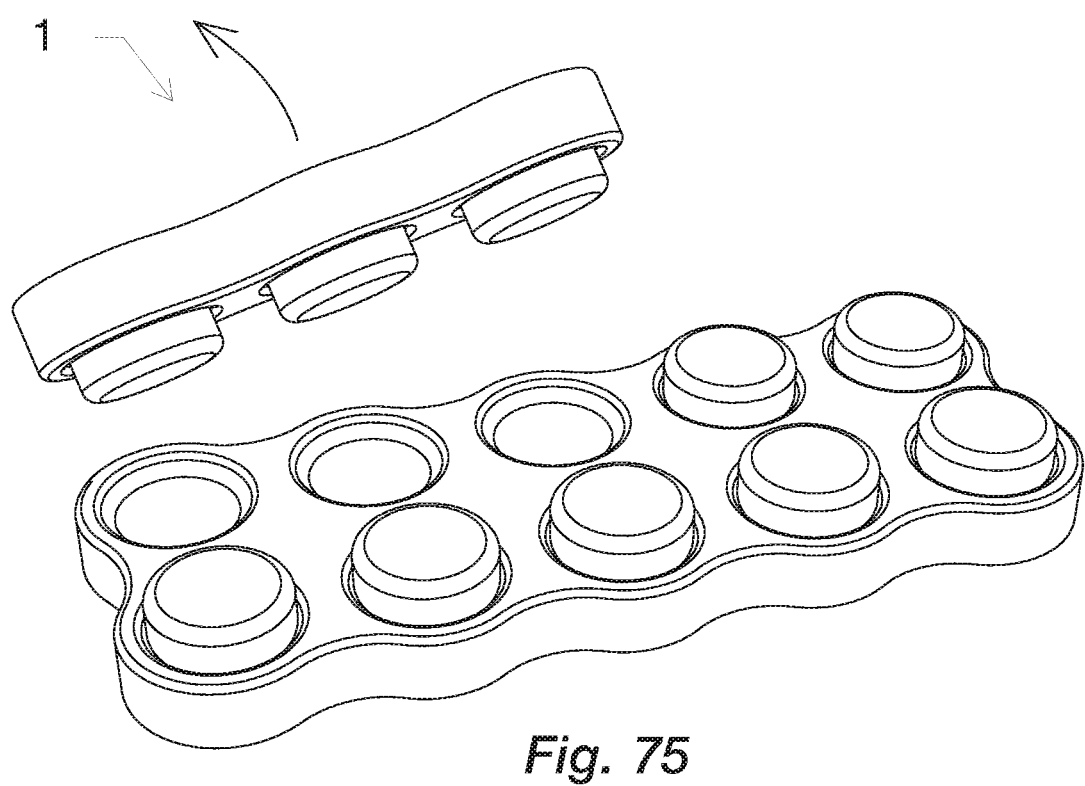
Figure 76:
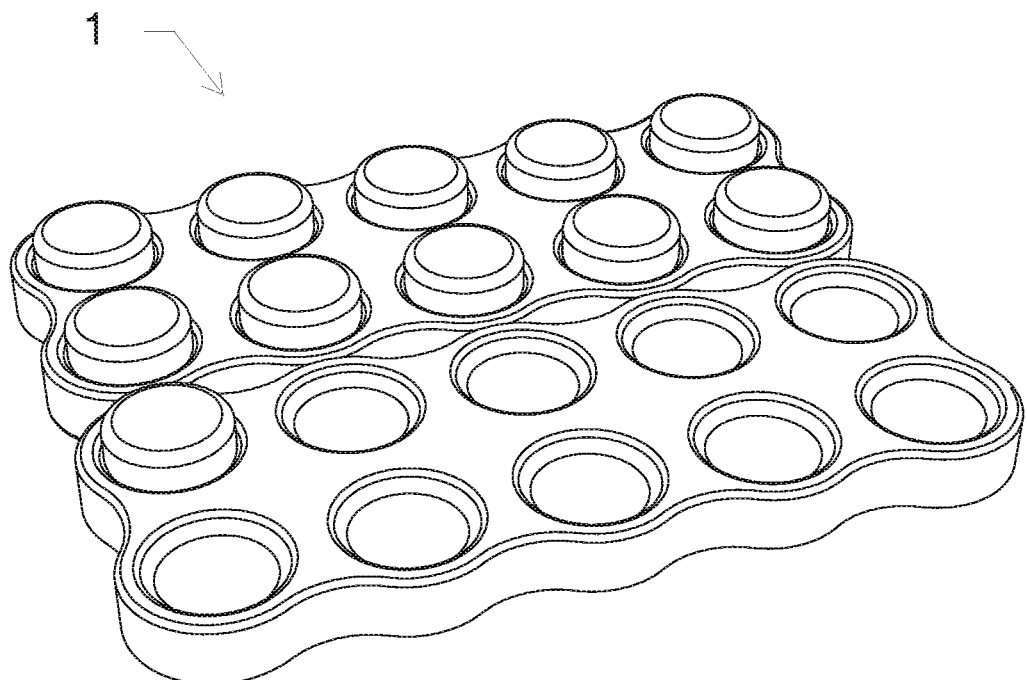
FIG. 76 shows ten-frames and unit markers of an example magnetic building set.

Next the student may select a second quantity card 16 that equals the quantity of indents 3 within the second tray 2 and place it onto the work surface such that the side which has been printed with a pictorial representation 15 of the second tray 2 is facing upwards and the quantity card 16 is adjacent to the minus operator card 17. The teacher can next present to the student the equals sign card 19 and instruct them to place the card 19 on the work surface adjacent to the second quantity card 16. Looking at the present arrangement of cards 13 on the work surface, the student may have placed a first quantity card 16 followed by a minus sign operator card 17 followed by a second quantity card 16 and followed finally by an equals sign card 19 as illustrated in FIG. 66.

At this stage in the subtraction exercise, the student may have created on the work surface an assembly 12 including a first tray 2, unit markers 4 inserted therein and a second tray 2 of a lesser represented quantity than the first tray 2 which has been stacked atop the unit markers 4 within the first tray 2. Referring at the arrangement of trays 2 and unit markers 4, the teacher may point out to the student that a certain quantity of unit markers 4 has been covered by the second tray 2 and a certain quantity of unit markers 4 have not been covered by the second tray 2 and are still clearly visible FIG. 63. The teacher may then instruct the student to count the quantity of unit markers 4 that are clearly visible and not covered by the second tray 2. The quantity of unit markers 4 clearly visible and not covered by the second tray 2 represents the solution to the subtraction operation exercise. This stage of the exercise can also be illustrated with standard positions for the magnets 10, meaning those positions not offset within the bodies of the markers 4.

Figure 64:
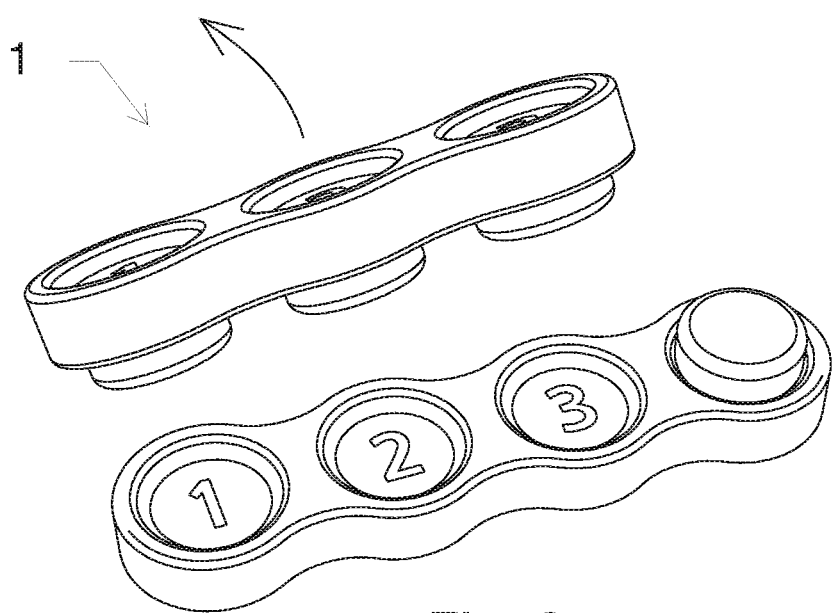
FIG. 64 shows trays and unit markers of an example magnetic building set.
Figure 65:
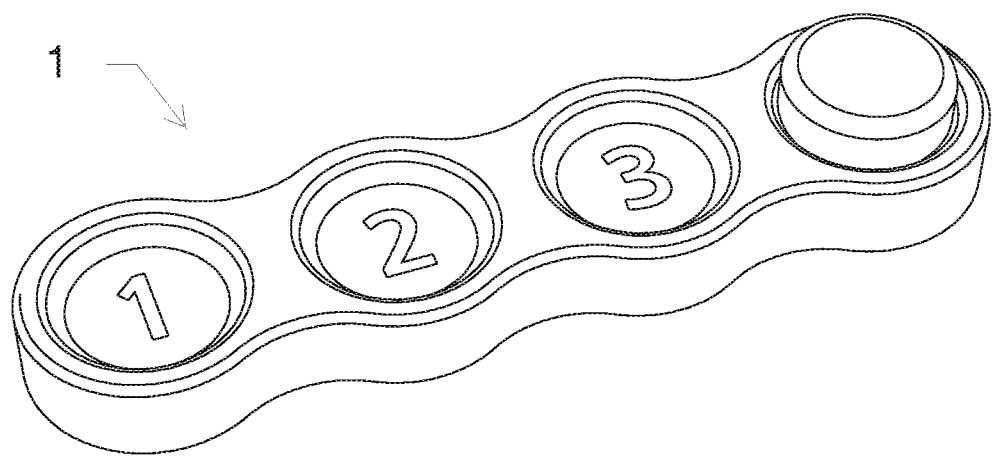
FIG. 65 shows a tray and unit marker of an example magnetic building set.

To further illustrate the subtraction operation, the student may hold the first tray 2 securely to the work surface with a first hand and then grasp the second tray 2 and remove it from the assembly 12 with a second hand. By nature of the relationship between the offset magnets 10 within the markers 4 to the magnets 10 within the indents 3 within the trays 2, and whereby magnitude A is greater than magnitude B, the unit markers 4 are more likely to remain within the downward facing indents 3 of the second tray 2 and to be removed from the upward facing indents 3 within the first tray 2 as shown in FIG. 64. The quantity of unit markers 4 represented by the second tray 2 and within the indents 3 of the second tray 2 has been taken away from the quantity of unit markers 4 represented by the first tray 2 and within the indents 3 of the first tray 2. The second tray 2 can be set aside on the work surface. The teacher now instructs the student to count the unit markers 4 that remain within the indents 3 within the first tray 2. As shown in FIG. 65, the quantity of unit markers 4 that remain in the first tray 2 represents the solution to the subtraction operation exercise.

The teacher next instructs the student to select a quantity card 16 which equals the quantity of markers 4 remaining in the first tray 2, and thus becomes the solution card 20. The student can place the solution quantity card 20 adjacent to the equals sign card 19 FIG. 66. The teacher may now instruct the student to flip the quantity cards 16 over such that the sides which have been printed with the numeral representation 14 of the quantities are facing upwards FIG. 67. The teacher and student may discuss the significance of the numeral quantity cards 16 and their relationship to the quantity represented by the first tray 2, the quantity represented by the second tray 2, the quantity of unit markers 4 removed from the first tray 2 and resting within the second tray 2, and finally the quantity of unit markers 4 remaining in the first tray 2 after the completion of the subtraction operation.

In other examples, exercises may implement more than one tray 2 for the quantities in the operation. For example, 7 minus 6 implements a 5 tray and a 2 tray on the bottom, and a 5 tray and a 1 tray on the top to be implemented for the subtraction. Still other examples are also contemplated which will be readily understood by those having ordinary skill in the art after becoming familiar with the teachings herein.

Ten-Frame Tray and Exercises.

Ten-frames are common educational devices implemented to illustrate quantities up to and including ten. Ten-frames are provided in a variety of forms and materials such as paper, cardboard, plastic, wood or other suitable material. The common feature of all ten-frames is a frame, grid or other configuration having ten holes, slots, grid cells, or other form of divisions, typically arranged in two rows of five. A ten-frame has two rows of five, totally ten cells. Five-frames have one row of five such divisions. In the example of a ten-frame, a student may draw dots in the grid cells if the ten-frame is printed on paper. In other forms, a student may manipulate counters by placing them within the divisions on a ten-frame.

As shown in FIGS. 68-79, A ten-frame tray 6 can be provided with the building set 1. This tray 6 may be configured to have a total of ten indents 3 arranged in two rows of five on a first side, and a total of ten indents 3 arranged in two rows of five on a second side. In accordance with the design of the trays 2 previously disclosed, the ten-frame tray 6 may have magnets 10 embedded within the indents 3 in the tray 6. A student may place unit markers 4 within the indents 3 of the ten-frame tray 6 in a variety of arrangements that prompt further understanding of representations of quantity within the ten-frame tray 6. A student may place unit markers 4 in a first column to represent a quantity up to and including five. A student may place unit markers 4 in rows of two to represent even quantities up to and including ten. A teacher may illustrate to the student how when an odd number greater than one is represented by a quantity of unit markers within the indents 3 in the ten-frame tray 6, there can be a row of two unit markers 4 or a plurality of rows of two unit markers 4, followed by a row that contains a single unit marker 4. The building set 1 disclosed provides a benefit whereby trays 2 can be stacked atop the unit markers 4 within the indents 3 of the ten-frame tray 6 to further illustrate to a student the concepts of number composition and number decomposition within the context of the quantity ten represented by the ten-frame tray 6. The building set 1 disclosed also provides a further benefit whereby unit markers 4 with offset magnets 10 can be inserted into the indents 3 within the ten-frame tray 6 and in concert with a tray 2 stacked atop the unit markers 4 and as disclosed hereinabove in the subtraction operation exercise, be implemented to subtract or take away a quantity of unit markers 4 from the ten-frame tray 6.

Quantities greater than ten can be representing by placing a first ten-frame tray 6 on a work surface, placing a second ten-frame tray 6 adjacent to the first ten-frame tray 6, and inserting unit markers 4 into both ten-frame trays 6. Quantities greater than ten can also be represented by placing a ten-frame tray 6 on a work surface and then placing one or more unit-trays 2 adjacent to the ten-frame tray 6 and inserting unit markers 4 into the indents 3 within all the trays 2 and 6.

A pictorial representation of the ten-frame tray 6 can be included in the pictures 15 printed on the quantity cards 16 disclosed hereinabove, to represent the quantity ten, either by itself or as a component of a larger quantity, for example whereby a pictorial representation 15 of a ten-frame tray 6 is printed on a quantity card 16 adjacent to a pictorial representation 15 of a one-unit tray printed on the quantity card 16 which counted together represent the quantity "11".

Place Value Trays and Large Numbers.

As shown in the examples in FIGS. 80-87, the building set 1 can be provided with specialized trays 2 for teaching the mathematical concept of place value, large number modeling and the operations of addition and subtraction with large numbers. In an example, a ten-frame tray 6 can be provided that has printed, painted, debossed, etched or otherwise inscribed in every indent 3 the numeral "1" and may represent the ones place value. Another ten-frame tray 6 can be provided that has printed, painted, debossed, etched or otherwise inscribed in every indent 3 the numeral "10" and may represent the tens place value. Yet another ten-frame tray 6 can be provided that has printed, painted, debossed, etched or otherwise inscribed in every indent 3 the numeral "100" and may represent the hundreds place value. Still another ten-frame tray 6 can be provided that has printed, painted, debossed, etched or otherwise inscribed in every indent 3 the numeral "1000" and may represent the thousands place value. These special ten-frame trays 6 may be referred hereafter to as place value trays 21.

In another example, to represent place value numbers "1000" and higher, the abbreviation for kilo using the letter "k" may be implemented in the markers and/or indents 3. For example, the indicia 7 within the indents 3 in the thousands place value tray 21 may be written as "1 k." Proceeding logically, place value trays 21 may be provided for 10 k and 100 k. To model numbers in the millions, the abbreviation for million using the letter "m" may be implemented in the tray indents 3. In an example, the place value trays 21 can be oriented vertically whereby the indents 3 form two vertical rows of five and indicia 7 in the indents are inscribed such that they can be read when the place value tray 21 is positioned in the preferred orientation.

A specialized tray 2 can be provided that has inscribed within the indents 3 a sequence of place value numerals starting with the numeral "1" in the right-most indent and increasing by a factor of 10 in each successive indent in a right-to-left direction. This tray can be hereafter referred to as the solution tray 22. For example, a solution tray 22 may be provided with an indicium 7 of the number "1" in a first indent 3 that sits at the right-most indent position, an indicium 7 of the number "10" in a second indent 3 that sits to the left of the first indent 3, an indicium 7 for the number "100" in a third indent 3 that sits to the left of the second indent 3 and an indicium for the number "1000" in a fourth indent 3 that sits to the left of the third indent 3. In an example, the solution tray 22 may be oriented horizontally on a work surface so that the indicia 7 may be read from left to right or from right to left depending on the exercise being undertaken by the student.

The solution tray 22 may be positioned on a work surface at the top of the arrangement of solution trays 22 and place value trays 21. The place value trays 21 may be positioned in a vertical orientation and below the solution tray 22 on the work surface. The place value trays 21 may be positioned such that their place value representations proceed sequentially in the same manner as do the place value indicia 7 in the solution tray 22 and in a right-to-left direction whereby the ones place value tray 21 sits in the right-most position, the tens place value tray 21 sits to the left of the ones place value tray and continuing until all place value trays 21 have been positioned on the work surface. An arrangement of a solution tray 22 and corresponding place value trays 21 may be referred to herein as a place value tray arrangement 23.

Place Value and Large Number Exercises.

Figure 81:
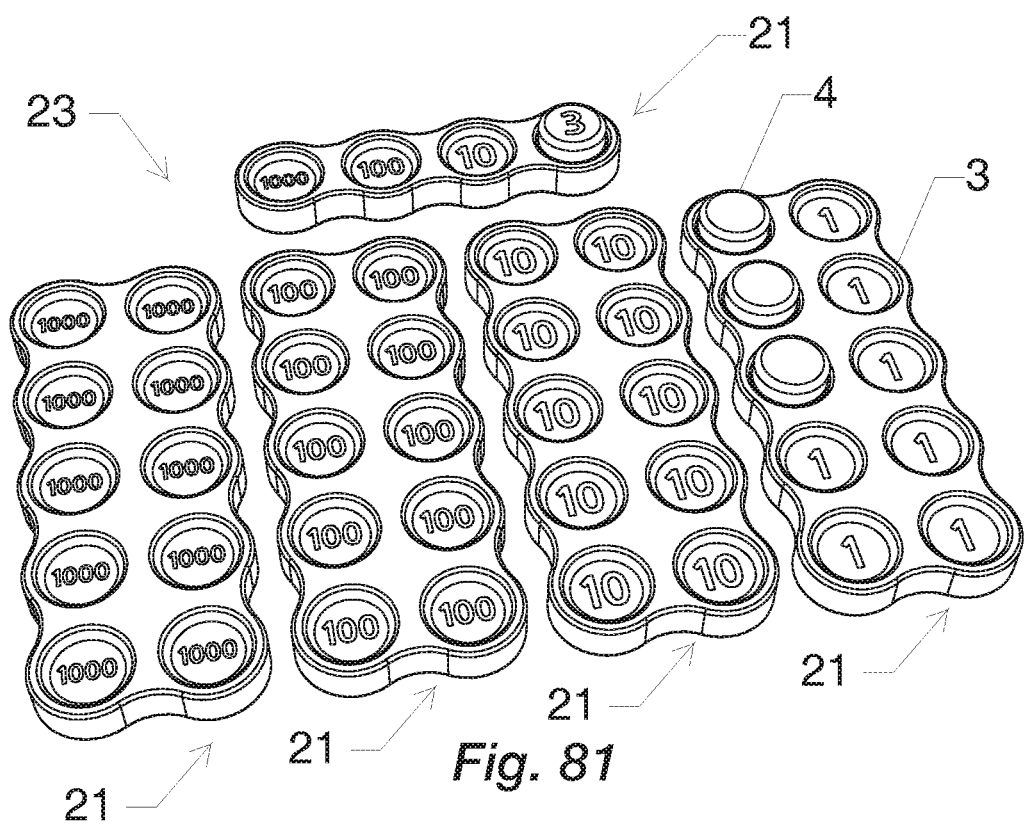
FIG. 81 shows place value trays and unit markers of an example magnetic building set.
Figure 82:
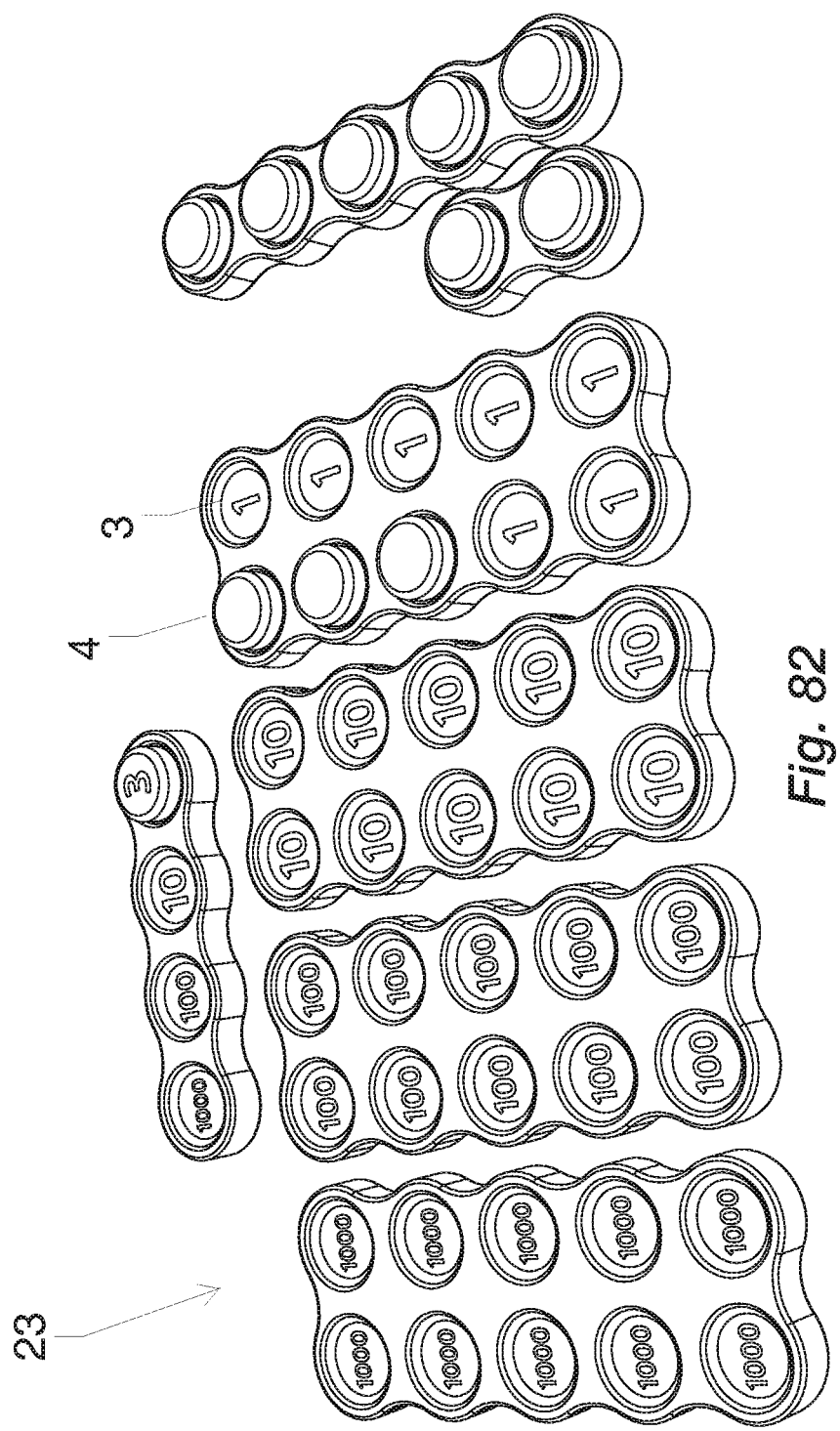
FIG. 82 shows trays, place value trays, and unit markers of an example magnetic building set.
Figure 83:
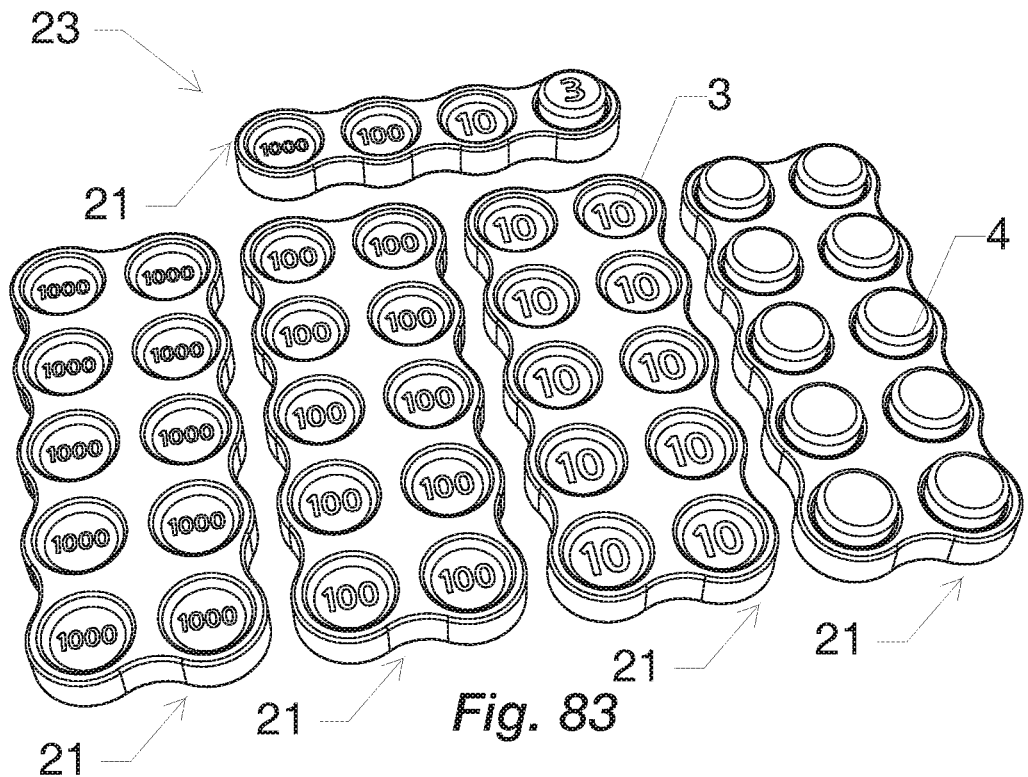
FIGS. 83-87 show place value trays and unit markers of an example magnetic building set.

With instruction from of a teacher, a student may implement the place value tray arrangement 23 in combination with markers 4 to model large numbers, learn the mathematical concept of place value and perform the operations of addition and subtraction on large numbers. In order to model numbers using the place value tray arrangement 23, a student may place markers 4 into the indents 3 starting with the ones place value tray 21 and proceeding to place markers 4 in the successive place value trays 21 until the large number has been modelled. During this process, the student may be instructed to count the markers 4 in each place value tray 21. Next the student selects a marker 4 that has been inscribed with the numeral representing the counted quantity and inserts the selected marker 4 into the indent 3 in the solution tray 22 that corresponds to the place value tray 21 that has been counted. For example, a student may model the number "3" by first inserting three markers 3 into the ones place value tray and then by selecting a marker 4 that has been inscribed with the numeral "3" and finally inserting the marker 4 inscribed with the numeral "3" into the ones place value indent 3 in the solution tray 22 as shown in FIG. 81.

Figure 84:
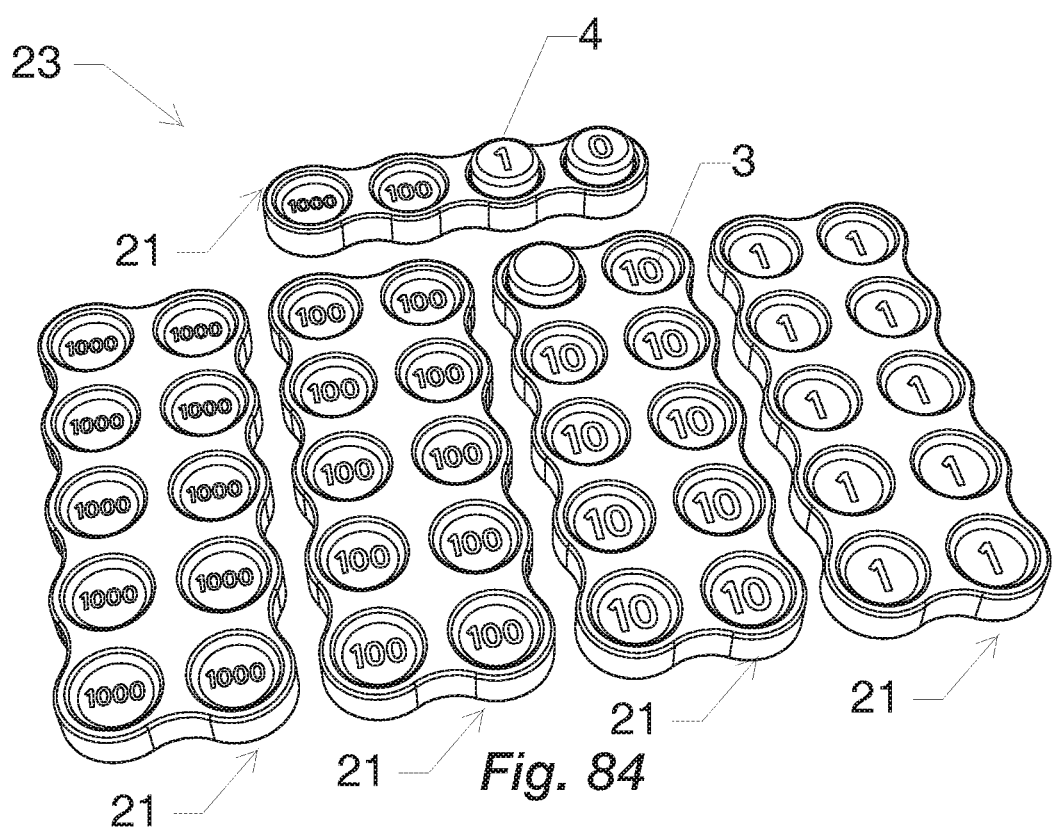

Continuing, a student may perform addition using the place value tray arrangement 23 and markers 4. For example, using FIG. 81 as a starting point, a student may select a five-unit tray 2 and a two-unit tray 2 which together represent the quantity "7". The student begins by removing individual markers 4 from the five-unit and two-unit trays 2 and inserting them into the ones place value tray 21. As may be easily ascertained, the resulting number of adding "7" to "3" is "10". The student may see that the ones place value ten-frame tray 21 is completely filled with markers 4 and the markers 4 in the tray number 10. At this stage in the exercise, the teacher may illustrate to the student the concept of place value and the process of regrouping, also known as "carrying over" numbers from a lower place value into the next higher place value. To make this point, the teacher may describe to the student how a completely filled place value ten-frame tray 21 in a first place value can be converted to a single marker 4 in the next higher place value. For example, the teacher may instruct the student to remove all 10 markers 4 from the ones place value tray 21 and then insert a single marker into the tens place value tray 21. At this stage in the exercise, the solution tray 22 may contain a single marker 4 inscribed with the numeral "3" resting in the ones place value indent 3. The teacher may then instruct the student to resolve the solution tray 22 by first counting the quantity of markers 4 in the ones place value tray 21. As the student has removed all markers 4 from the ones tray, the quantity is zero. The teacher instructs the student to select the marker 4 that has inscribed thereon the numeral "0" and insert the marker 4 into the ones place value indent 3 in the solution tray 22. Continuing for the tens place value, the student may count the quantity of markers 4 resting in the indents 3 in the tens place value ten-frame tray 21 which in this exercise may be a single marker 4 representing the quantity 10. Finally, the student may select a marker 4 that has been inscribed with the numeral "1" and place it into the tens place value indent 3 in the solution tray 22 as shown in FIG. 84.

Modelling Large Numbers.

Figure 85:
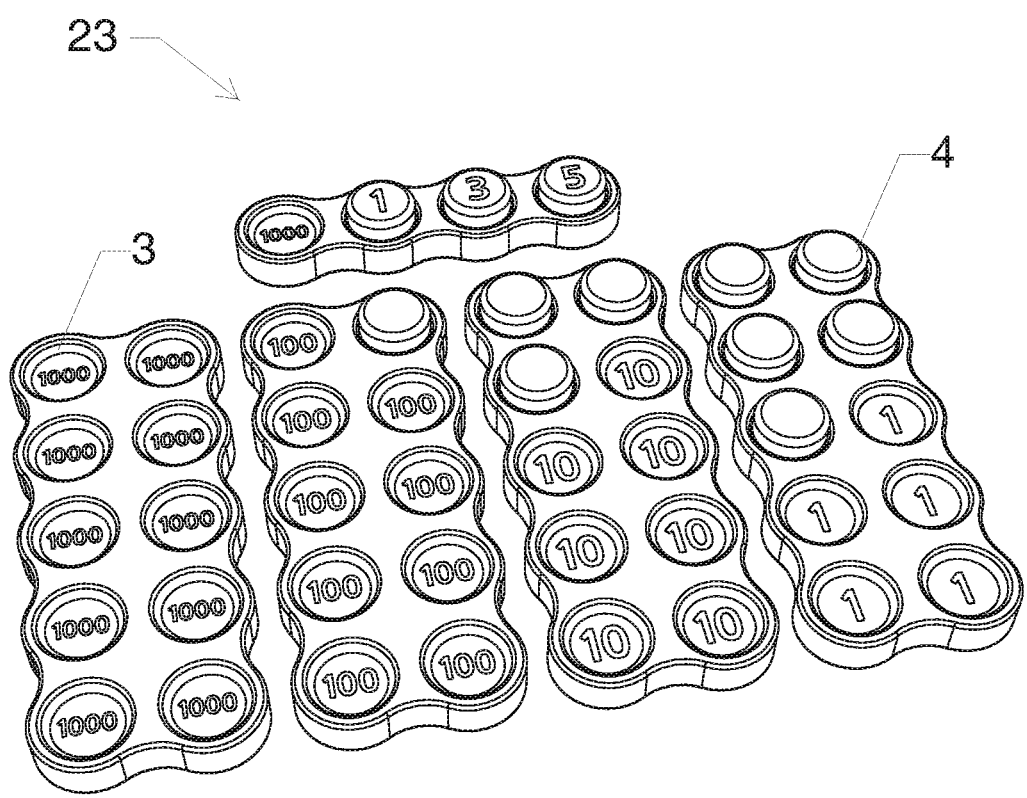

In an example, the place value tray arrangement 23 and markers 4 may be implemented to model large numbers, as shown in FIG. 85. Three markers 4 with numerals inscribed thereon rest in the indents 3 in the solution tray 22. In the hundreds place value indent 3, there rests a marker 4 with the numeral "1" inscribed thereon. In the tens place value indent 3, there rests a marker 4 with the numeral "3" inscribed thereon. And finally, in the ones place value indent 3, there rests a marker 4 with the numeral "5" inscribed thereon. Reading the solution tray 22 from left to right illustrates the large number "135". The markers 4 in the place value trays 21 correspond to the quantity represented in the solution tray 22. In the hundreds place value ten-frame tray 21 rests a single marker 4 corresponding to the numeral "1" inscribed on the marker 4 resting in the hundreds place value indent 3 in the solution tray 22. In the tens place value ten-frame tray 21 rests three markers 4 that correspond to the numeral "3" inscribed on the marker resting in the tens place value indent 3 in the solution tray 22. Finally, in the ones place value ten-frame tray 21 rests 5 markers that correspond to the numeral "5" inscribed on the marker resting in the ones place value indent 3 in the solution tray 22.

Addition of Large Numbers.

Figure 86:
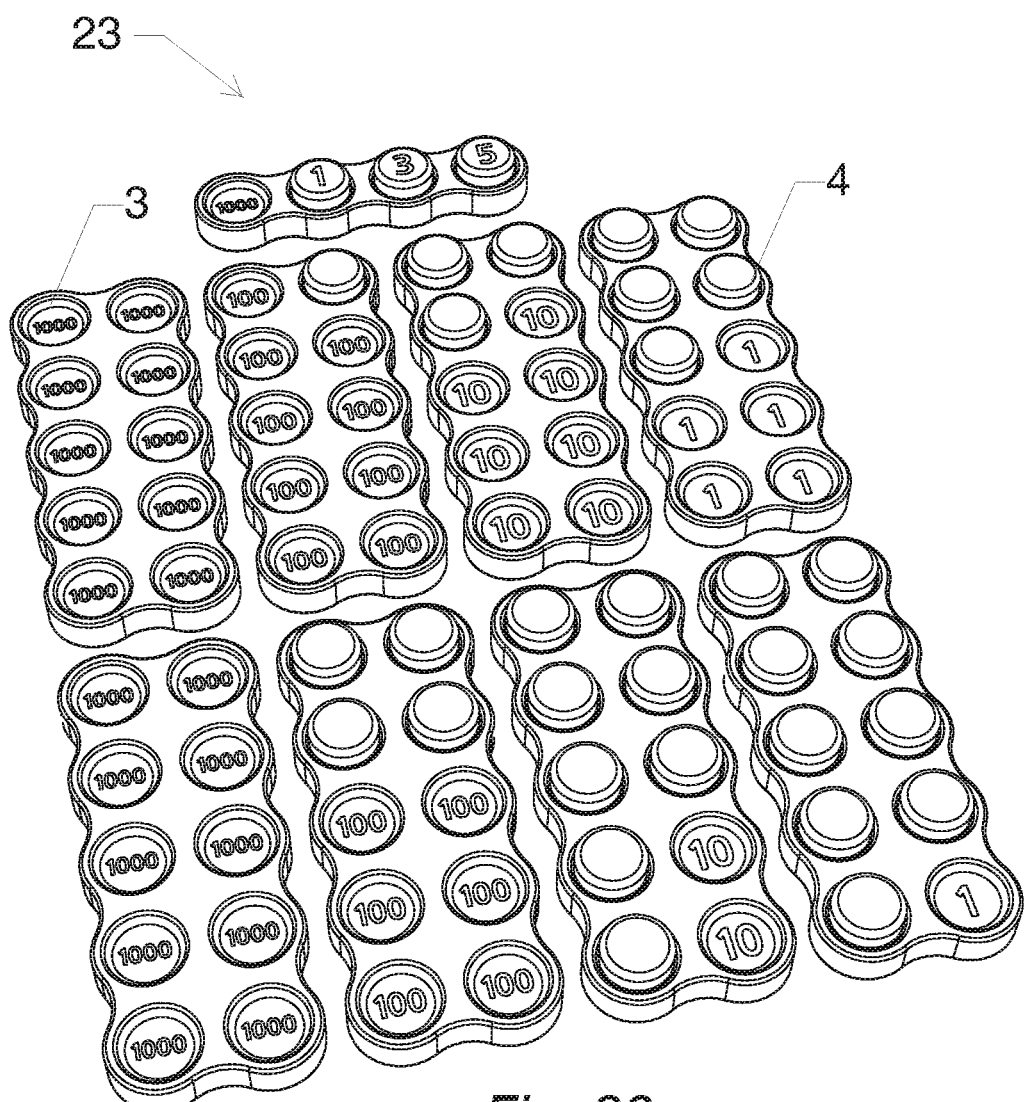
Figure 87:
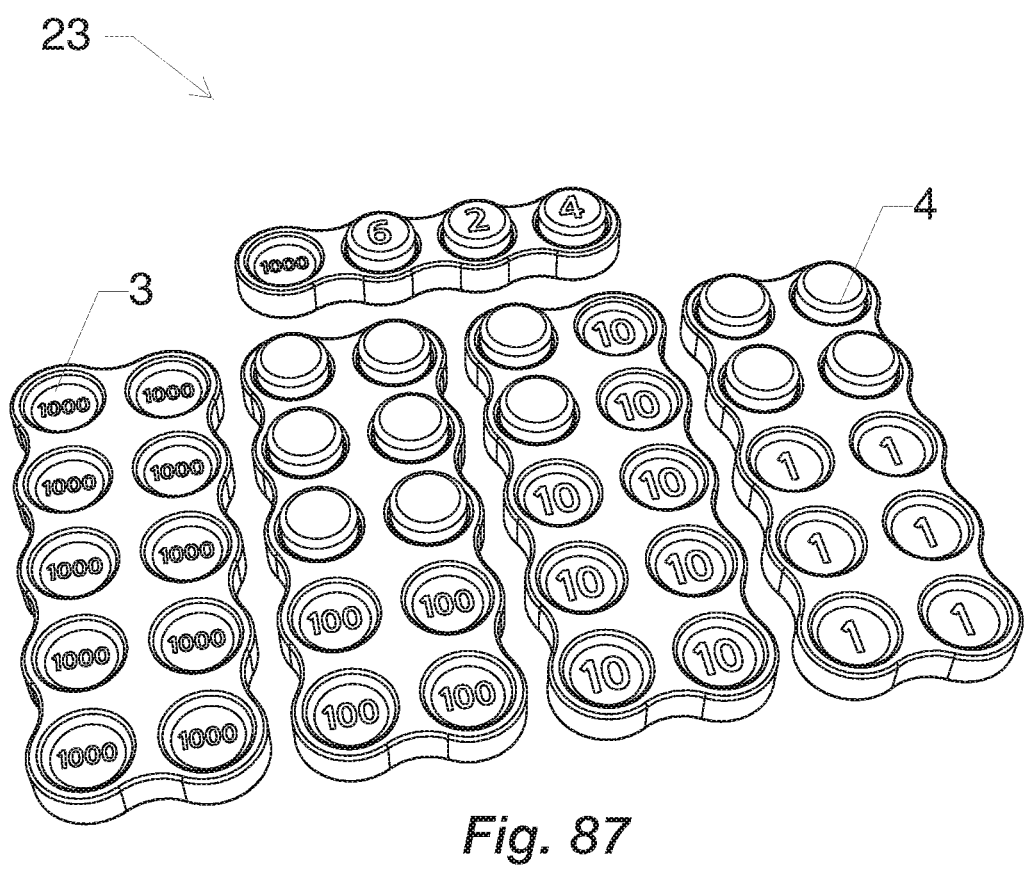

In an example, adding at least one additional set of place value trays 21 to the place value tray arrangement 23 enables a student to perform the addition operation on large multi-digit numbers. In an example, additional sets of place value trays 21 are positioned on a work surface below a first set of place value trays 21 with all place value trays 21 of a particular order being aligned vertically. Each additional secondary set of place value trays 21 may be implemented to model the additional numbers in the addition operation. For example, an arrangement for the operation where "489" is added to "135" is shown in FIG. 86. The solution tray 22 shows the number "135", as modelled by the markers 4 in the first set of place value trays 21. The first set of place value trays 21 represents the first number in the addition operation. The second set of place value trays 21 contains markers 4 that model the number "489" and represents the second number in the addition operation. By using the method disclosed hereinabove, whereby markers 4 are regrouped and "carried over" into the next higher place value and whereby the number of markers 4 in a single place value tray 21 may be counted and represented in the solution tray 22 using markers 4 that have numerals inscribed thereon, a student may add the two large numbers. The resulting solution to the problem of "135+489" is "624" as represented by the place value tray arrangement and markers shown in FIG. 87.

Subtraction of Large Numbers.

In an example, a student may perform subtraction of large numbers using the place value tray arrangement 23 in a similar fashion as in the addition exercise disclosed above. Instead of adding markers 4 to the place value trays 21, the student can remove markers 4 and resolve the final number in the solution tray 22. When necessary, the student may regroup from a higher place value tray 21 to a lower place value tray, also known as "borrowing." For example, a student may need to remove a single marker 4 from the tens place value ten-frame tray 21 and regroup it into ten markers 4 in the ones place value ten-frame tray 21.

Multiplication Operation Exercise.

With instruction from of a teacher, a student may learn to perform the multiplication operation of arithmetic using tray and unit marker assemblies. If desired, the teacher and student may augment the multiplication operation exercise using the quantity cards 16, operator cards 18, and equals sign cards 19 disclosed hereinabove. To begin the exercise, the student selects a first tray 2 that represents the quantity as the factor in the multiplication exercise. The student may then proceed to insert unit markers 4 into the indents 3 of the first tray 2, counting aloud in sequence beginning with one and proceeding until they have filled all indents 3 within the first tray 2. The teacher may assist the student at this point, noting the total quantity of unit markers 4 which have been counted in the first tray 2.

Next the student may select the quantity card 16 that equals the quantity of unit markers 4 within the indents 3 of the first tray 2 and place it onto the work surface with the side which has been printed with a pictorial representation 15 of the first tray facing upwards. The teacher may then present to the student the operator card 18 that has the multiplication sign printed thereon. The student can then place the multiplication operator card 18 adjacent to the first quantity card 16. The teacher may next present to the student a second quantity card 16 that represents the quantity by which the factor is multiplied. In this exercise, the second quantity card 16 may be referred to as the multiplier card 24. The student can then place the multiplier card 24 adjacent to the multiplication operator card 18 and with the side facing upward which has been printed with the numeral representation 14 of the multiplier quantity.

At this stage in the multiplication operation exercise, the teacher may discuss with the student the nature of the multiplication operation whereby the placing of the first tray 2 and the counting of the unit markers 4 therein may be repeated a number of times that equals the quantity represented by the multiplier card 24. Each new tray 2 may be of the same unit quantity as the first tray 2. The teacher may also point out that the student has already performed the tray placing and unit marker counting exercise a first time. With assistance from the teacher, the student may next repeat the tray placing and unit marker counting exercise an additional number of times until the number of trays 2 placed and filled with unit markers 4 equals the quantity represented by the multiplier card 24. To complete the multiplication operation exercise, the student and teacher examine the tray and marker assemblies 12 placed on the work surface and count the number of trays 2. The quantity of trays 2 on the work surface equals the quantity represented by the multiplier card 24. To complete the multiplication operation exercise, the student may count the total quantity of unit markers 4 within the trays 2 on the work surface and then select a quantity card 16 that represents a quantity that is equal to the total quantity of unit markers 4 counted and which represents the solution to the multiplication operation exercise.

Figure 88:
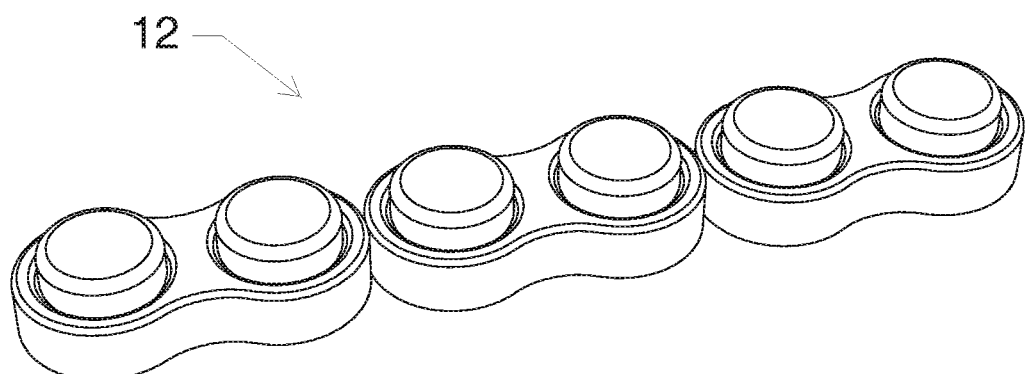
FIGS. 88-89 show trays and unit markers of an example magnetic building set.
Figure 90:
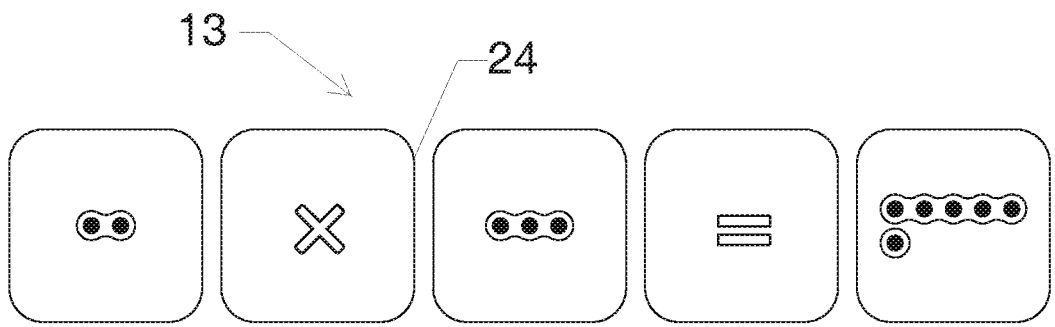
FIGS. 90-95 show cards of an example magnetic building set.
Figure 93:
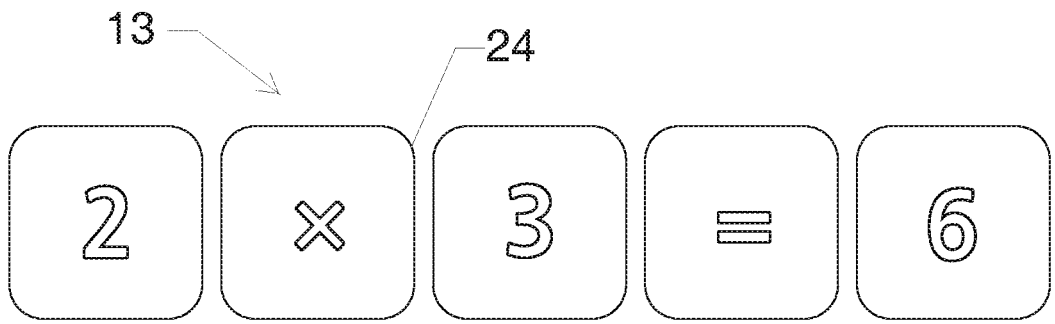

For example, a teacher may assist the student in modeling the multiplication operation "2×3=6" whereby three sets of two-unit trays 2 and marker assemblies 5 may be placed upon the work surface as shown in FIG. 88. The teacher and student may also illustrate the operation with the quantity cards 16, operator cards 18, and equals sign cards 19 utilizing either the pictorial representation 15 or numeral representation 14 of quantity shown in FIG. 90 and FIG. 93 respectively.

Commutative Property of Multiplication Exercise.

Figure 91:
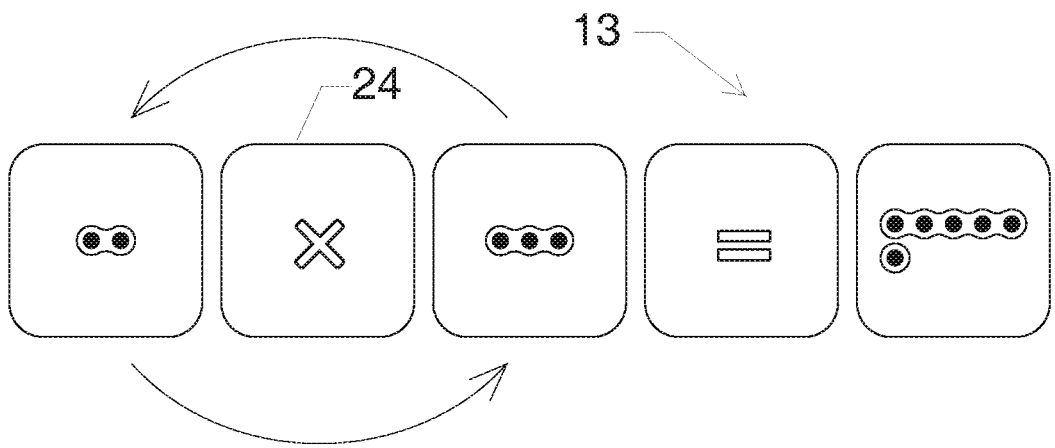
Figure 92:
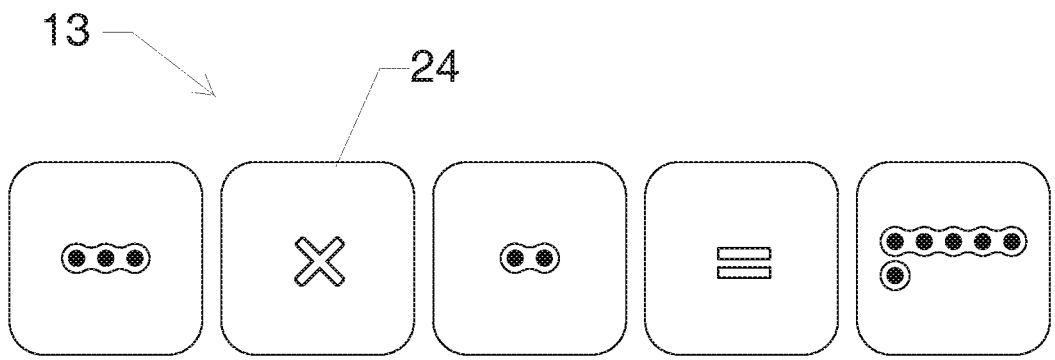
Figure 94:
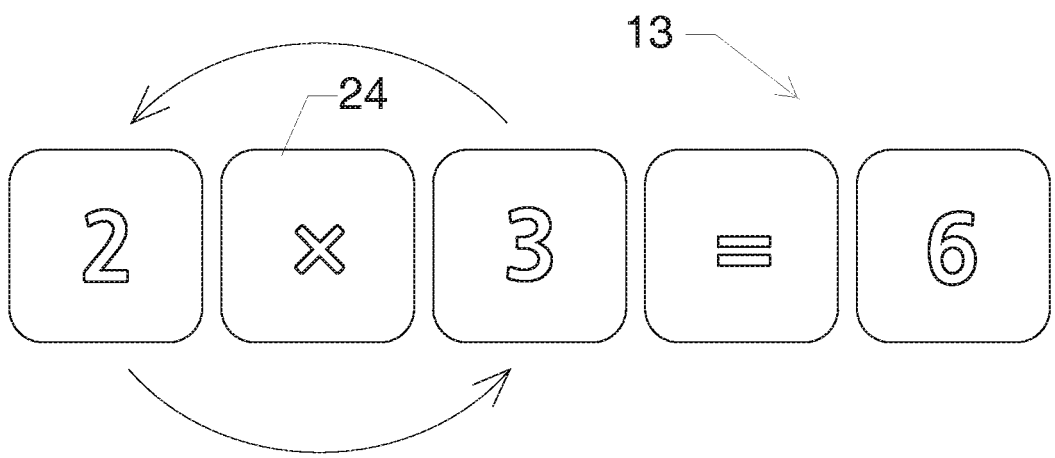
Figure 95:

In an example, upon completing the multiplication exercise disclosed herein, the teacher may illustrate to the student the commutative property of multiplication whereby the factor and multiplier in the operation can have their positions swapped yet the resulting solution of the multiplication problem remains the same. Using the example hereinabove of "2×3=6" as a starting point, the teacher may instruct the student to swap the positions of the quantity card 16 representing the factor, in this case "2", and the quantity card 16 representing the multiplier, in this case "3". FIG. 91 and FIG. 94 illustrate swapping the factor and multiplier cards 16 using the pictorial representation 15 or numeral representation 14 of quantity. Upon swapping the factor and multiplier cards 16, the new equation may be written as "3×2=6".

Figure 89:
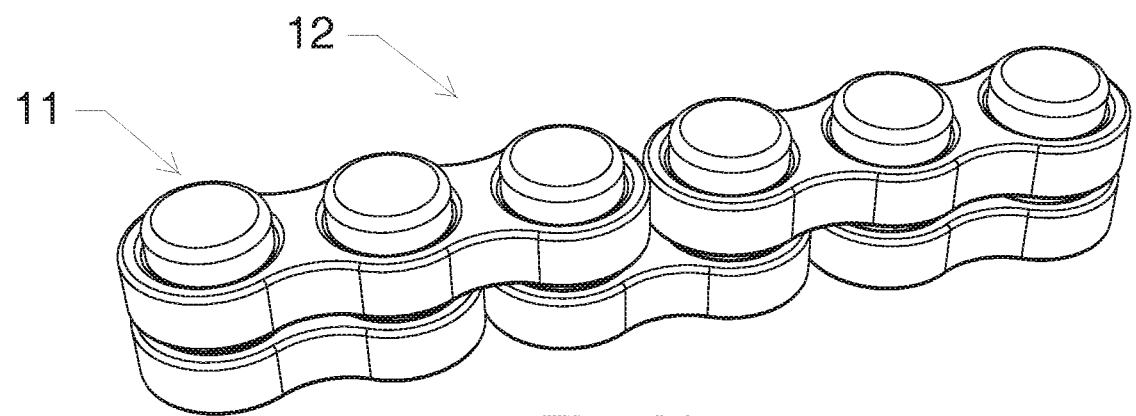

Next, the teacher may instruct the student to model the new equation using tray and marker assemblies 12. In keeping with the method described hereinabove, the student can select a first three-unit tray 2 and insert markers 4 into each indent. The student may then stack the three-unit tray 2 and marker assembly 5 on top of the two-unit tray 2 and marker assembly 5 that presently rests on the work surface as shown in FIG. 88, aligning one end of the first three-unit tray 2 with the end of the two-unit tray assembly 12. The student may next select a second three-unit tray 2 and insert markers 4 into the indents 3 of the second three-unit tray 2 and again stack the second three-unit tray 2 and marker assembly 5 on top of the two-unit tray assembly 12. The student has modelled "3×2=6" using 2 three-unit trays with markers 4 inserted and has created a new assembly 12 combining the first assembly 12 of 3 two-unit trays and markers with the second assembly 12 of 2 three-unit trays 2 and markers 4 as shown in FIG. 89.

The teacher may instruct the student to count the markers 4 that are visible on the three-unit tray assembly 12. The student may confirm that there are six markers 4 in the three-unit tray and marker assembly 12 as there are six markers 4 in the two-unit tray and marker assembly 12 resting below the three-unit trays 2. The teacher and student may also observe how the assembly 12 of 2 three-unit trays 2 are of the same length as the assembly 12 of 3 two-unit trays 2. By using the tray and marker assemblies 12 and optionally the quantity cards 16, operator cards 18, and equals sign cards 19, the teacher and student have successfully modelled the commutative property of multiplication.

Division Operation Exercise.

Figure 96:
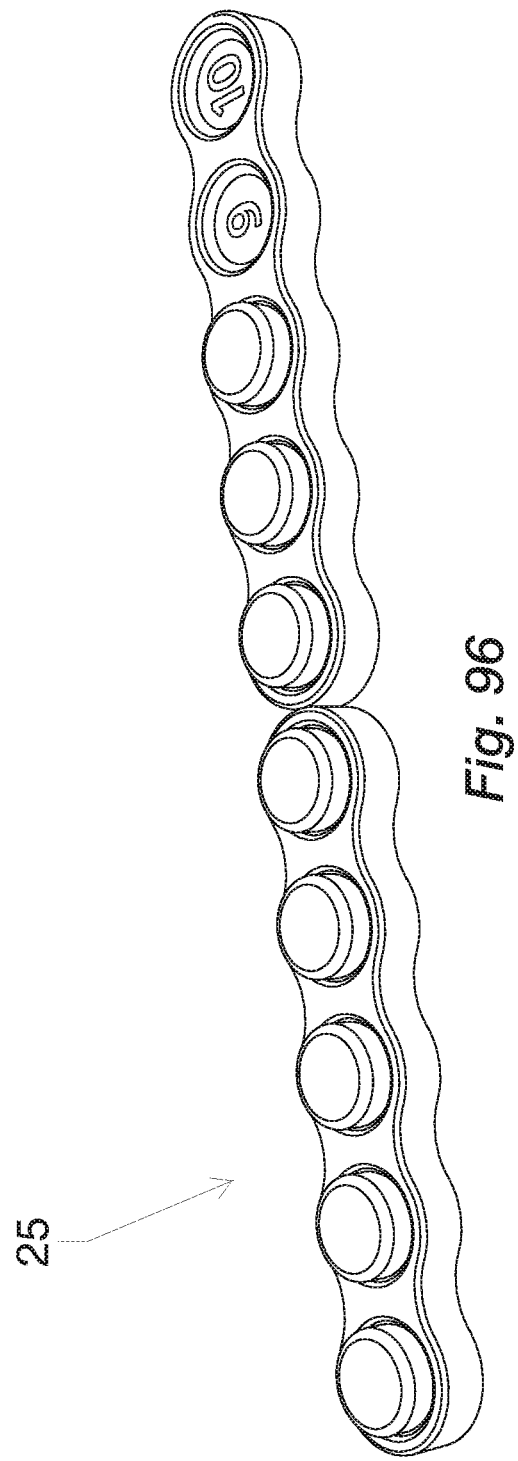
FIG. 96 shows trays and unit markers of an example magnetic building set.
Figure 97:
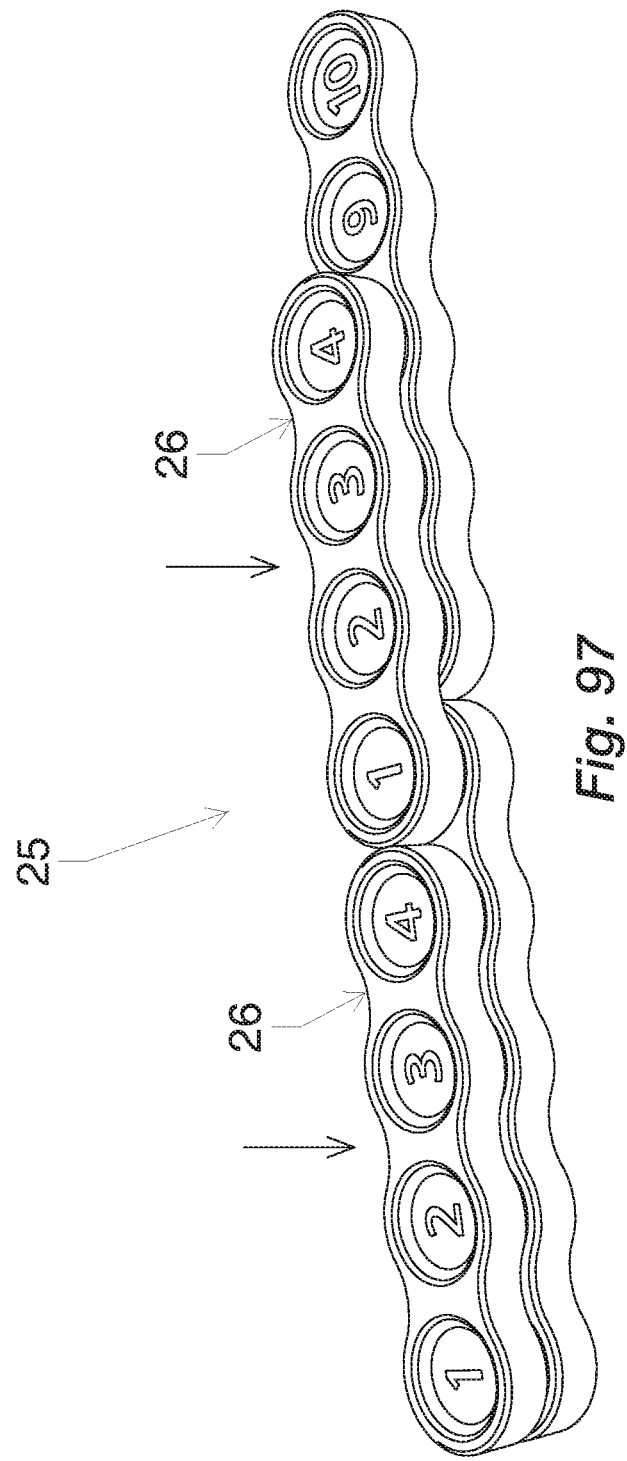
FIG. 97 shows trays and unit markers of an example magnetic building set.

With instruction from the teacher, a student may learn to perform the division operation of arithmetic using tray and unit marker assemblies 12 as shown in FIGS. 96 and 97. If desired, the teacher and student may augment the division operation exercise using the quantity cards 16, division operator cards 18, and equals sign cards 19 disclosed hereinabove. The student may begin the exercise by selecting a tray 2 or plurality of trays 2 that may be implemented to model the dividend component of the division operation. The student may then place the tray 2 or plurality of trays 2 onto a work surface. If more than one tray 2 is to be implemented to represent the dividend component, the student may place the trays 2 abutted to each other on the work surface and aligned along their longitudinal axes respective to each other. Next the student may insert unit markers 4 into the indents 3 within the tray 2 or plurality of trays 2 until the quantity of unit markers 4 in the trays 2 equals the quantity to be implemented as the dividend component in the exercise. For the purposes of this exercise, the tray 2 or plurality of trays 2 on the work surface and the unit markers 4 contained therein which can be implemented to represent the dividend quantity may be referred to as the dividend tray assembly 25, The student may select the quantity card 16 that equals the dividend quantity and place it onto the work surface. The teacher can then present to the student the operator card 18 which has been printed on one side with the division operator sign, also known as an obelus. The student may place the division operator card 18 onto the work surface and adjacent to the dividend quantity card 16.

In an example, the teacher may now present to the student a quantity card 16 and a corresponding tray 2 that may be implemented as the divisor. In another example, the teacher may instruct the student to select a quantity card 16 and tray 2 to be implemented as the divisor. For the purposes of the division operation exercise, the tray 2 may be referred to as the divisor tray 26. The student may first place the divisor quantity card 16 on the work surface and adjacent to the division operator card 18. The teacher may then discuss with the student the object of the division operation whereby the dividend quantity represented by the first tray 2 or plurality of trays 2 and the unit markers 4 therein may be organized into groups of a quantity defined by the divisor tray 26. The teacher may instruct the student to stack the divisor tray 26 onto the unit markers 4 resting within the indents 3 within the dividend tray assembly 25 such that the unit markers 4 also rest in the indents 3 on the underside of the divisor tray. In keeping with the left-to-right reading of number lines, the student may stack the divisor tray 26 onto the unit markers 4 of the dividend tray assembly 25 starting at the left most unit marker 4 and continuing to the right and along the linear alignment of the unit markers 4. The teacher next instructs the student to count the quantity of unit markers 4 within the dividend tray assembly 25 that is fully visible and not covered by the divisor tray 26. If the quantity of unit markers 4 counted is greater than or equal to the quantity represented by the divisor tray 26, the teacher instructs the student to select another tray 2 of a unit quantity that is equal to the divisor tray 26. This newly selected tray 2 may also be called a divisor tray 26. The student may now stack the second divisor tray 26 onto the unit markers 4 within the dividend tray assembly 25, abutting to and immediately to the right of the first divisor tray 26.

The student may repeat the process of counting the visible and uncovered unit markers 4 within the dividend tray assembly 25 and stacking a newly selected divisor tray 26 onto the unit markers 4 if the quantity counted is greater than or equal to the unit quantity of the divisor tray 26. When no more divisor trays 26 can be stacked on the unit markers 4 within the dividend tray assembly 25 such that all of the indents 3 on the underside of each divisor tray 26 are filled with unit markers 4 of the dividend tray assembly 25, the student may count the total quantity of divisor trays 26 stacked atop the dividend tray assembly 25. The quantity of divisor trays 26 counted is the quotient, thereby the solution to the division operation exercise. If any unit markers 4 remain uncovered by divisor trays 26, the unit markers 4 represent the remainder of the division operation exercise. Division with a remainder is discussed hereinafter in the disclosure of the division operation with fractional remainder exercise.

In an example, with instruction from a teacher, a student may learn division by modelling the equation "8÷4=2" using tray and marker assemblies 12 and optionally, quantity cards 16, operator cards 18, and equals sign cards 19. The student begins by building the dividend tray assembly 25 on the work surface. The student may place a first five-unit tray 2 on the work surface and a second five-unit tray 2 that has inscribed within the indents 3 the numerals 6 thru 10 as shown in FIG. 96.

In another example, the student may place a five-unit tray 2 and a three-unit tray 2 on the work surface. In either case, the student places the trays 2 abutted to each other on the work surface and aligned along their longitudinal axes respective to each other. The student next inserts a total of eight markers 4 into the indents 3 of the trays 2 resting on the work surface, starting with the left-most indent 3 and proceeding in a left-to-right direction. The student has now completed the dividend tray assembly 25.

Figure 98:
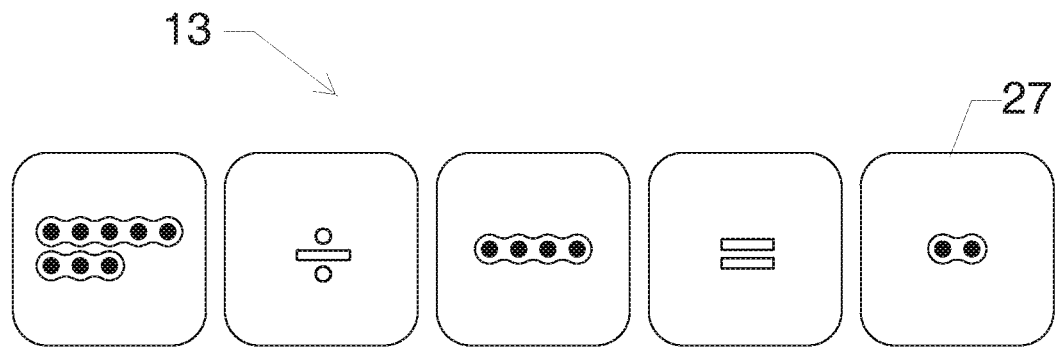
FIG. 98 shows cards of an example magnetic building set.
Figure 99:
FIG. 99 shows cards of an example magnetic building set.

FIG. 98 and FIG. 99 illustrate the implementation of the cards 13 in the division exercise and show, respectively, the pictorial side 15 and numeral side 14 of the quantity card 16. If the cards 13 are to be implemented, the student selects a first quantity card 16 which represents the dividend in the equation, in this case the number "8", and places it onto the work surface. At the discretion of the student and teacher, the student may place the quantity card 16 onto the work surface with the side facing upward that has printed thereon the pictorial representation 15 of the number "8" or in another example, the numeral representation 14 of the number "8". The teacher next directs the student to place the division operator card 18 adjacent to and to the right of the dividend card 16. Continuing, the teacher directs the student to select the quantity card 16 for the number "4", which may be implemented as the divisor, and place the quantity card 16 adjacent to and to the right of the division operator card 18. Finally, the student may place the equals sign card 19 onto the work surface, adjacent to and to the right of the divisor card 16. With direction from the teacher, the student has modelled the equation "8÷4=2" using the cards 13, yet leaving the solution space empty.

At this stage in the exercise, the teacher may explain in more detail the purpose of the division exercise by posing the question, "How many fours go into eight? Put another way, how many four trays 2 can we stack in a line on top of the eight markers 4?" The student may begin stacking four-unit trays 2 on top of the eight markers 4 in the dividend tray assembly 25 until all markers 4 have been covered by four-unit trays 2 and no markers 4 remain visible. The teacher may next instruct the student to count the total number of four-unit trays 2 that have been stacked on top of the dividend tray assembly 25, explaining that the solution to the equation in the exercise is "2". As can be seen in FIG. 97, a total of two four-unit trays 2 stack on top of the dividend tray assembly 25. If the cards 13 are being employed in the exercise, the teacher may direct the student to select the quantity card 16 that represents the number "2" and place it on the work surface adjacent to and to the right of the equals sign card 19. This card for the number represents the quotient in the division equation and can be referred to as the quotient card 27.

Inverse Relationship of Division to Multiplication Exercise.

Figure 101:
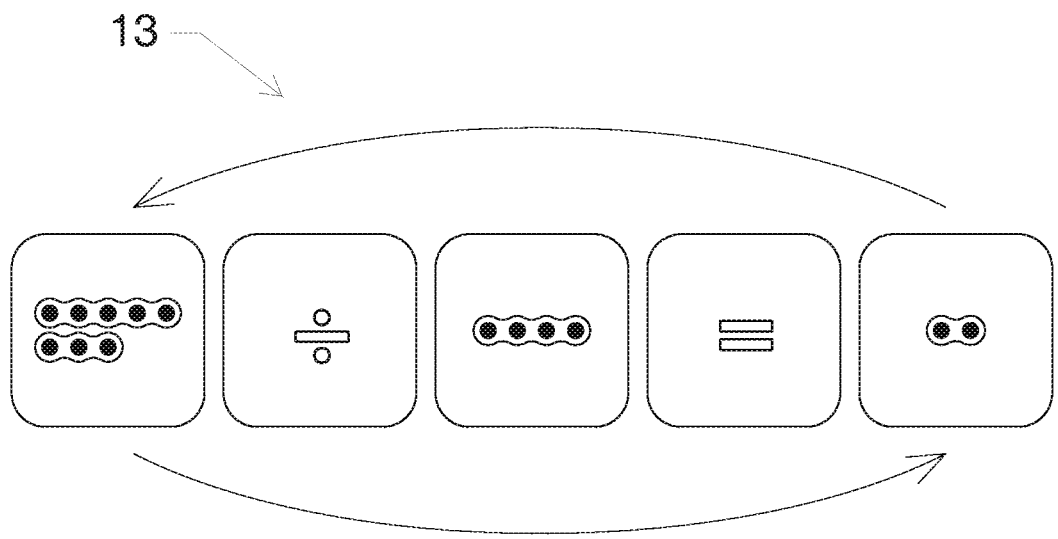
FIGS. 101-104 show cards of an example magnetic building set.
Figure 102:
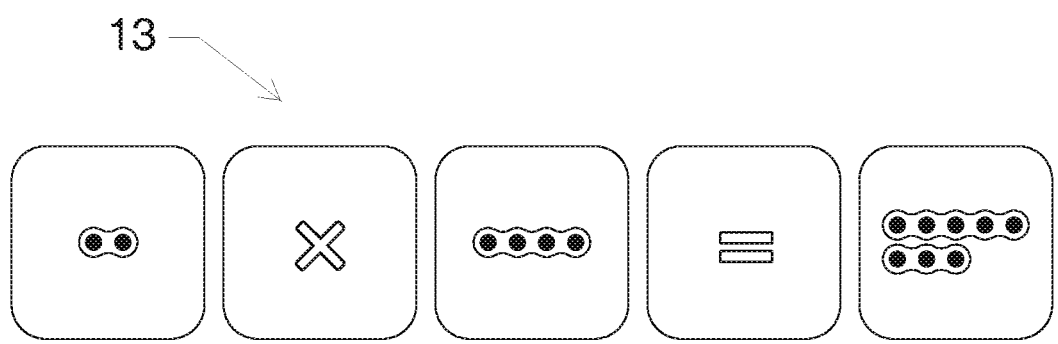
Figure 103:
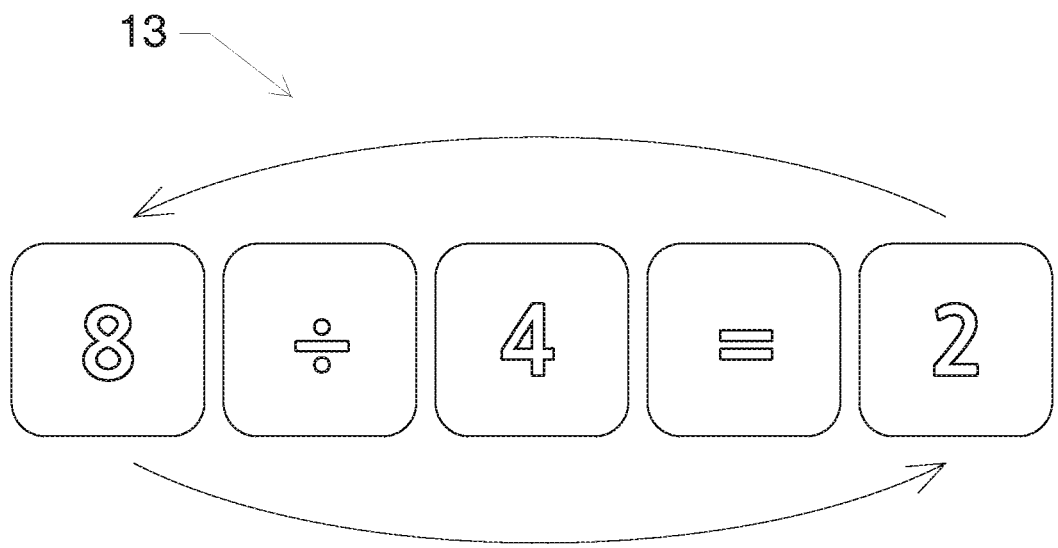
Figure 104:
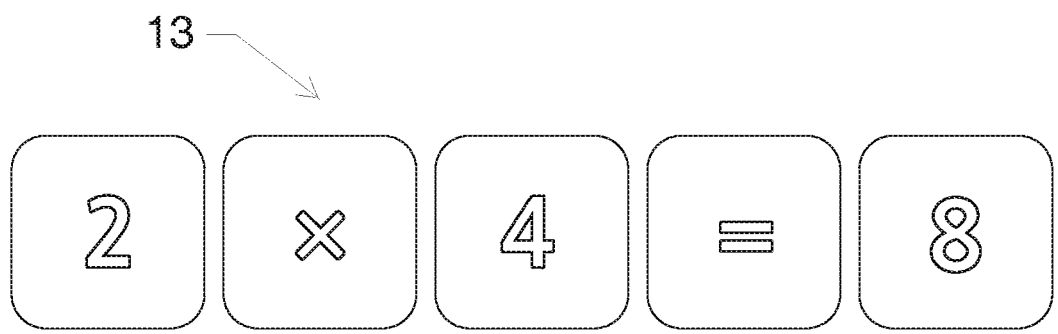

The teacher may illustrate to the student the inverse relationship of division to multiplication. Upon completing the division exercise disclosed hereinabove, the cards 13 on the work surface model the equation "8÷4=2". The teacher may explain to the student that the opposite or inverse operation to division is multiplication. If "8÷4=2" is true, then "2×4=8" is also true. To illustrate this fact, the teacher may direct the student to swap the dividend card 16 which represents the number "8" with the quotient card 27 which represents the number "2". FIG. 101 illustrates the swapping process for the pictorial quantity cards 15 while FIG. 103 illustrates the swapping process for the numeral quantity cards 14. Next, the student may flip over the division operator card 18 which has printed on the reverse side the multiplication operator card 18. FIG. 102 illustrates the inverted equation using the pictorial cards 15 while FIG. 104 illustrates the inverted equation using the numeral cards 14.

Figure 100:
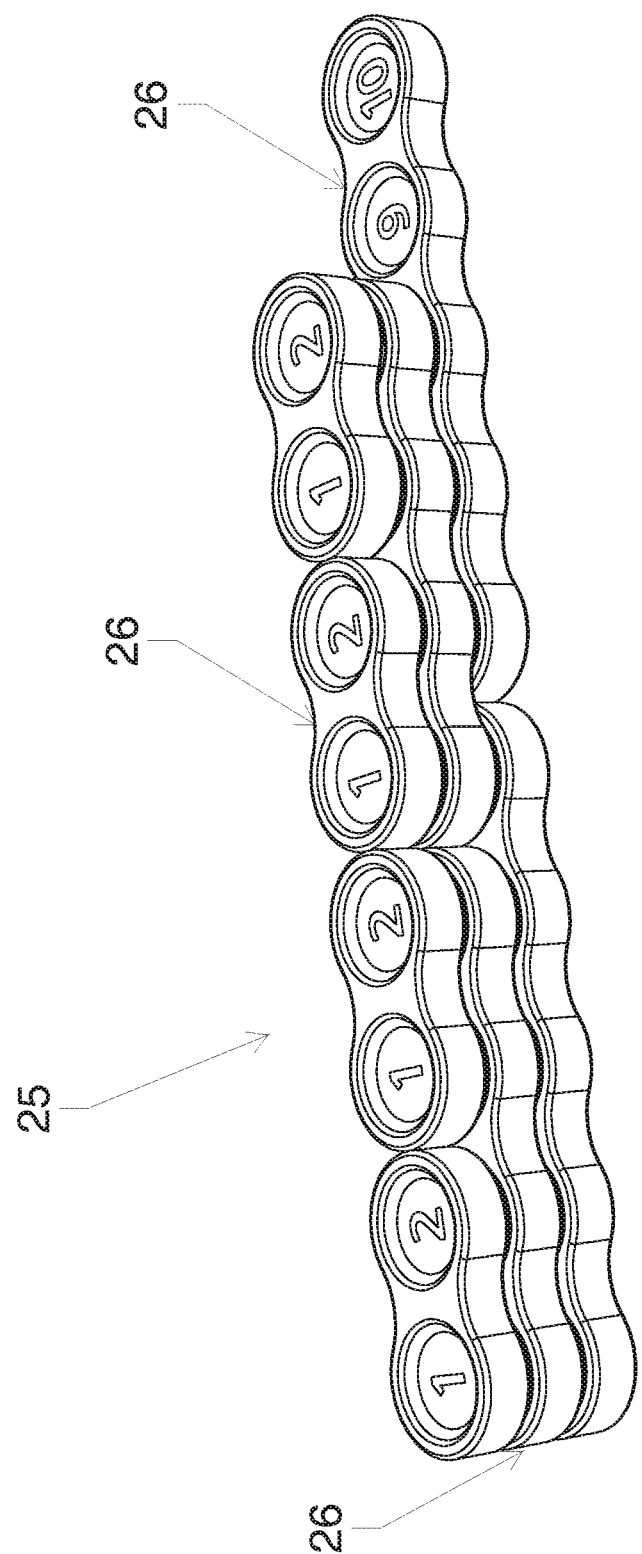
FIG. 100 shows trays and unit markers of an example magnetic building set.

Continuing with the exercise, the teacher may assist the student in modelling the inverse relationship described hereinabove using tray and marker assemblies 12. With the teacher and student having modelled the equation "8÷4=2" as described hereinabove, there rests on the work surface the tray and marker assembly 12 as shown in FIG. 97. The teacher may direct the student to place markers 4 into the upward-facing indents 3 in the two four-unit trays 2 that are positioned at the top of the assembly 12. The student may then model the inverse equation "2×4=8" as represented by the arrangement of cards 13 that also rests on the work surface as shown in either FIG. 102 or FIG. 104. The student may stack four two-unit trays 2 onto the markers resting in the two four-unit trays 2 in the assembly 12 as illustrated in FIG. 100. The teacher and student may observe that the assembly 12 of two four-unit trays 2 and respective markers 4 and the assembly of four two-unit trays 2 and respective markers 4 are equal in length and thereby demonstrates the inverse relationship of the two equations.

Markers with Numerical Fractions.

Figure 105:
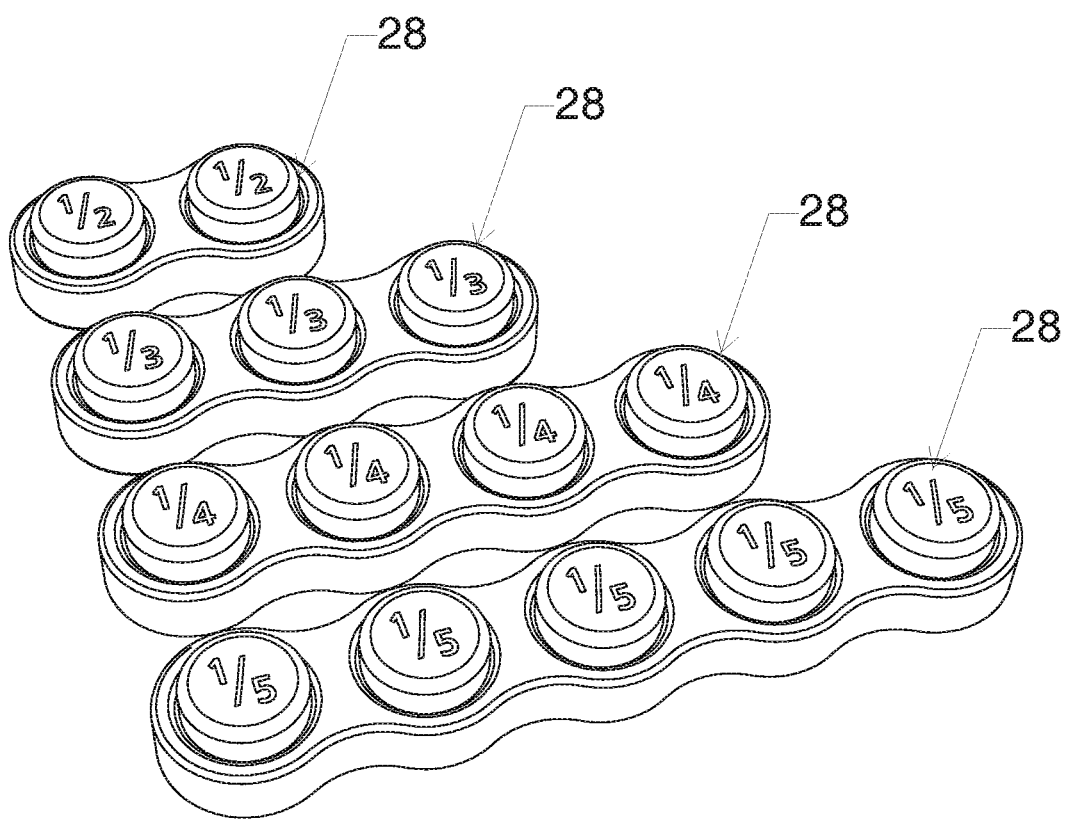
FIG. 105 shows trays, fractions, and unit markers of an example magnetic building set.

In an example, some or all of the unit markers 4 in the building set 1 can be printed, painted, debossed or otherwise inscribed on a first side, a second side or on both sides with a numerical fraction 28, comprising a first numerical indicium set above a solidus, also known as a fraction slash, followed by a second numerical indicium set below the solidus, and thereby can be implemented to represent numerical fractions 28. Unit markers 4 with fractions 28 printed thereon can be provided for each unit-tray 2 quantity included in the building set 1. The fractions 28 on the unit markers 4 that correspond to a particular tray 2 can have as the numerator the numeral 1 and as the denominator the numeral that represents the quantity that is equal to the quantity represented by the tray 2. For example, the indents 3 on the upward facing side of a two-unit tray 2 can be filled with unit markers 4 that each have printed thereon the fraction ½. A single such unit marker 4 in the context of the two-unit tray 2 can be considered one half of the total quantity represented by the three-unit tray 2. Continuing, the indents 3 on the upward facing side of a three-unit tray 2 can be filled with unit markers that each have printed thereon the fraction ⅓. A single such unit marker 4 in the context of the three-unit tray 2 can be considered one third of the total quantity represented by the three-unit tray 2. Two such unit markers 4 in the context of the three-unit tray 2 can be considered two thirds of the total quantity represented by the three-unit tray 2. The process and technique of representing fractions 28 using markers 4 and trays 2 can be applied to any whole number whereby the numeral represented by the quantity of indents 3 on the first side of a tray 2 is implemented as the denominator in the numeric fraction 28 that can be printed on an equal quantity of markers 4. For example, FIG. 105 illustrates unit trays and markers with numerical fractions 28 thereon for the whole numbers "2", "3", "4" and "5".

Division with Fractional Remainder Exercise.

Consider how the equation "9÷4=2.25" can be written as "9÷4=2¼" when written using fractional notation. In elementary curriculum, this might be expressed in a word problem as "9 divided by 4 is 2 with a remainder of 1." Using markers with numerical fractions described hereinabove, the building set 1 may be implemented to model the division of whole numbers whereby the quotient produced contains a fractional remainder. Other math manipulatives either do not demonstrate the connection of elementary remainders to fractions and by extension decimal remainder, or ignore remainders in division entirely.

Figure 106:
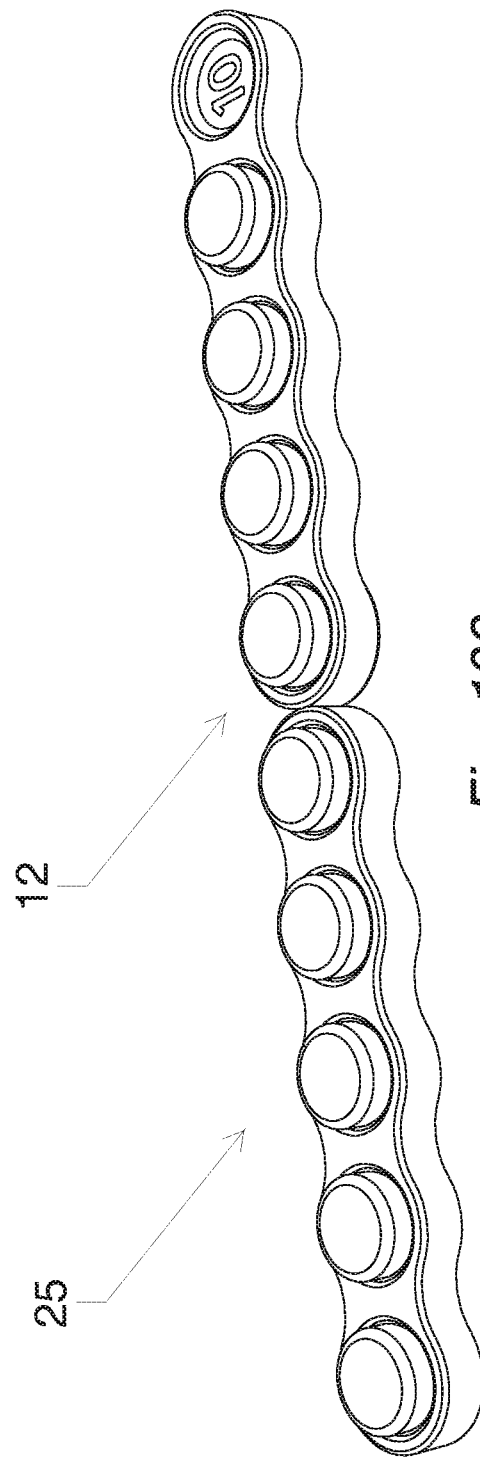
FIG. 106 shows trays and unit markers of an example magnetic building set.
Figure 107:
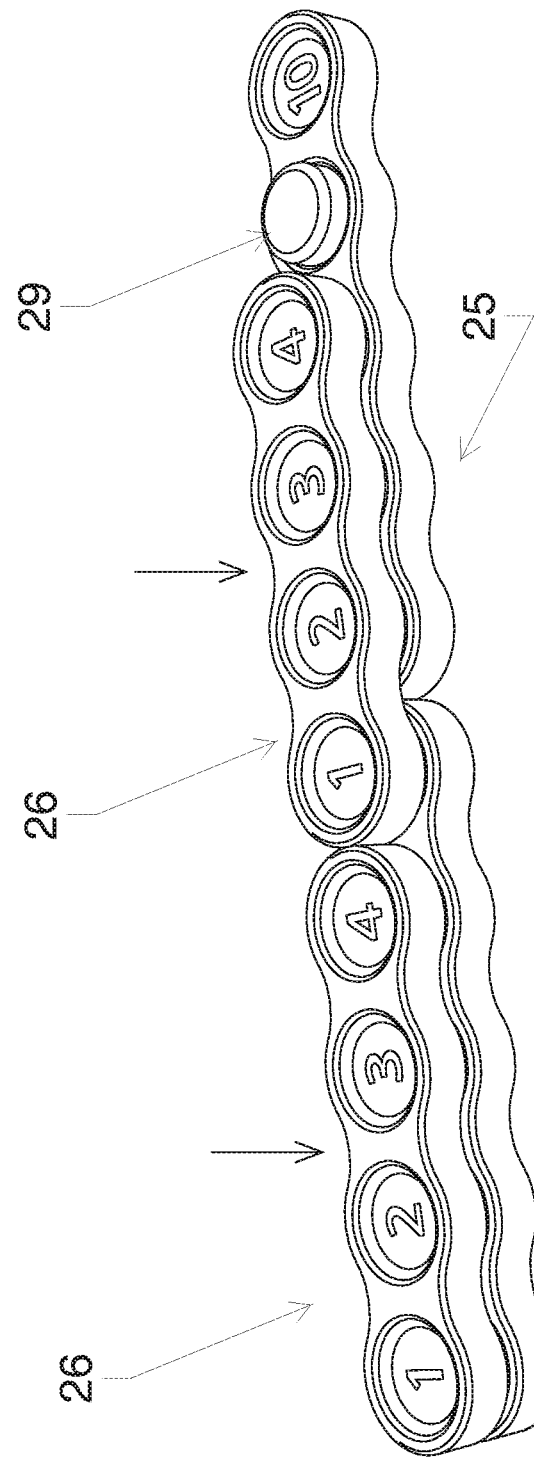
FIG. 107 shows trays and unit markers of an example magnetic building set.
Figure 108:
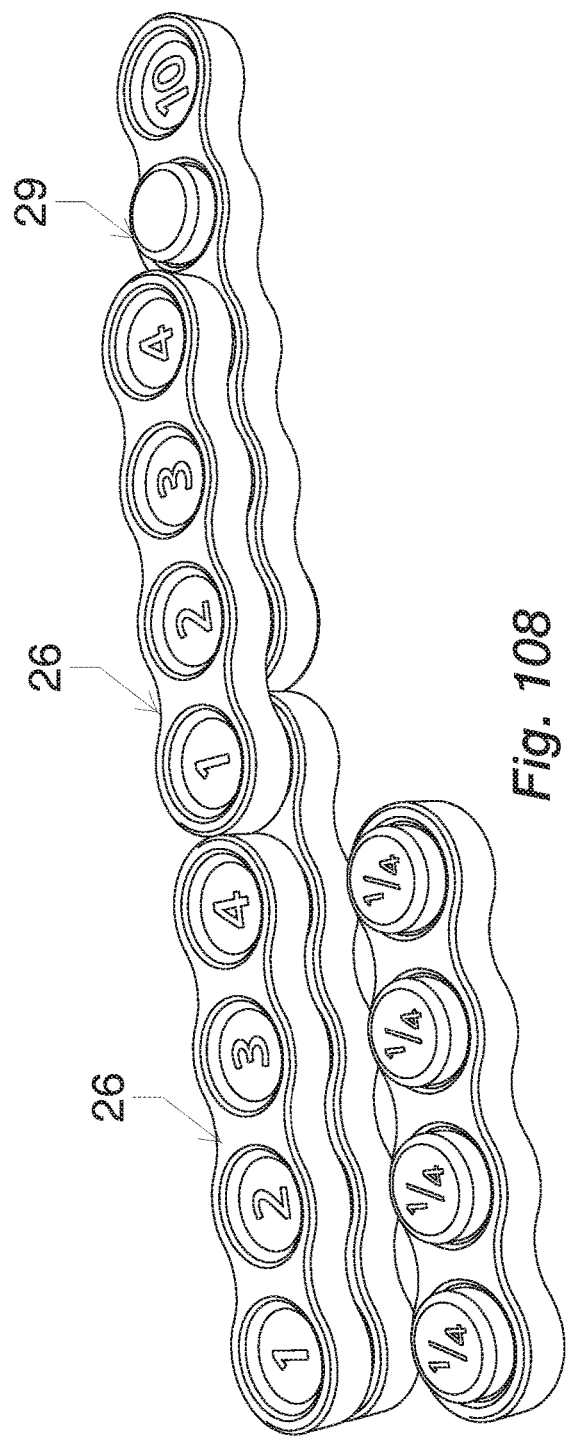
FIG. 108 shows trays, fractions, and unit markers of an example magnetic building set.

With instruction from a teacher, a student may model the division operation "9÷4" using tray and marker assemblies 12 as shown in FIGS. 106 and 107 and by employing the division operation exercise described hereinabove. As evident from FIG. 107, two four-unit trays 2 can be stacked on top of the dividend tray assembly 25 with one marker 4 remaining uncovered. This single marker 4 represents the remainder of 1 in the word problem "9 divided by 4 is 2 with a remainder of 1." The teacher may explain to the student that the remaining marker is a partial component of an incomplete four-unit tray 2 since "4" is the divisor in the operation. This remaining marker 4 can be referred to hereafter in the exercise as the remainder marker 29. The teacher may next instruct the student to select a third four-unit tray 2 and place it on the work surface adjacent to the tray and marker assembly 12 already present on the work surface. Continuing, the teacher may instruct the student to insert markers 4 having printed thereon the fraction ¼ into every indent in the third four-unit tray 2 as shown in FIG. 108. This tray assembly 12 can be called the "fourths tray assembly." At this stage in the exercise, the teacher may further explain the relationship of each the four markers 4 within the four-unit tray 2 to the total quantity represented by the four-unit tray 2; each marker is one of four that is present in the four-unit tray 2 and can be expressed as ¼$^{th}$ of the total number of markers 4 that can be inserted.

Figure 109:
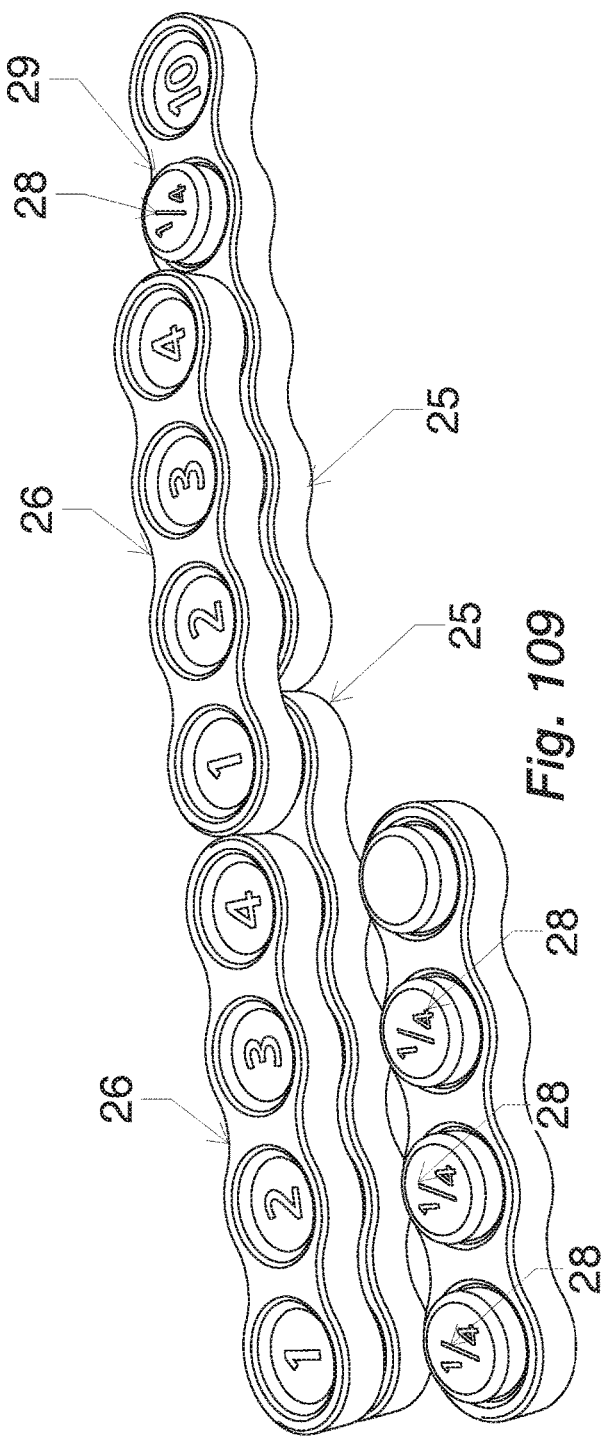
FIG. 109 shows trays, fractions, and unit markers of an example magnetic building set.

Going further, the teacher may explain to the student that the single marker 4 that remains uncovered in the division tray assembly 25 can also be considered ¼$^{th}$ of a four-unit tray 2 and may instruct the student to swap the remainder marker 29 in the division tray assembly with one of the ¼$^{th}$ markers 4 in the fourths tray assembly 12 as shown in FIG. 109. The teacher may instruct the student to remove the third four-unit tray 2 from the work surface or optionally leave it in place. Finally, the teacher may explain to the student how they have modelled "9 divided by 4" and how the resulting solution can be read in the division tray assembly as "9÷4=2¼", as evident in FIG. 109. Optionally, the teacher may direct the student to convert the fraction ¼ into decimal notation using a calculator and therefore expressing the solution as "9÷4=2.25".

Squared Number Arrangements.

Figure 110:
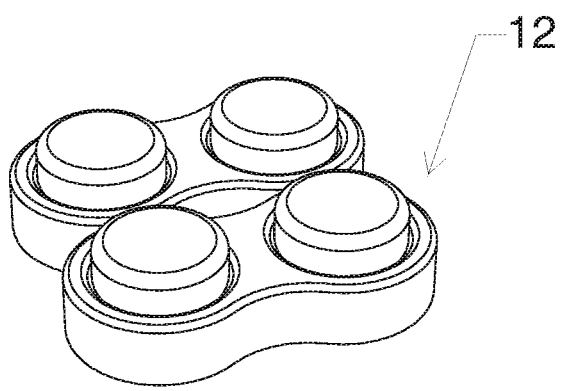
FIGS. 110-114 show trays and unit markers of an example magnetic building set.
Figure 111:
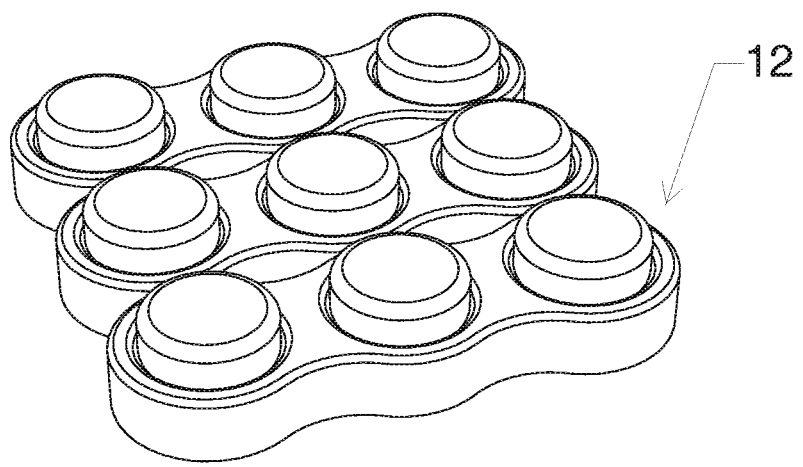
Figure 112:
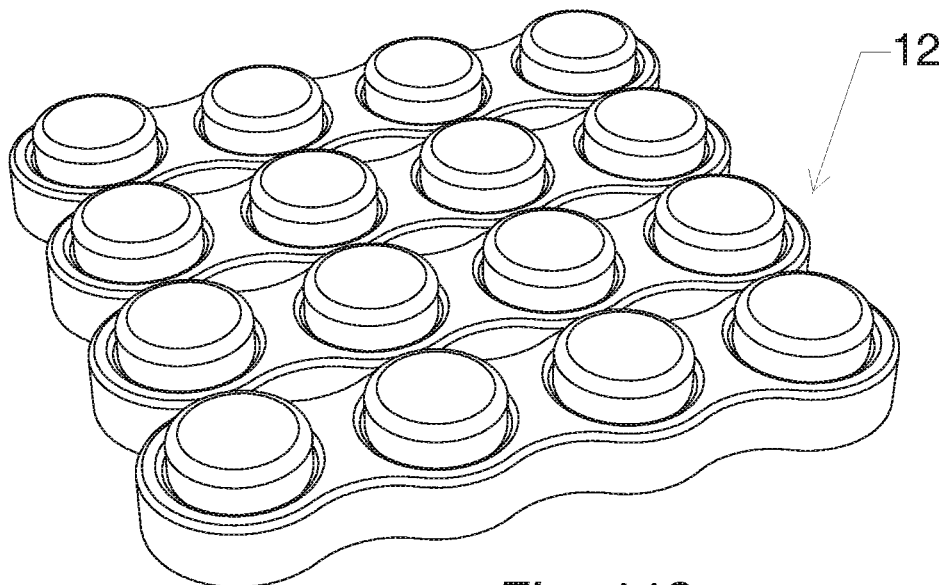

With instruction from a teacher, a student may model squared numbers using tray and marker assemblies 12, as shown in FIGS. 110-112. For example, a student may first choose a number to square. The student may then select a tray 2 that represents that number and place it on a work surface. The student may continue placing trays 2 of the previously selected unit quantity onto the work surface until the quantity of trays 2 also equals the chosen number. The student may then arrange the trays 2 in rows in order to form a square arrangement 11. Next, the student may count the markers along each side of the square arrangement 11 and find all quantities are equal. The teacher may then introduce the geometric quality of a square whereby all sides are equal. The quantity cards 16 and operator cards 18 may be implemented to show the student how squaring a number might be written in mathematical notation. For advanced students, the teacher may next introduce the mathematical notation for squared numbers such as $3^2$. Arrangements for $2^2$, $3^2$, and $4^2$ are shown in the drawings.

Lateral Interlocking Profile and Multiple Grid Arrangements.

Figure 113:
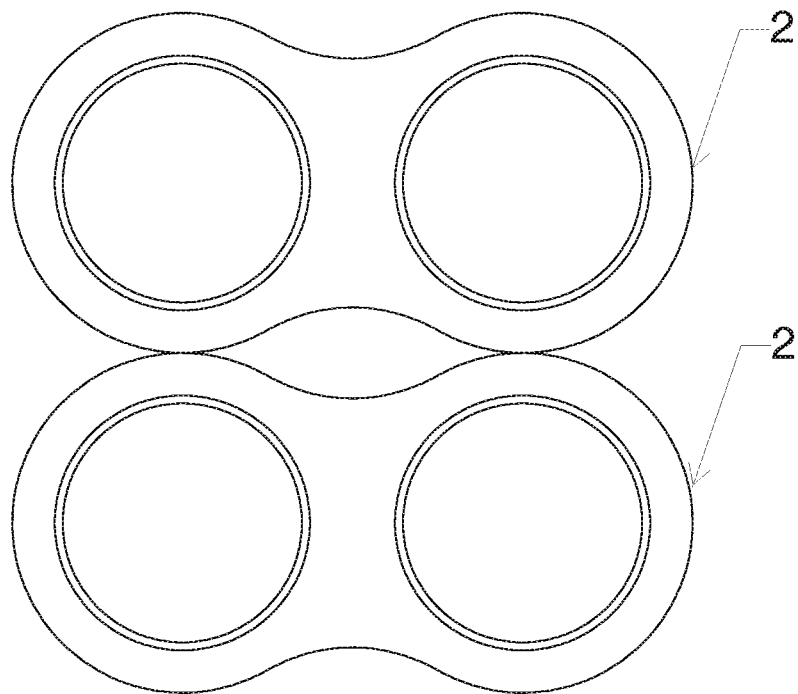
Figure 114:
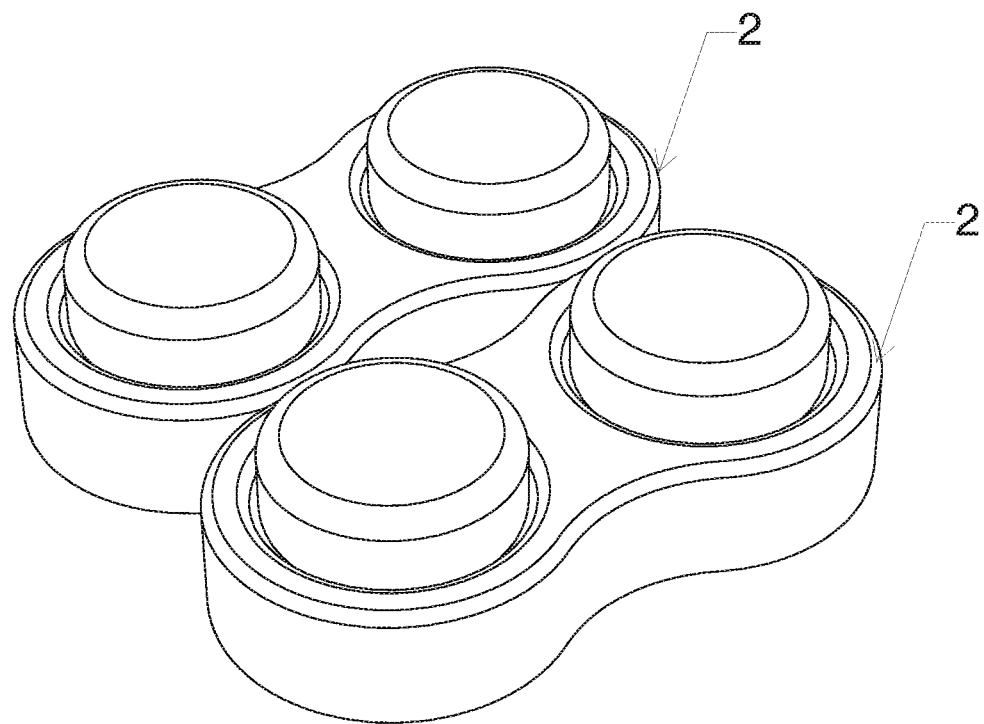
Figure 115:
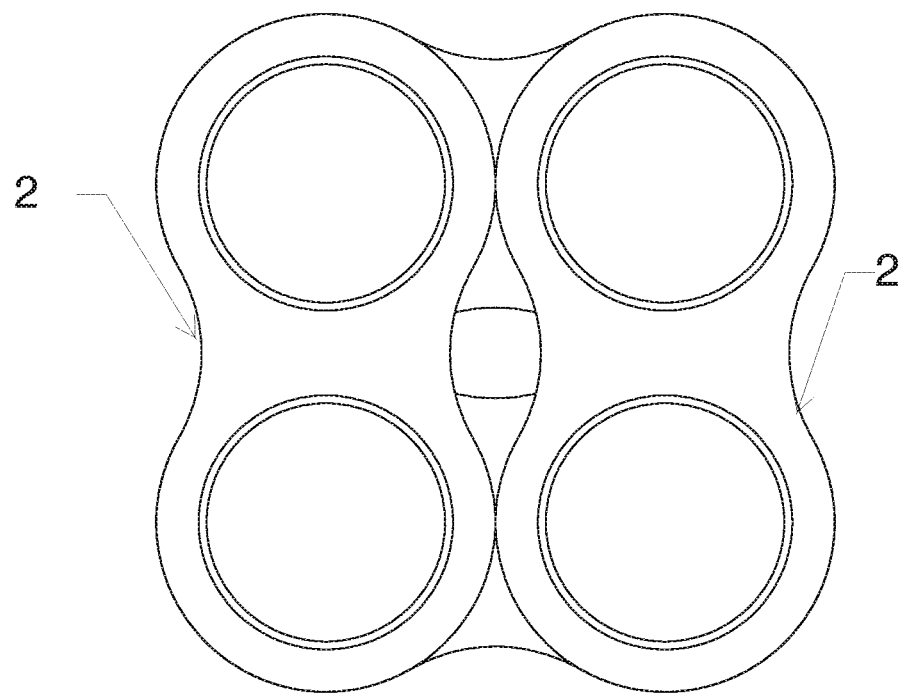
FIG. 115 shows the stacking of trays and unit markers of an example magnetic building set.
Figure 116:
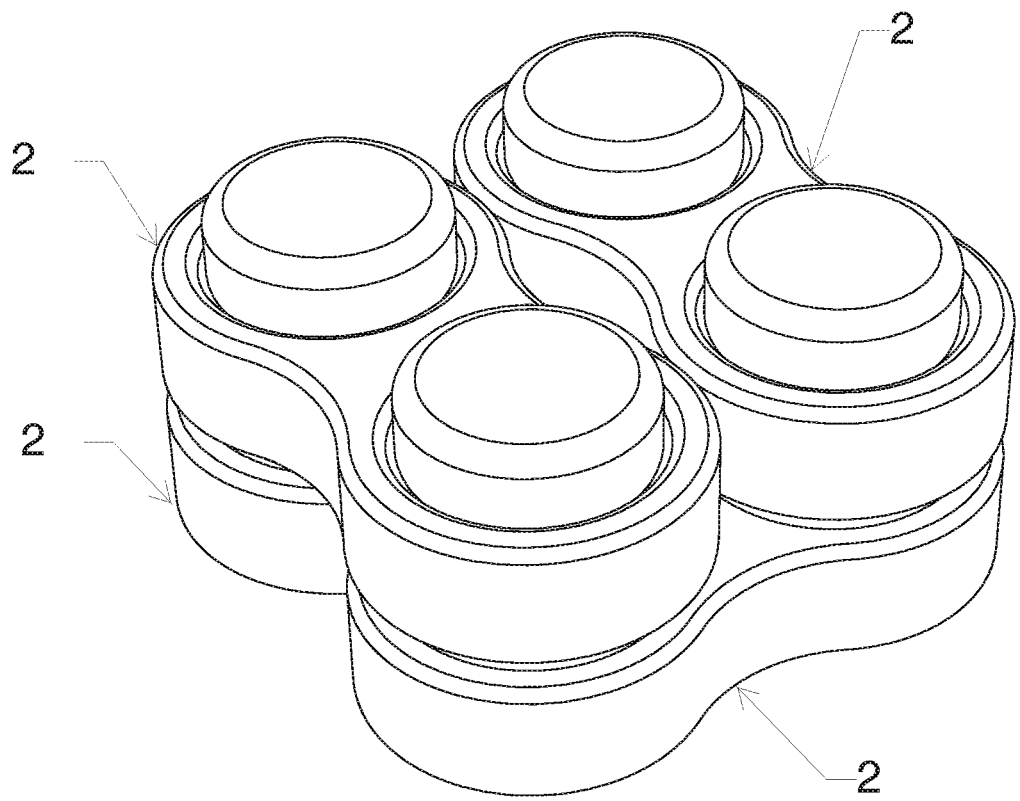
FIG. 116 shows the stacking of trays and unit markers of an example magnetic building set.

In an example, the centerlines of the indents 3 within a tray 2 can be equidistant from each other. In an example, the trays 2 can share a common distance between the centerlines of the indent 3. In an example, two trays 2 may be positioned on a work surface adjacent and abutted to each other and aligned at one end whereby each indent 3 in the first tray 2 may align with an indent 3 in the second tray 2, provided the second tray is of sufficient length as shown in FIGS. 113 and 114. In an example, the distance between the centerlines of the aligned indents 3 between the two abutted trays 2 may be equal to the distance between the centerlines of the indents in a single tray 2. Therefore, as shown in FIGS. 115 and 116, a third tray 2 may be stacked onto the arrangement shown in FIGS. 113 and 114 in a cross-wise fashion whereby the longitudinal axis of the third tray 2 lies perpendicular to the longitudinal axes of the first and second trays 2 in the arrangement 11. As is further evident from FIG. 116, trays can be arranged and stacked in an arrangement 11 that is a square grid pattern.

Figure 117:
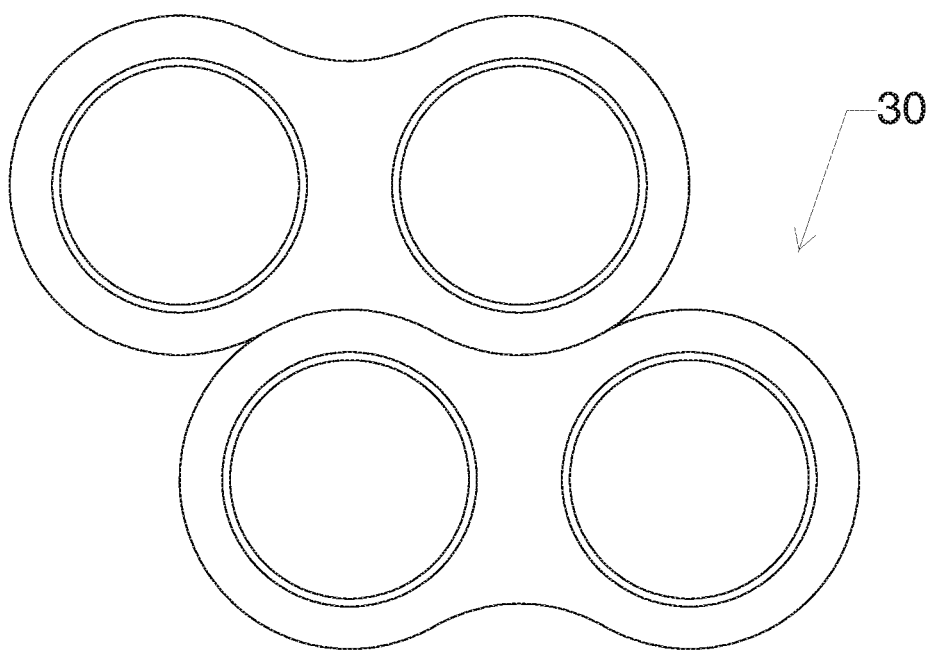
FIGS. 117-119 show lateral interlocking profiles of trays and unit markers of an example magnetic building set.
Figure 118:
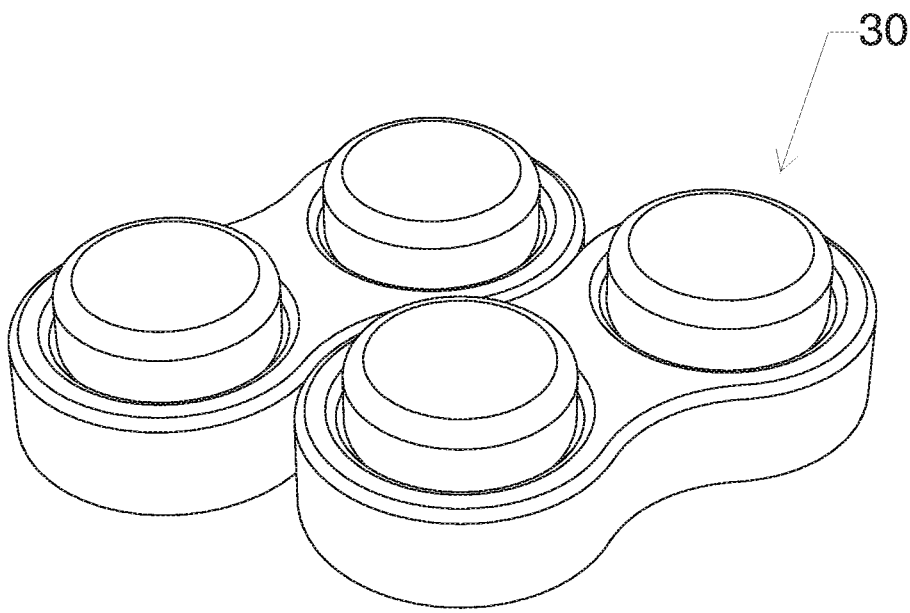
Figure 119:
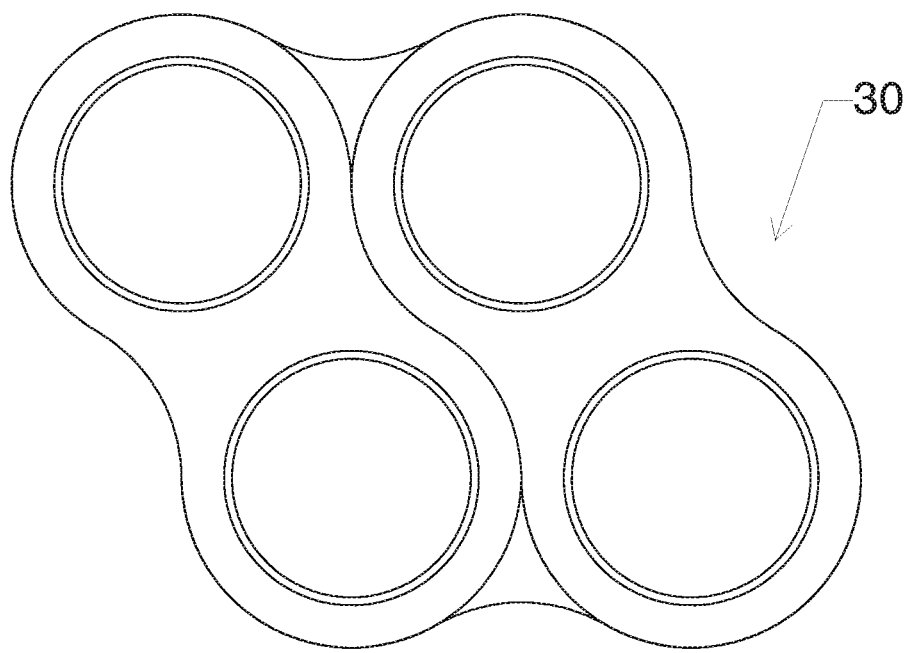
Figure 120:
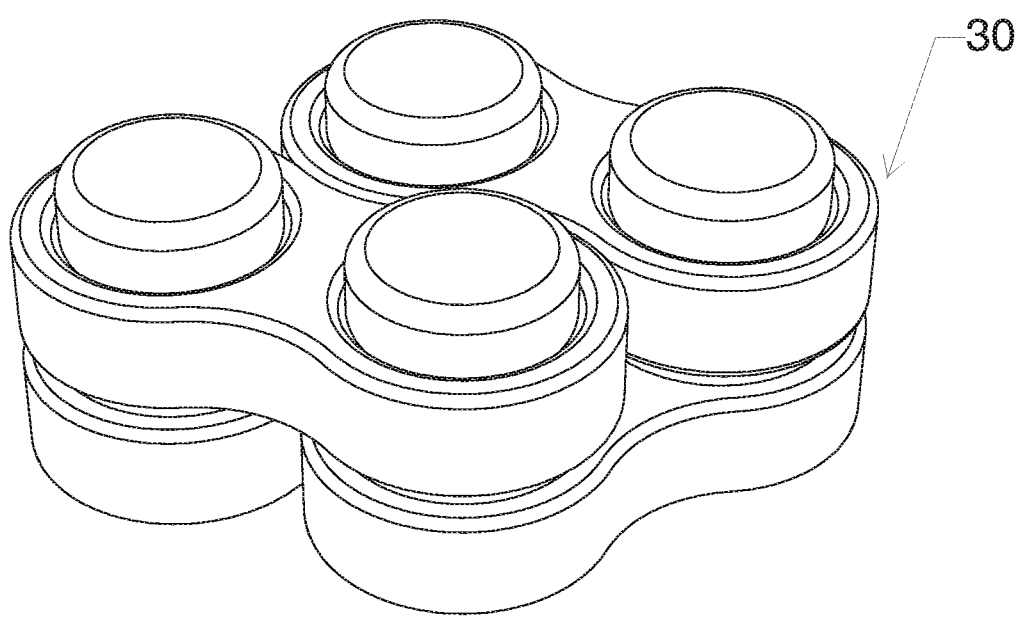
FIG. 120 shows the stacking of lateral interlocking profiles of trays and unit markers of an example magnetic building set.

In an example, a tray 2 may have a radius profile of a first dimension around each indent 3 and a reverse radius profile of the same dimension between each indent 3. In an example, trays 2 can be abutted to each other whereby the indents 3 in a second tray 2 may be aligned between the indents 3 in a first tray 2 and whereby the outer radius profile around the indents 3 in the second tray 2 fit into the inner radius profile between the indents 3 in the first tray 2 as shown in FIGS. 117 and 118 and can be referred to hereafter as tessellated tray assemblies or "lateral interlocking profiles" 30. In an arrangement of this fashion, the distance between centerlines of the indents 3 in the first tray 2 and the second tray 2 can be equal to the distance between the centerlines of the indents 3 in a single tray 2 and furthermore the centerlines of the indents 3 in both trays 2 can form a triangular grid pattern respective to each other. When the arrangement 11 is viewed from the top and in plan view, the centerlines of any three adjacent indents form an equilateral triangle. A third tray 2 may be stacked onto the triangular grid arrangement 11 formed by the first and second trays 2. The utility of the tray and marker assemblies 12 to be arranged and stacked in both square and triangular grids is disclosed in the proceeding sections on games and building set capabilities.

Example Number Games Played with the Building Set.

In some elementary math curriculum, there exists an exercise called "Ways to Make" in which a student is challenged to write down combinations of different numbers that when added together, equal the "Ways to Make" target number. For instance, a student may play the game using "Ways to Make 7." The student may then write down "6+1", "4+3" and perhaps "5+2". Each pair of numbers adds up to the target number of "7". Adding the numbers "6" and "1" to get "7" is considered a convergent problem-solving exercise because there is only one correct answer. In divergent problem-solving exercises, there is no single correct answer. A student is challenged to discover one of many possible solutions. "Ways to Make" is one such exercise for divergent problem-solving and has implications in the development of creative and flexible thinking.

Figure 121:
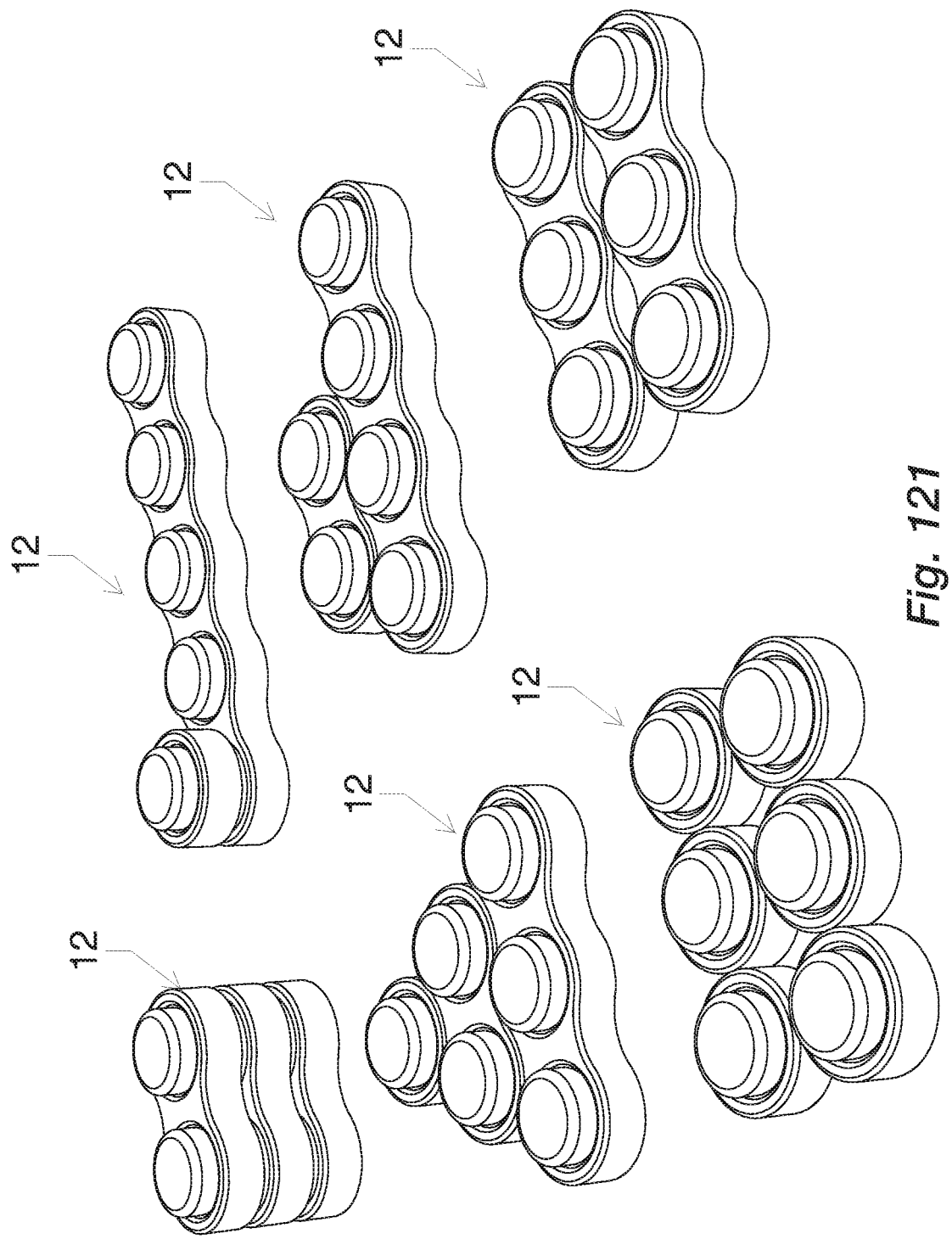
FIG. 121 shows trays and unit markers of an example magnetic building set.

The building system 1 can be implemented to play a version of "Ways to Make" whereby the student may make a number of tray and marker assemblies 12 that each add up to the target number. A few possible solutions to the "Ways to Make 6" challenge which are comprised of tray and marker assemblies 12 are illustrated in FIG. 121.

A modular game board 31 with protrusions 32 that mate with the tray indents 3 may be provided in the building set 1. The protrusions 32 on the game board 31 can be configured in a square grid and may allow the tray and marker assemblies 12 to be arranged adjacent to one another on the game board 31 and in a grid pattern. Game boards 31 themselves can be arranged adjacent to one another and in a grid to expand the area of play. Magnets 10 may be embedded within the protrusions 32 on the game board to allow the trays 2 to fit securely on the board 31.

Figure 122:
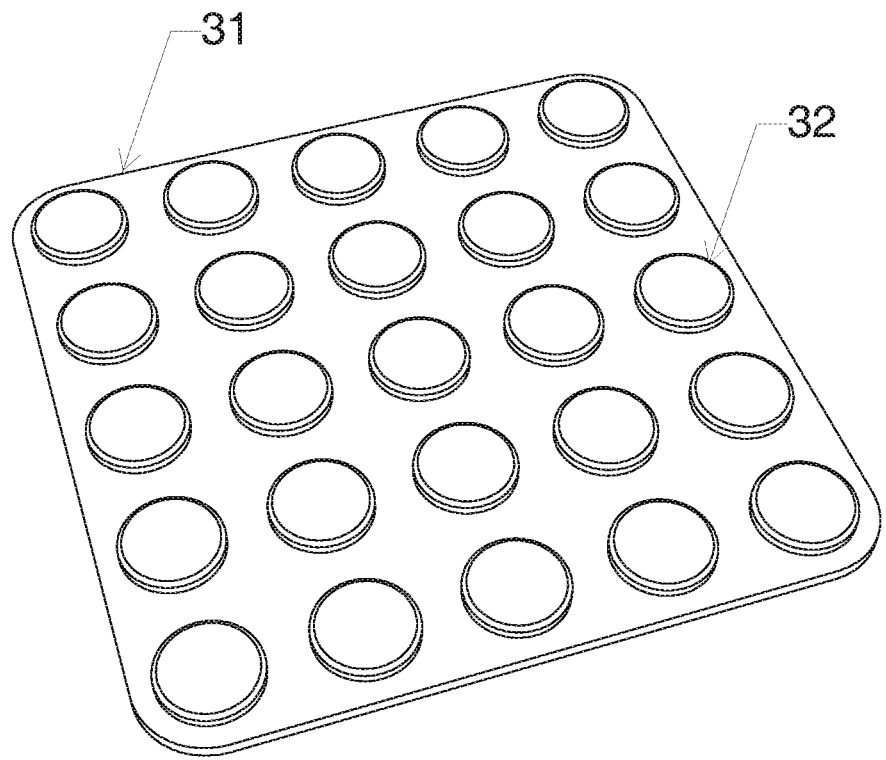
FIG. 122 shows a game board of an example magnetic building set.
Figure 123:
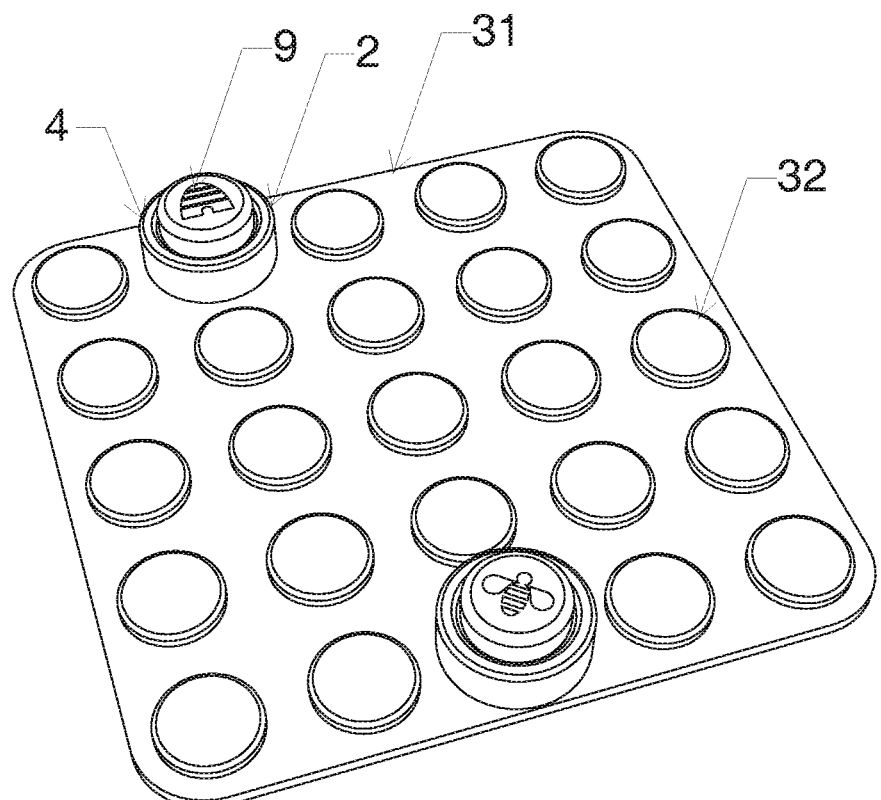
FIGS. 123-135 show a game board, trays, unit markers, and pictures of an example magnetic building set.

Another math game which can be played with the building set 1 incorporates and is played upon a game board 31 disclosed hereinabove as shown in FIG. 122. The object of the game is to build a path between a starting point and an ending point using tray and marker assemblies 12, while constrained by a given story problem. Story problems can be provided that offer different levels of challenge to players. Markers 4 can be provided that have been printed, painted, debossed, etched or otherwise inscribed with pictures 9 that describe the elements in the story problem. The story problem can also determine the positions of the starting and ending tray and marker assemblies 12. A first one-unit tray 2 containing a marker 4 with a picture 9 printed thereon may be placed on the game board 31 and may represent the character in the story and be implemented as the starting point in the path building challenge. A second one-unit tray 2 containing a marker 4 with a picture 33 printed thereon may be placed on the game board and may represent the goal in the story and be implemented as the ending point in the path building challenge. FIG. 123 illustrates a game board 31 with a starting point represented by a tray and marker assembly 12 with a honey bee picture 9 printed thereon and an ending point represented by a tray and marker assembly with a bee hive picture 9 printed thereon.

Figure 124:
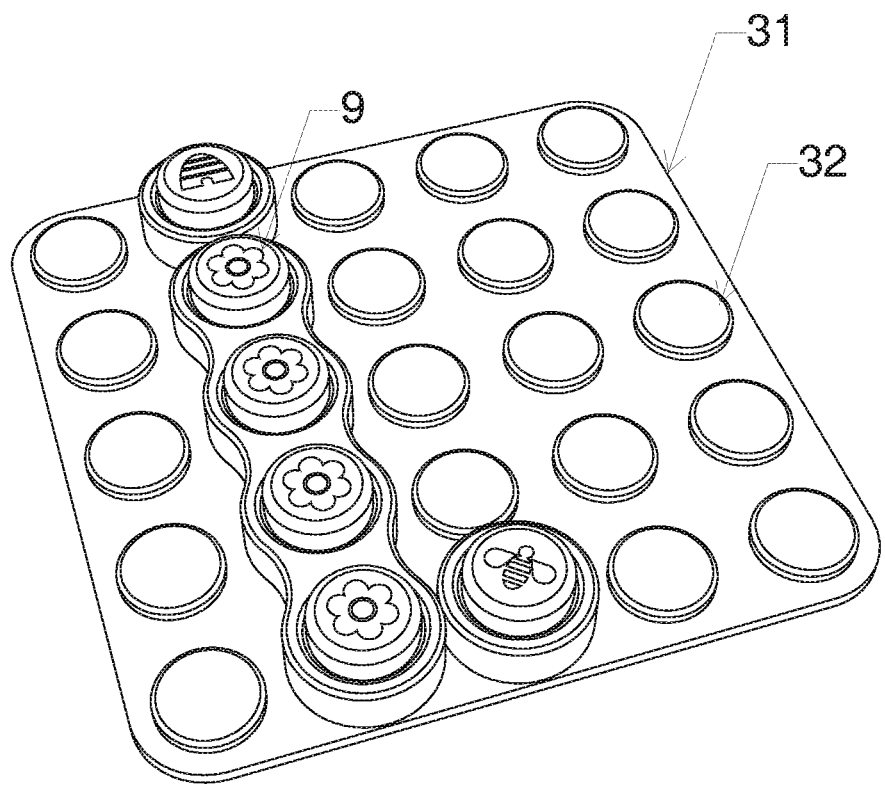
Figure 125:
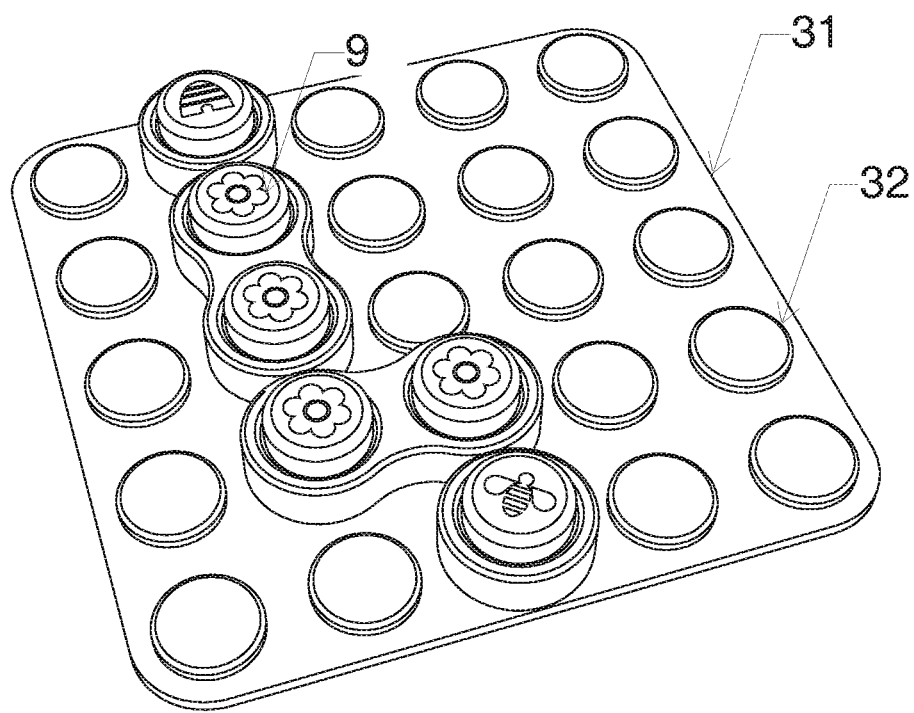
Figure 126:
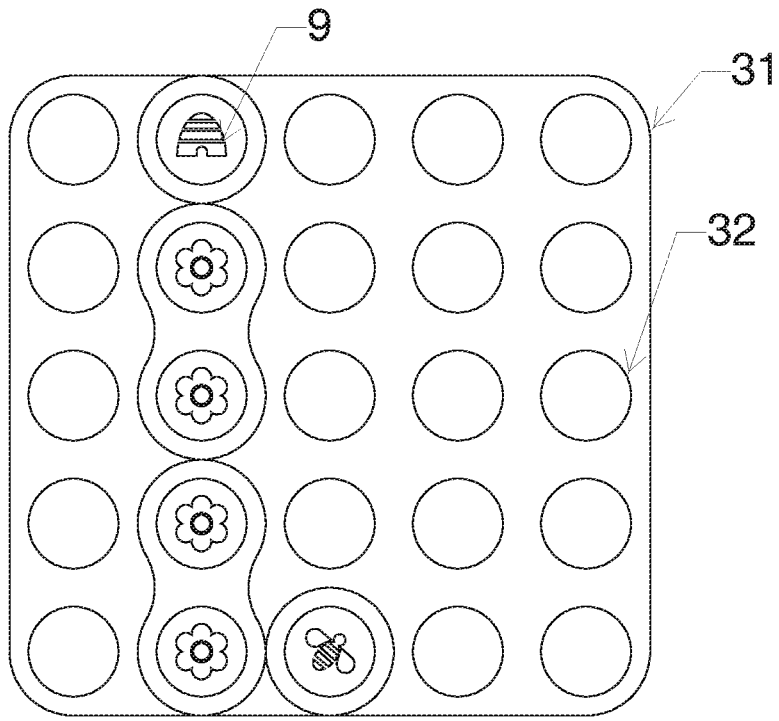
Figure 127:
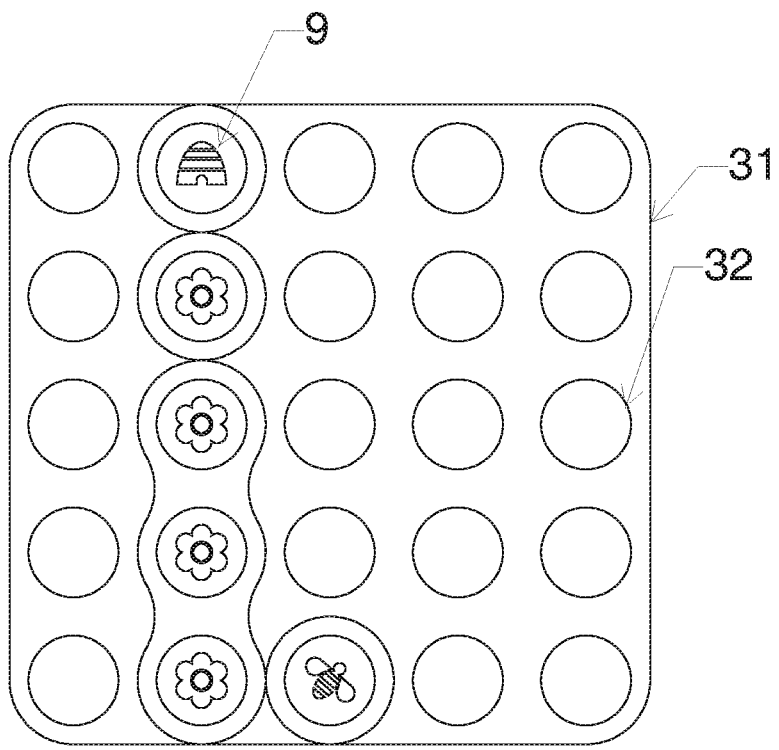
Figure 128:
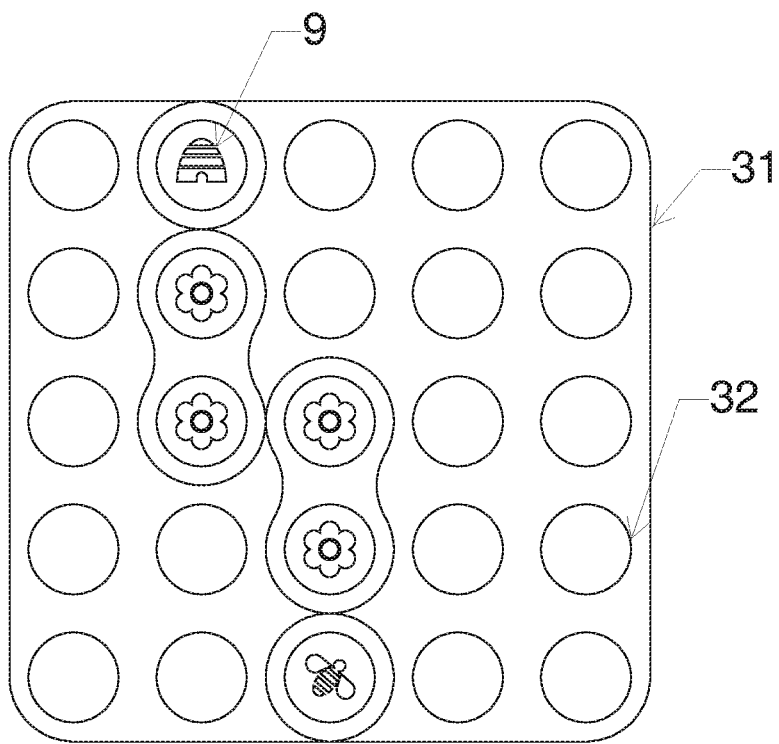
Figure 129:
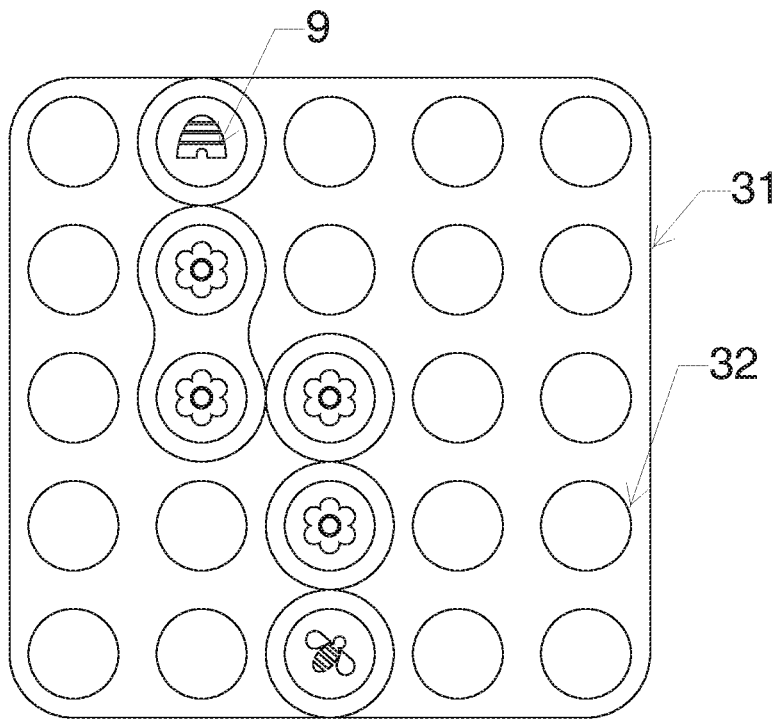
Figure 130:
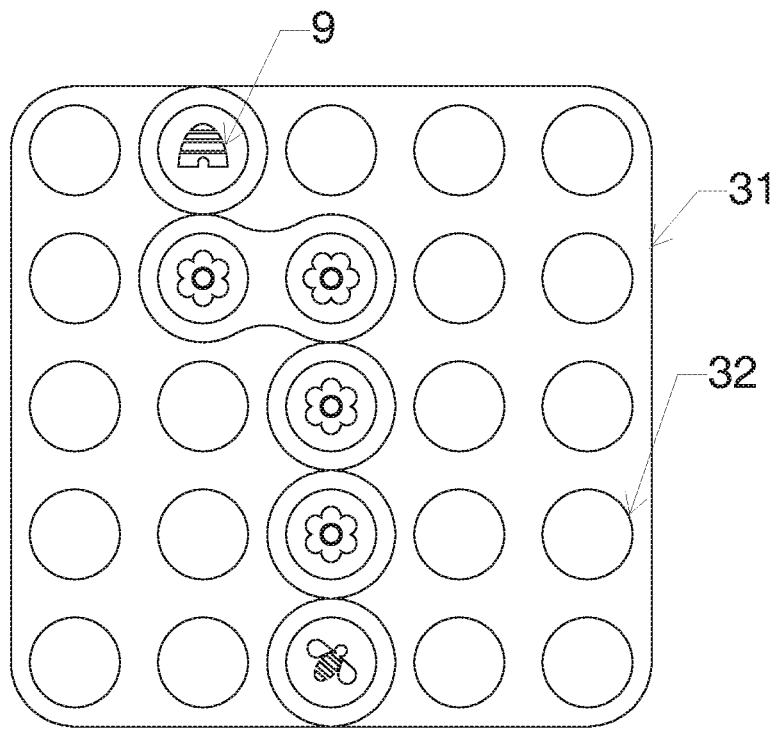
Figure 131:
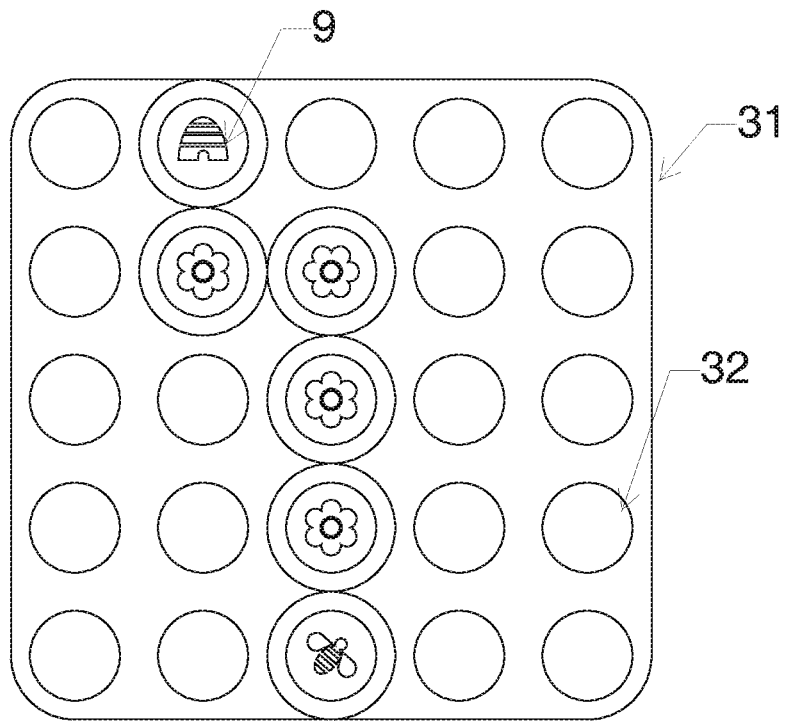
Figure 132:
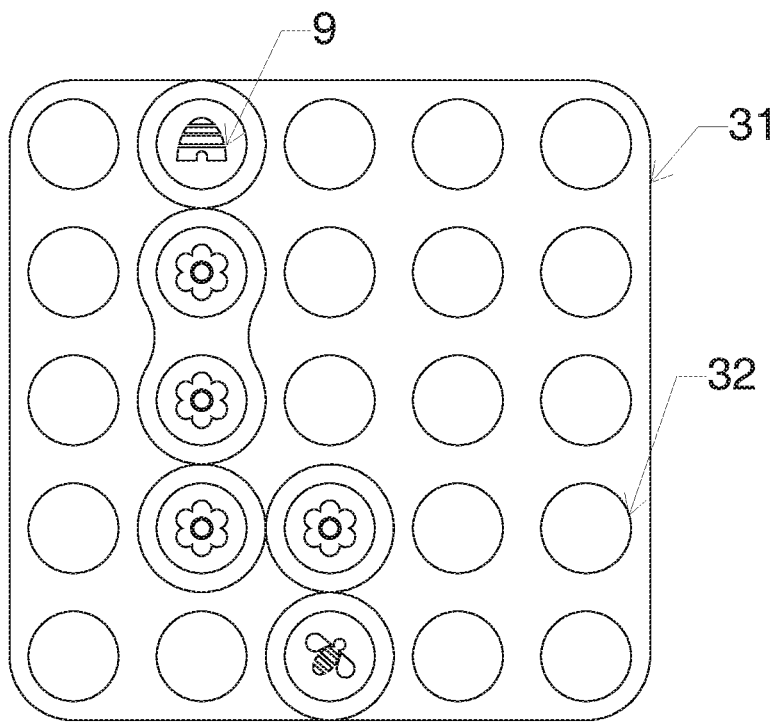
Figure 133:
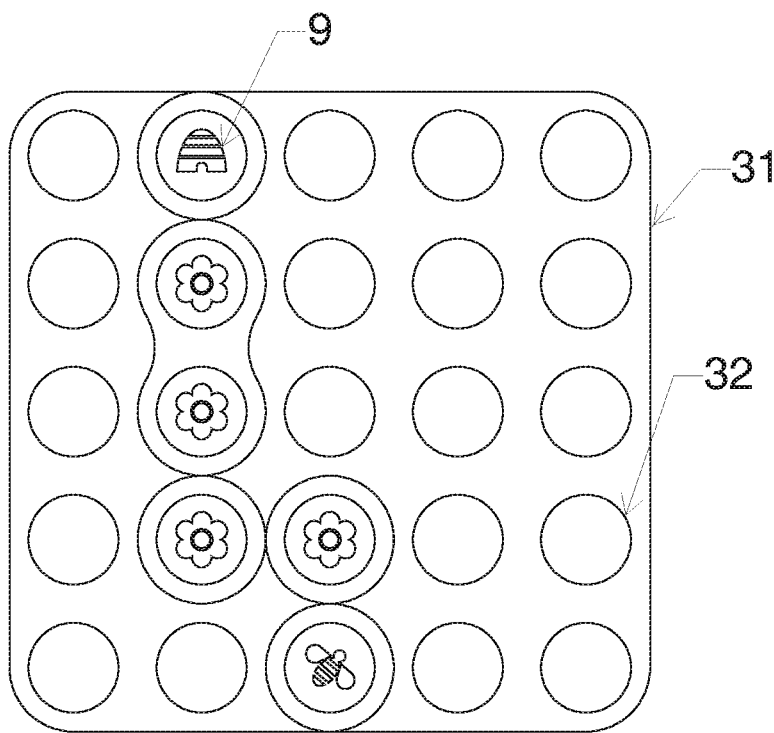
Figure 134:
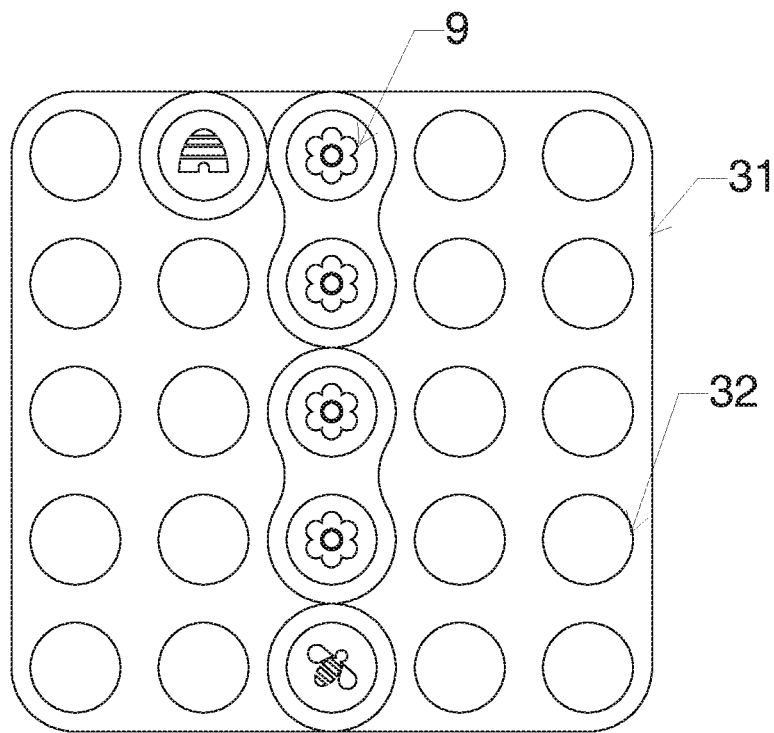
Figure 135:
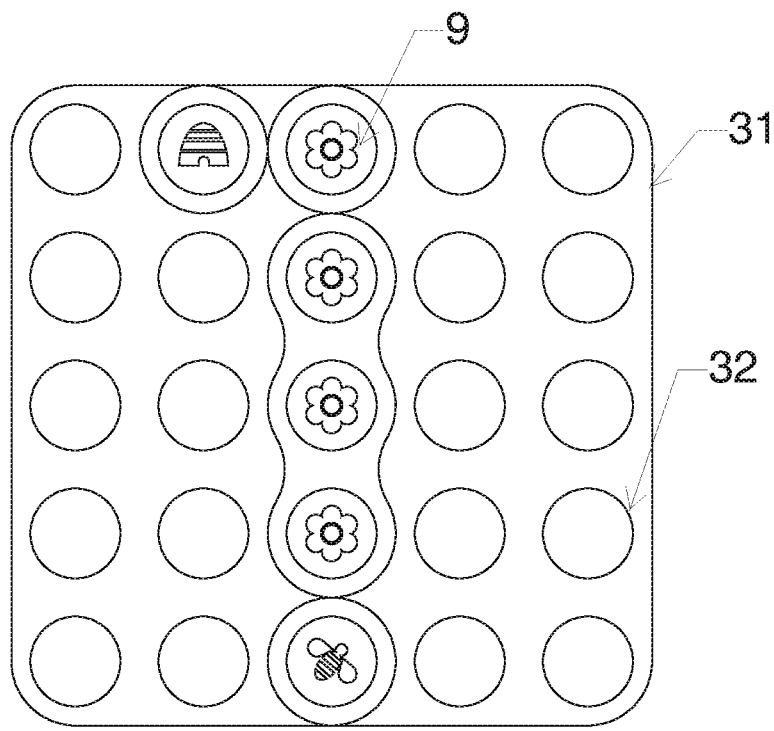
Figure 136:
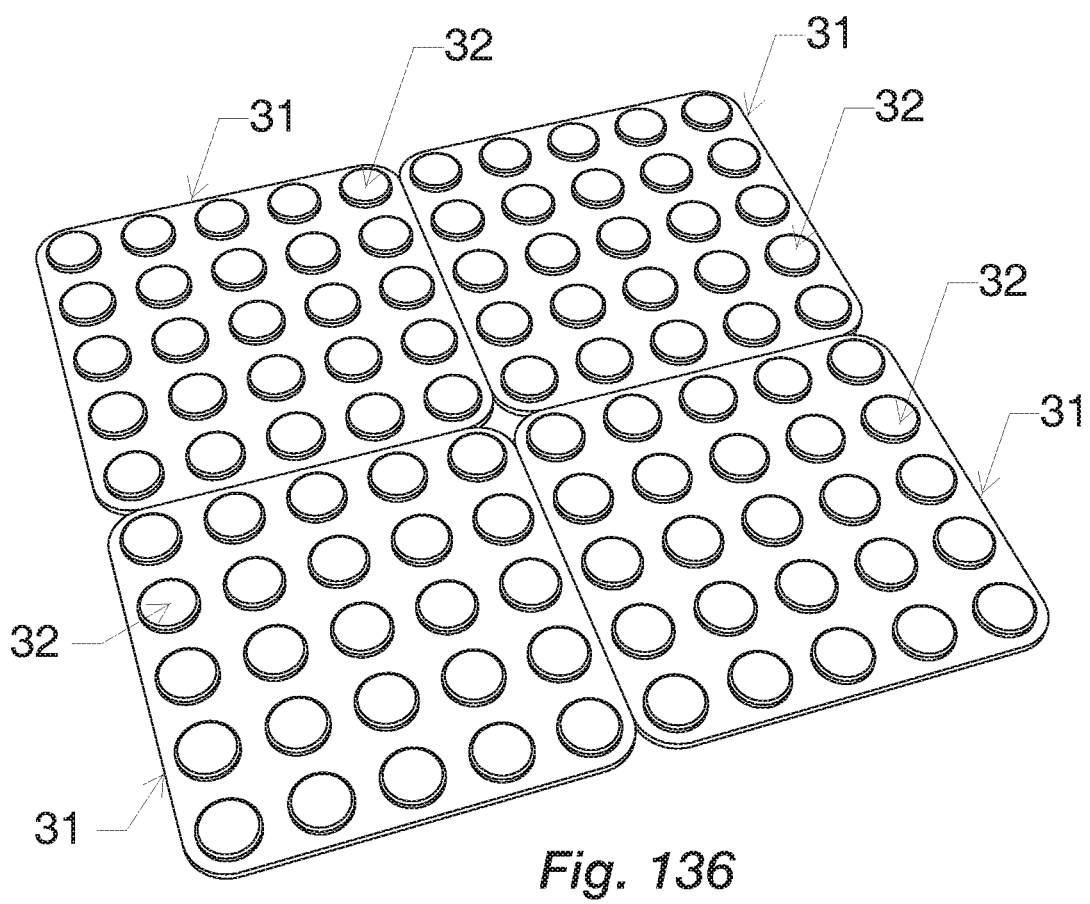
FIG. 136 shows a plurality of game boards of an example magnetic building set.

For instance, an exemplary story problem may be called "Bee Goes Home" and provides markers 4 with pictures 9 of a bee and a hive as shown in FIG. 123. The story problem might be written as "Help Bee visit 4 flowers before going home," which presents a puzzle to the player for divergent problem-solving. There are many solutions to this particular story problem. A player might select a single four-unit tray 2 to form a straight path as shown in FIG. 124 or the player might choose to build a path that turns and is composed of two two-unit trays 2 as shown in FIG. 125. A variety of solutions to this story problem are illustrated in FIGS. 126-135. The path building game offers to a student an engaging method to practice counting, subitizing and composing and decomposing the challenge path length, in this case "4", into component parts comprised of tray and marker assemblies 12.

Geometric Shapes.

Figure 137:
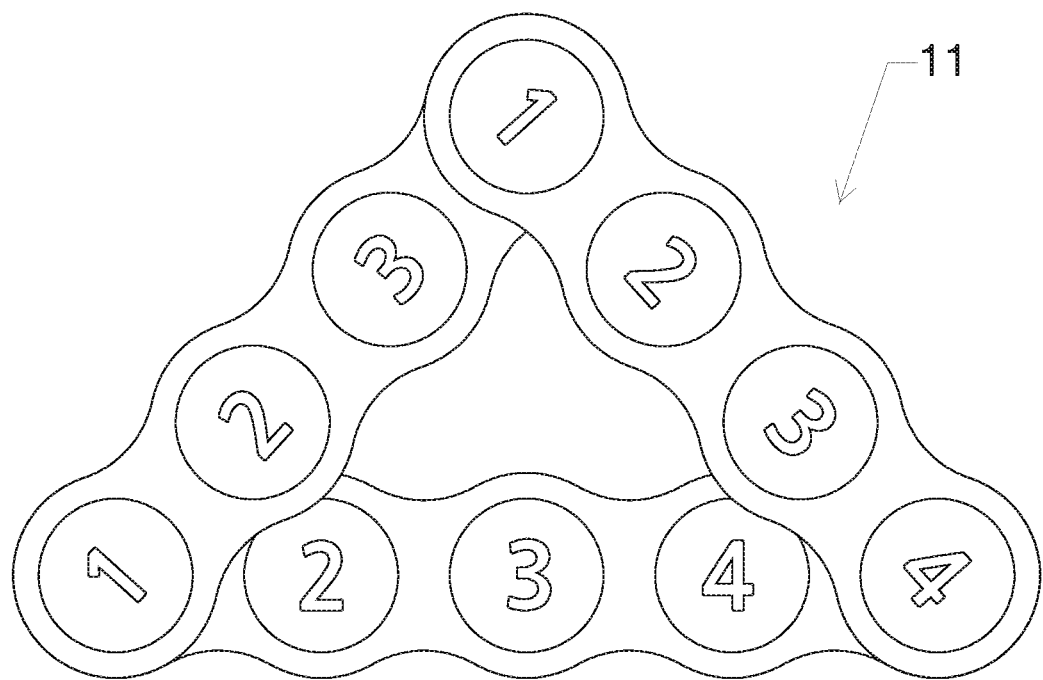
FIGS. 137-149 show shapes or structures made from trays and unit markers of an example magnetic building set.
Figure 138:
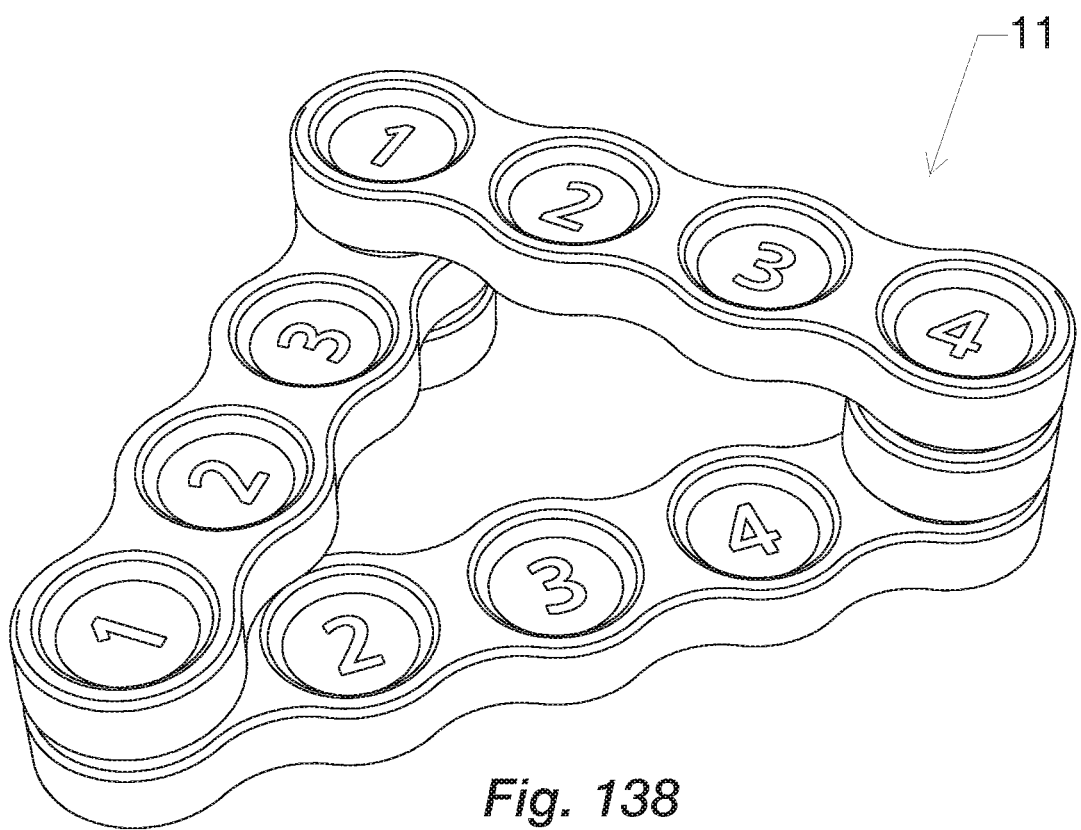
Figure 139:
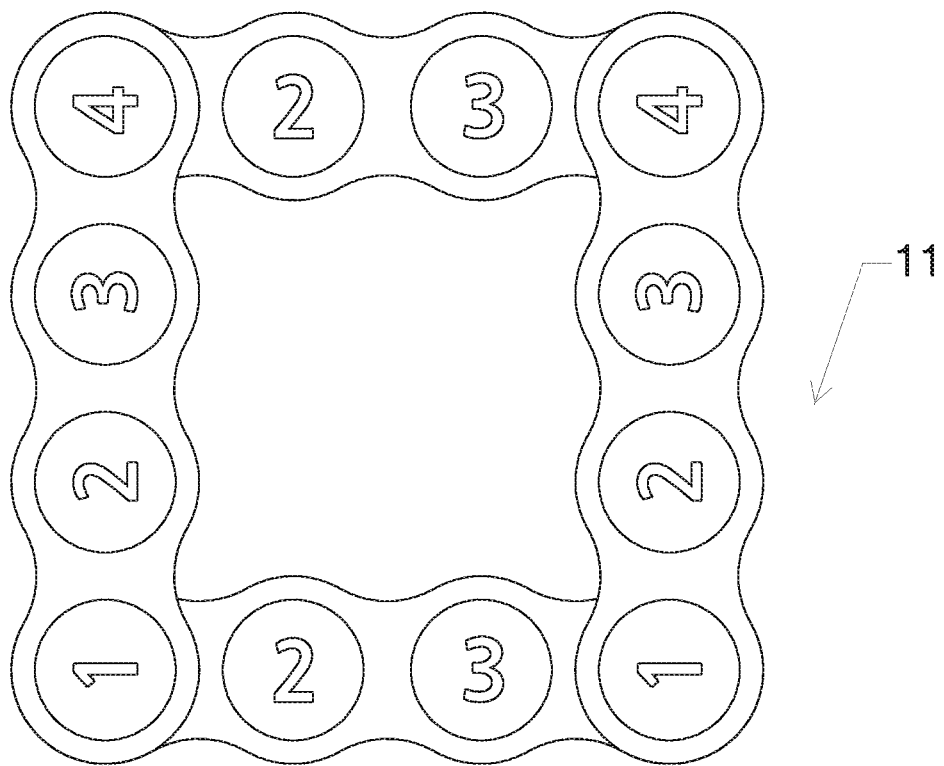
Figure 140:
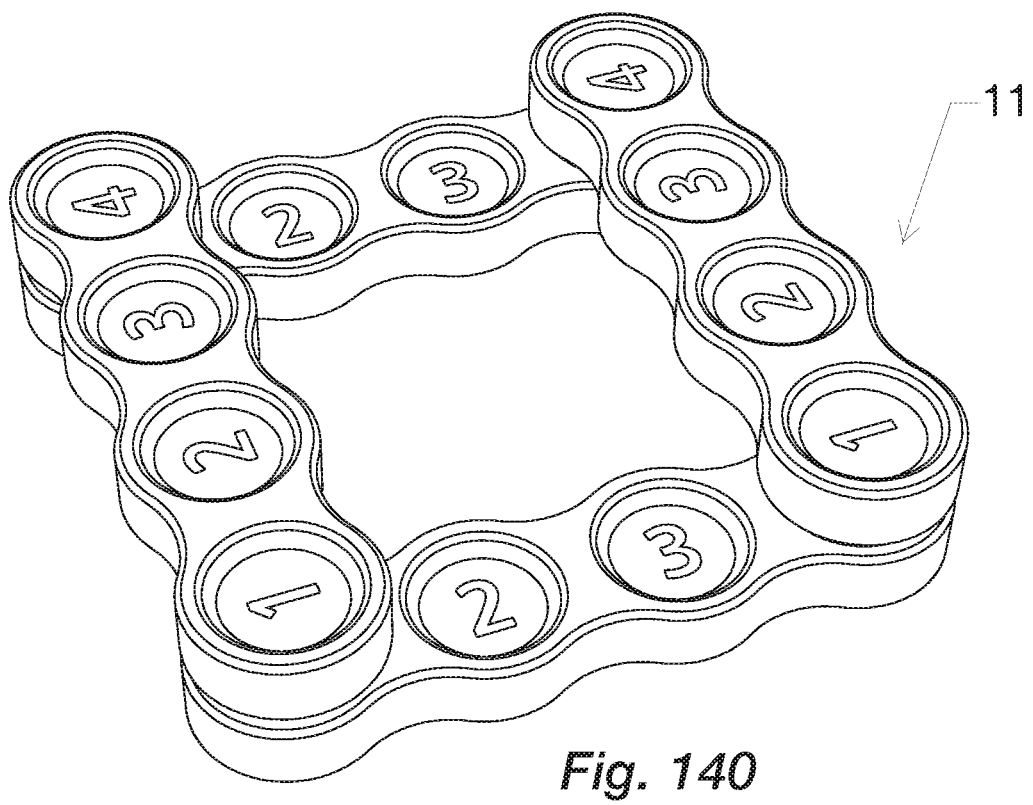
Figure 141:
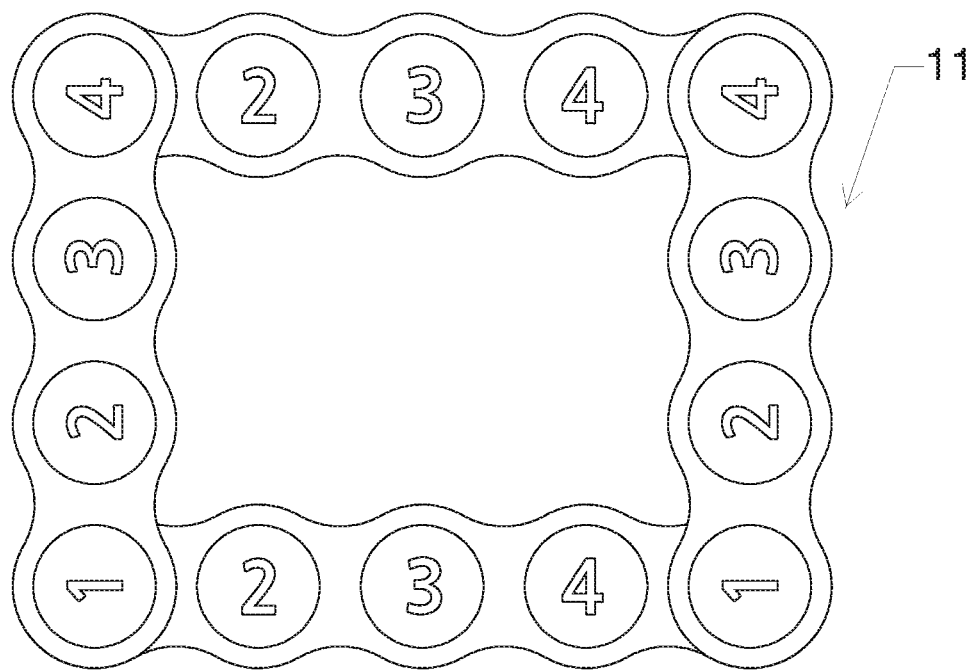
Figure 142:
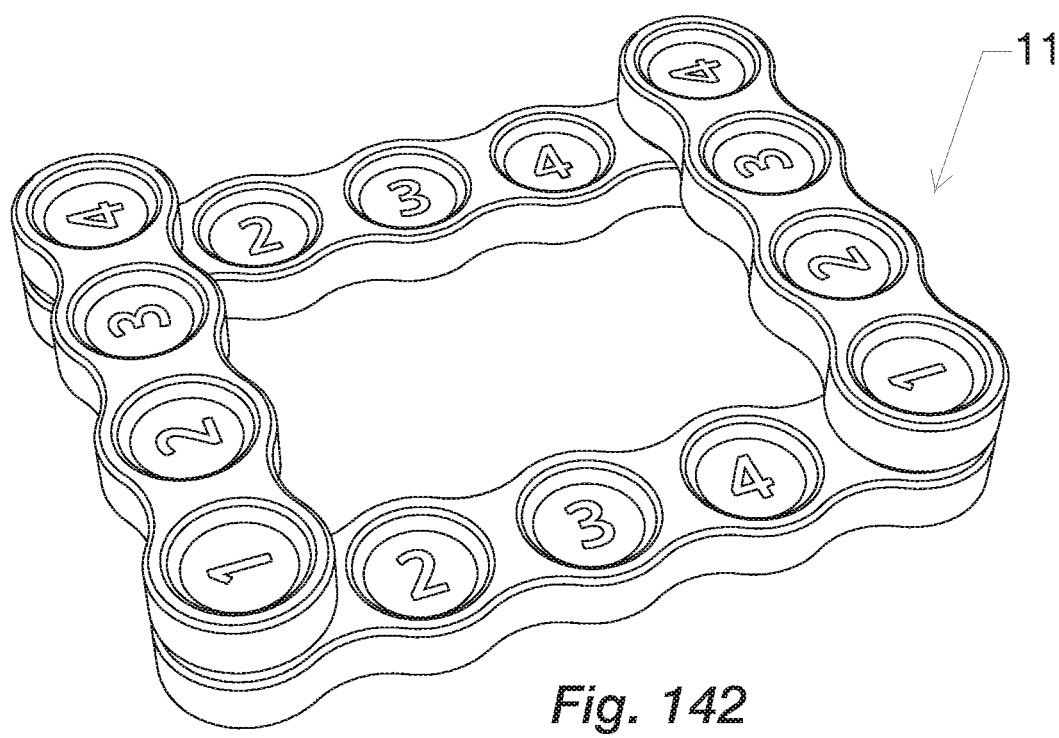
Figure 143:
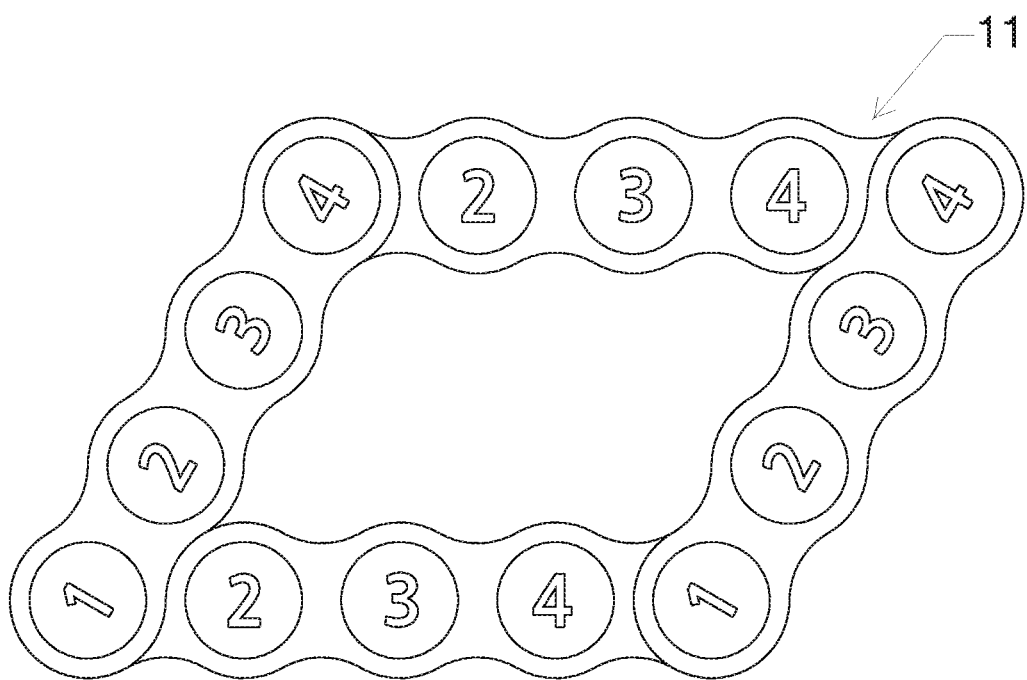
Figure 144:
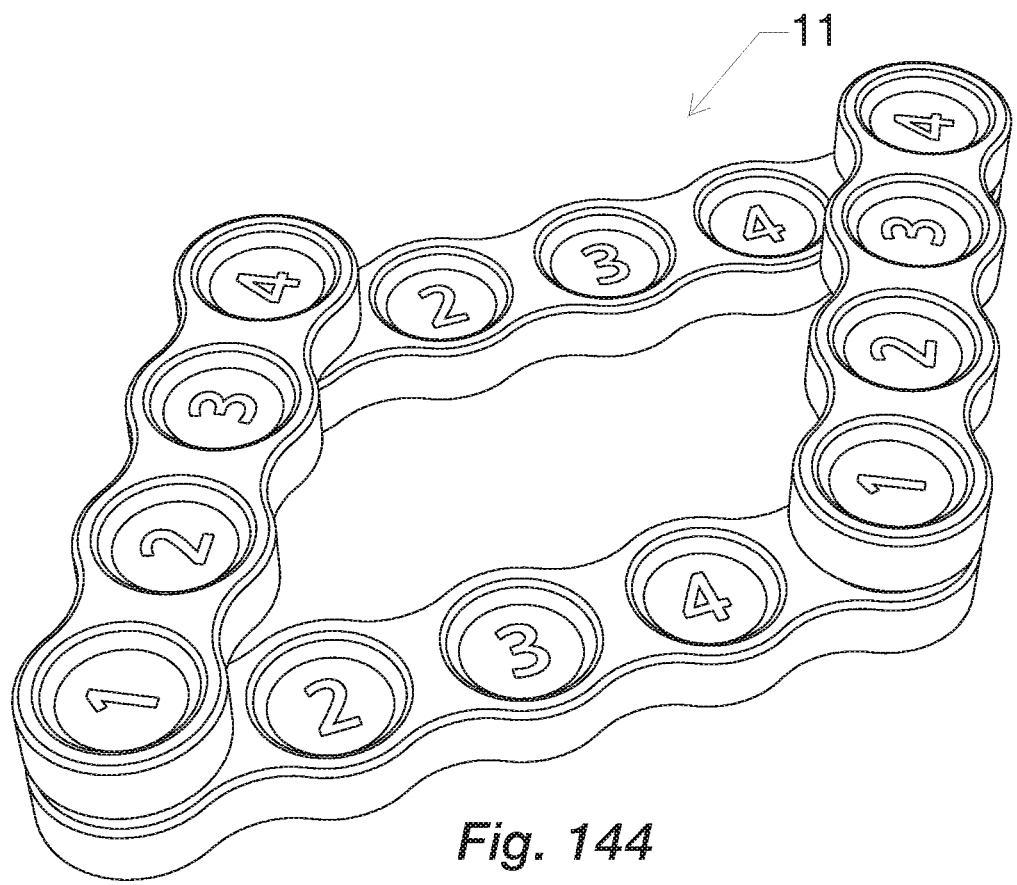
Figure 145:
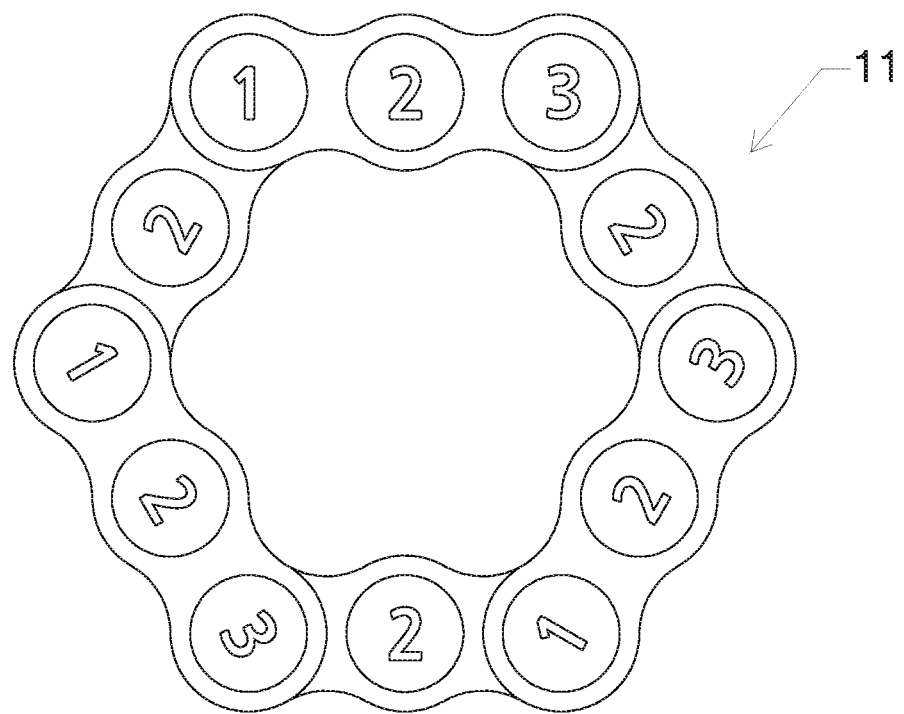
Figure 146:
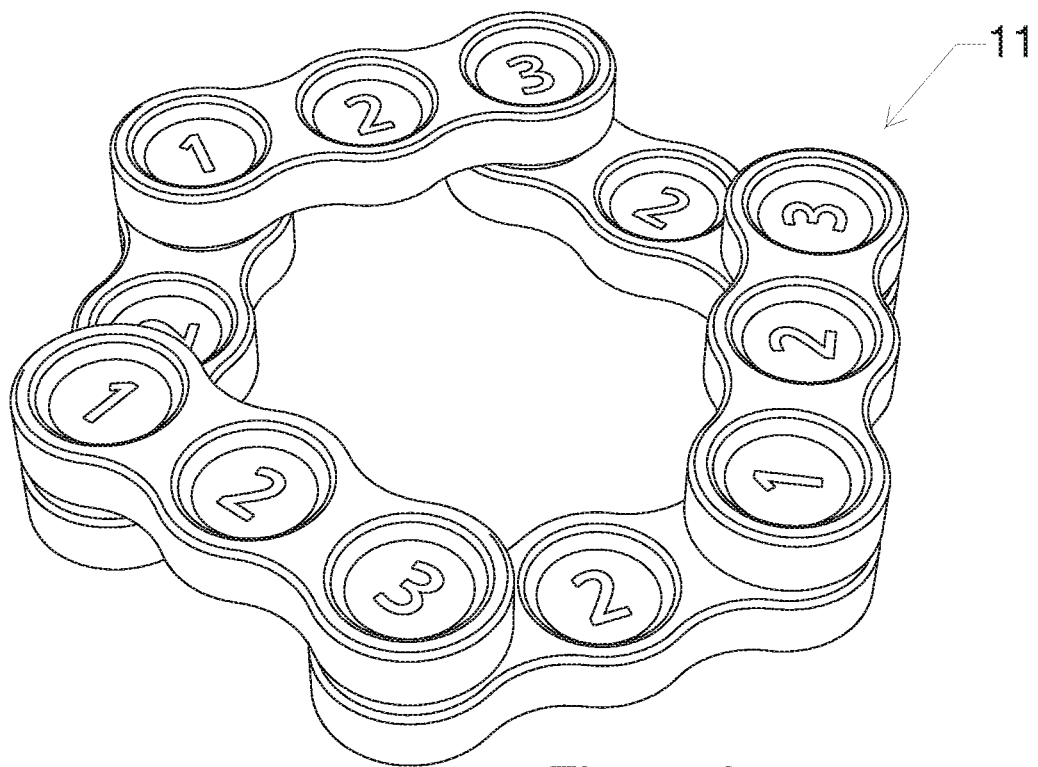

With instruction from a teacher, a student may learn about and build geometric shapes 11 including but not limited to a triangle as illustrated in FIGS. 137 and 138, a square as illustrated in FIGS. 139 and 140, a rectangle as illustrated in FIGS. 141 and 142, a parallelogram as illustrated in FIGS. 143 and 144 and a hexagon as illustrated in FIGS. 145 and 146.

Building Set Capabilities.

Figure 147:
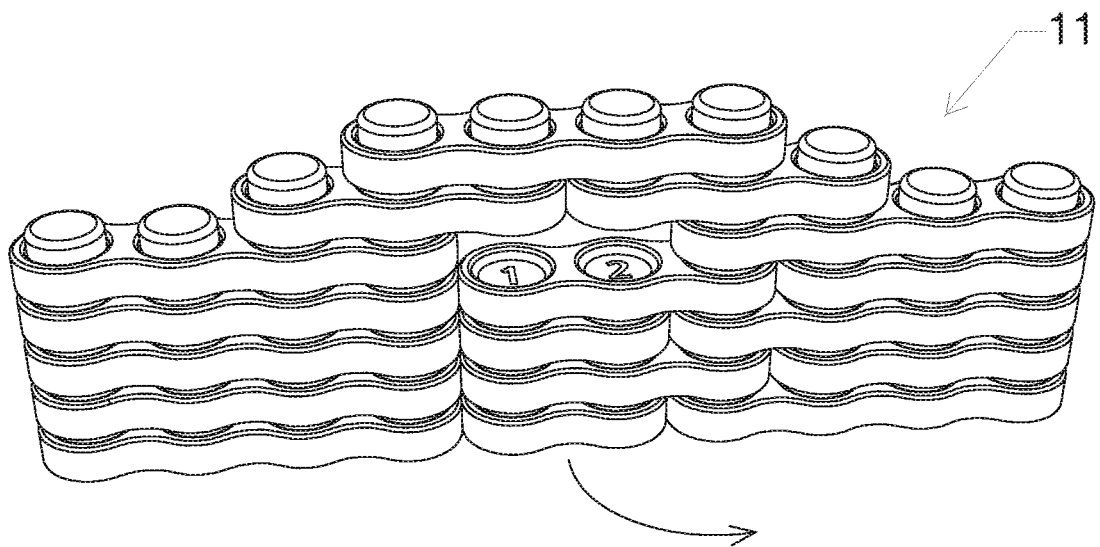
Figure 148:
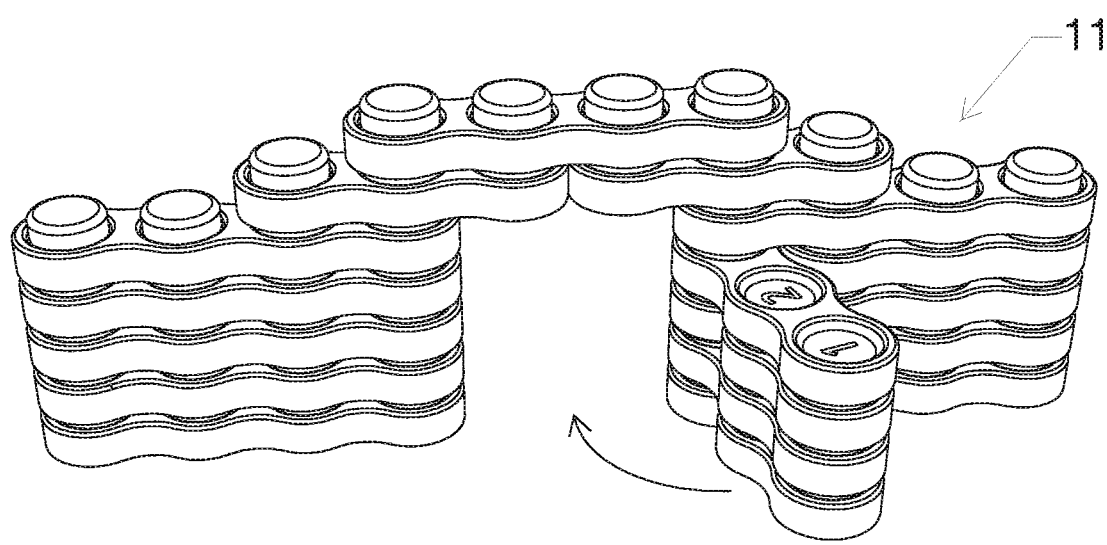
Figure 149:
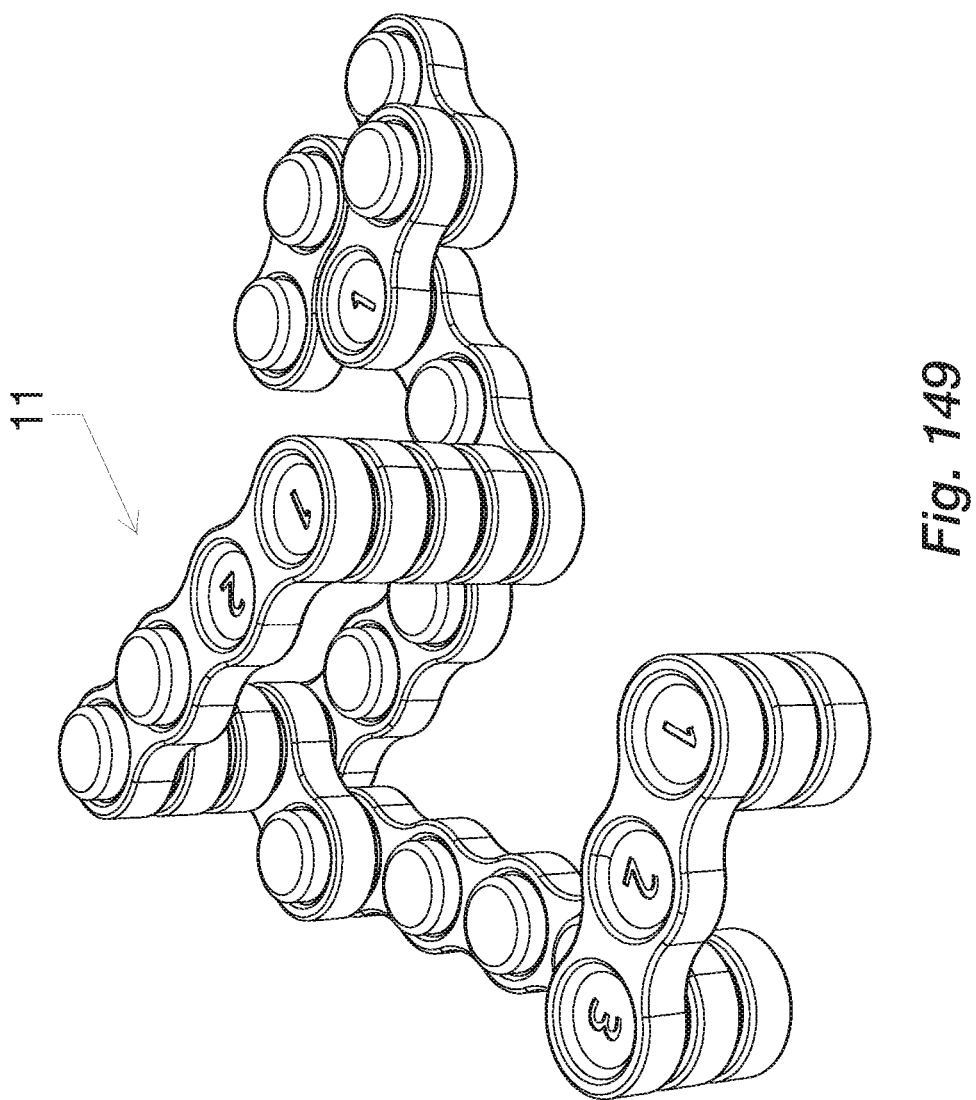

The following features of the building set can provide a flexible framework with which students may build a variety of shapes, structures, constructions or arrangements 11 during constructive play; indents 3 on opposing sides of the trays 2 which may allow them to be stacked when markers 4 are inserted therein, lateral interlocking profiles 30 and the relationship of indent centerlines within the trays 2 which may allow them to be arranged in square and triangular grid patterns 11 and magnetic connections 10 between the markers 4 and the indents 3 in the trays 2 which may provide freedom of movement around the rotational axis that runs through the centerlines of the markers 4 and indents 3. FIG. 147 shows a structure 11 built from tray and marker assemblies which is a wall that possesses a door with operable hinge, FIG. 148 shows the door in an open position. As evident in FIG. 149, highly complex structures and arrangements 11 may be built with the building set incorporating the features outlined hereinabove, thus permitting the set to be employed in teaching or self-guided learning of basic structural design and assembly techniques.

Modeling and Spelling Words.

Figure 150:
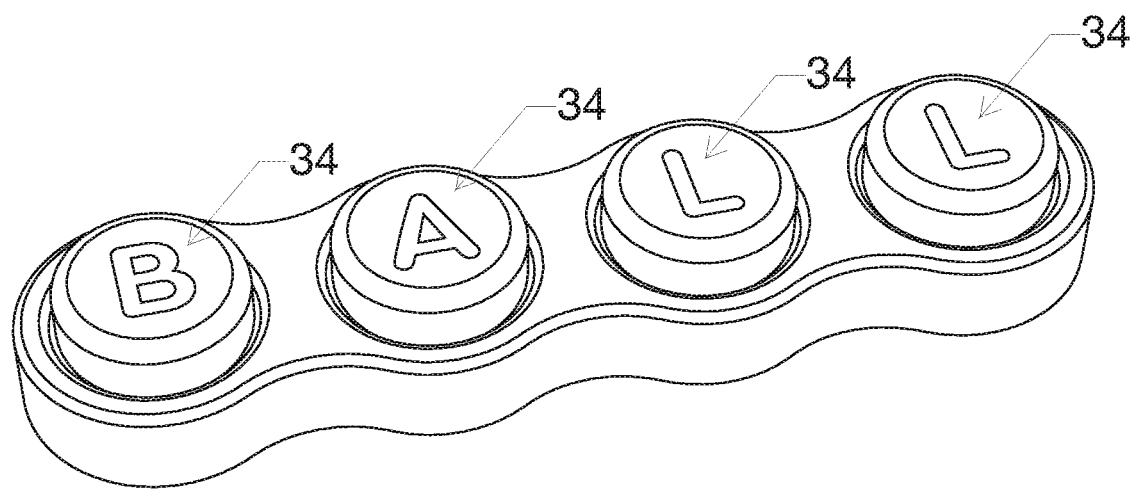
FIG. 150 shows a tray and letter markers of an example magnetic building set.

Letters of the Latin alphabet may be inscribed on the unit markers, hereinafter called letter markers 34. Letter markers 34 can be inserted into the slots or indents 3 in a tray 2 and employed to model words. For instance, FIG. 150 shows a sequence of unit markers 4 having a sequence of letters "B", "A", "L" and "L" inscribed respectively thereon and inserted into a four-unit tray 2, thus modelling the word "ball." Depending on the length of a single tray 2 or the length of a sequence of trays 2 employed, words of various character lengths may be modeled.

Example Word Games Played with the Building Set.

With instruction from a teacher, a student may learn to model and spell words using assemblies 12 of trays 2 and letter markers 34. To further enhance students' experience of learning to model and spell words, a few example games may be played with trays and letter markers.

With assistance from a teacher, a student may play an example word game called "Word Length Challenge." To begin a round of the game, the teacher selects a unit-tray 2 of a particular length, in this example a three-unit tray 2. The teacher then speaks a target word having the same character length as the selected unit-tray 2 and instructs the student to spell the target word. By providing the tray 2 at the outset of the round, the teacher provides the student with a hint as to the number of characters needed to correctly spell the word. In a more challenging form of the game, the teacher may speak the target word but require that the student select the tray 2 themselves.

Figure 151:
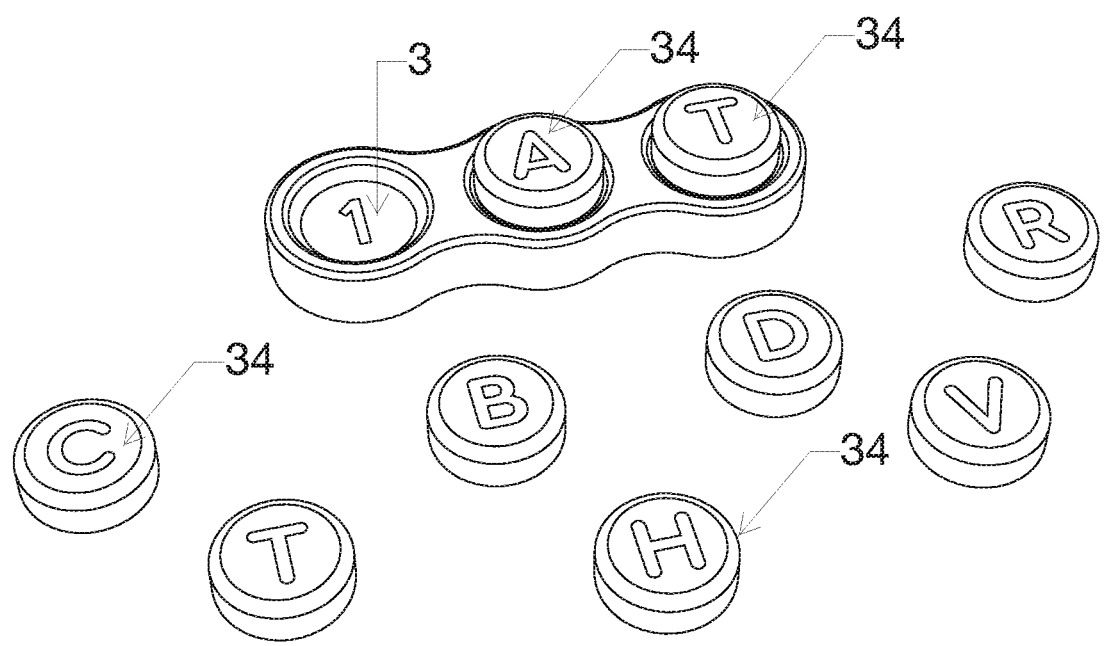
FIG. 151 shows a tray and letter markers of an example magnetic building set.
Figure 152:
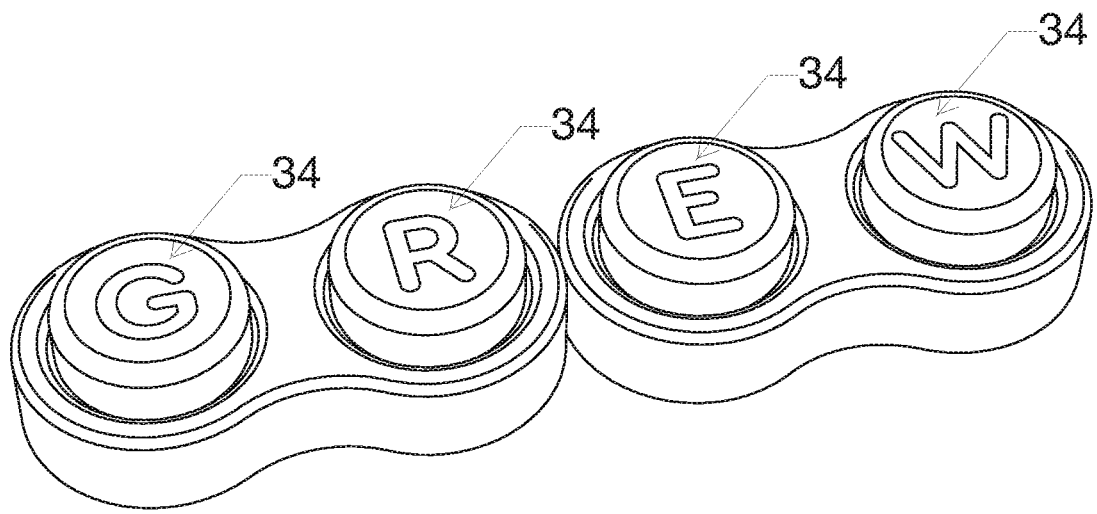
FIG. 152 shows trays and letter markers of an example magnetic building set.
Figure 153:
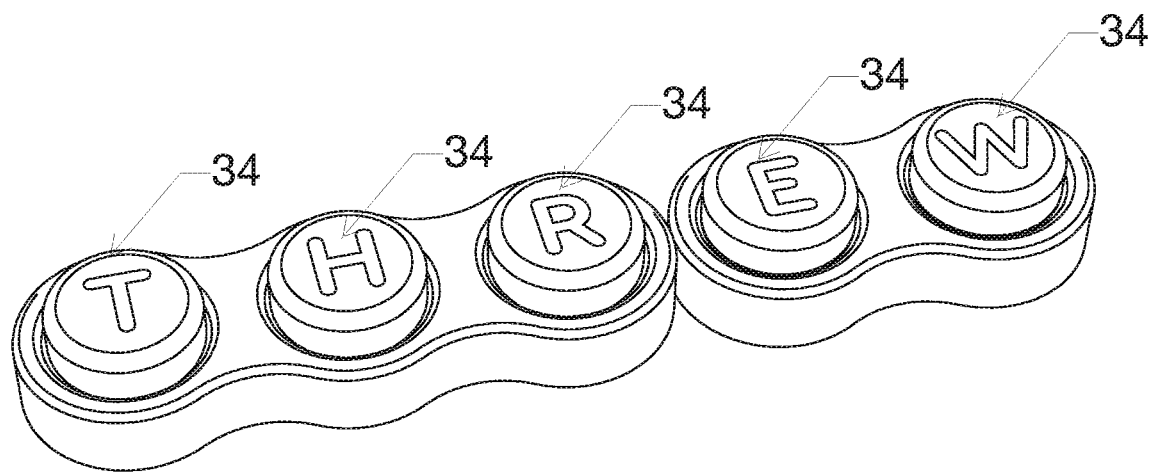
FIG. 153 shows trays and letter markers of an example magnetic building set.

With assistance from a teacher, a student may play an example word game called "Vocabulary Challenge—Same Ending." In an example game, the teacher may assemble and present to the student a tray 2 containing letter markers 34 placed in each respective slot or indent 3 of the tray 2 with the exception of the first letter in the word, which will be left blank with no letter marker 34 inserted. For instance, the teacher may present a three-unit tray 2 which contains no letter marker 34 in the left-most and first slot 3, a letter "A" marker 34 in the second slot 3 from the left and a letter "T" marker 34 in the third and final slot 3 from the left. This tray 2 may be called hereinafter the "game" tray and the state whereby the first position slot 3 is left blank and the remaining slots 3 are filled by the teacher with letter markers 34 will be called hereinafter the "starting state" of the game tray. The teacher may place the game tray 2 on a work surface. The teacher may also place on the work surface and adjacent to the game tray 2 a quantity of letter markers 34. FIG. 151 illustrates the game tray 2 and letter markers 34 on the work surface at this stage of the game. The teacher may then challenge the student to model as many words as they can that have the same ending but different first letters. The student may first select a letter marker 34 from the work surface and insert it into the empty first-most slot 3 in the game tray 2 in order to model a word. After the student has modeled a word correctly, the teacher may record the word modeled and return the game tray 2 to the starting state by removing the letter marker 34 in the first position slot. The student may then repeat the process whereby they select a new letter marker 34 from the building set 1 on the work surface, insert it into the empty slot 3 in the game tray 2 to model a new word. A more challenging form of the game might employ more than one tray 2 where the letter markers 34 of the "same ending" portion of the word are inserted into their own tray 2. The student may then select a second tray 2, insert letter markers 34 into the second tray 2 and finally place the second tray 2 adjacent to and in a co-linear relationship with the first tray 2 to model a word. In this form of the game, many more words might be modeled since the beginning portion of the word that the student selected can be of a character length greater than one as seen in FIG. 152 and FIG. 153.

Figure 154:
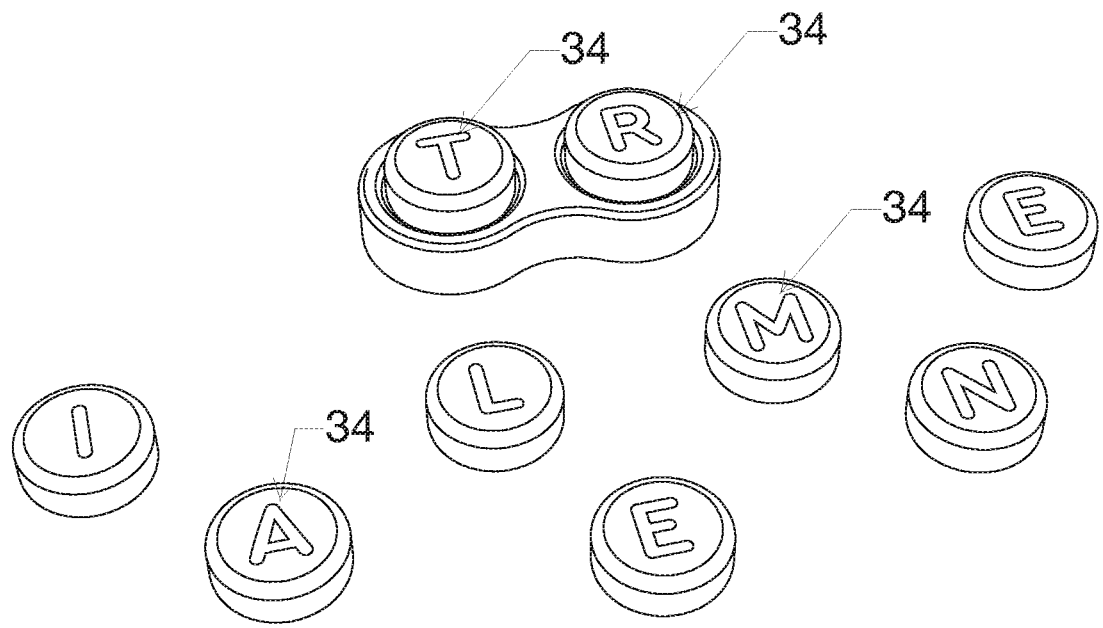
FIG. 154 shows a tray and letter markers of an example magnetic building set.
Figure 155:
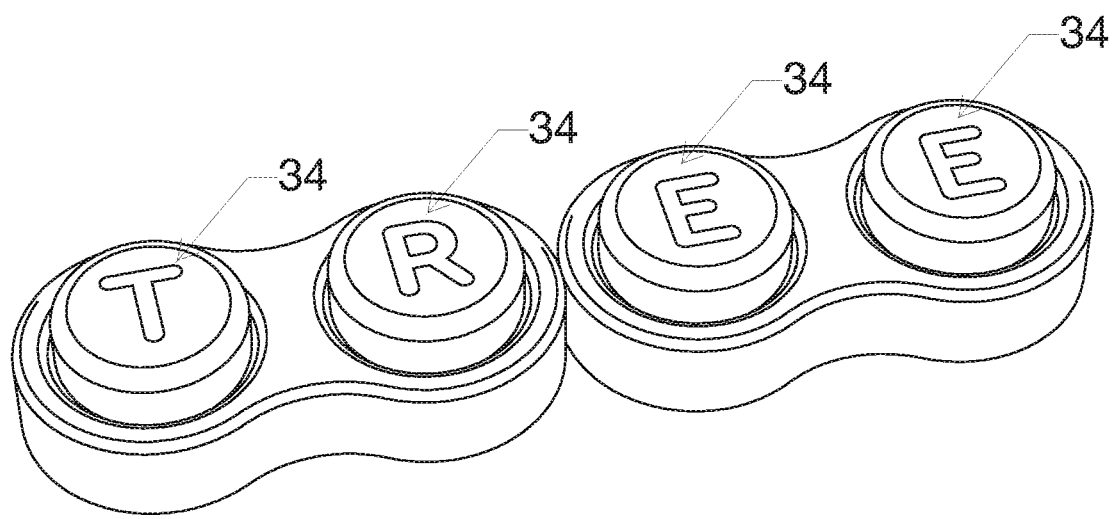
FIG. 155 shows trays and letter markers of an example magnetic building set.
Figure 156:
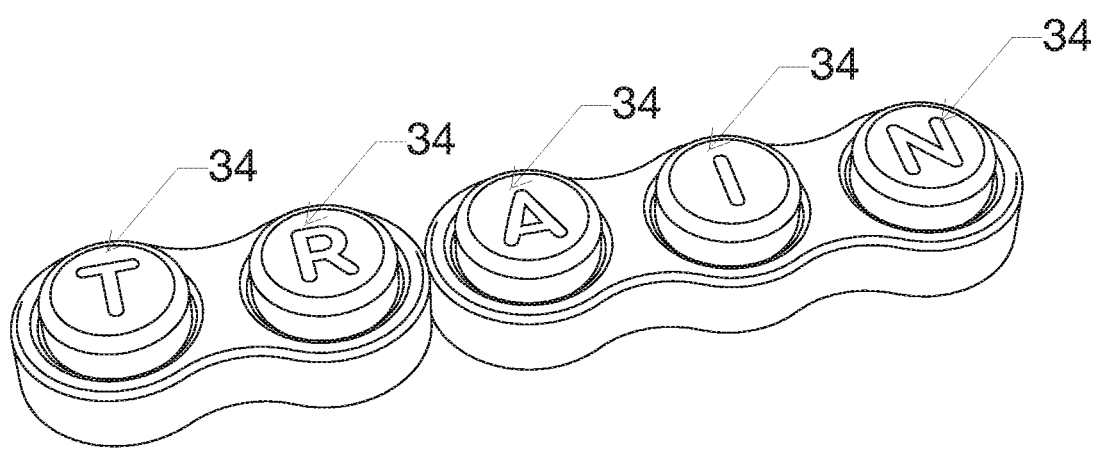
FIG. 156 shows trays and letter markers of an example magnetic building set.
Figure 157:
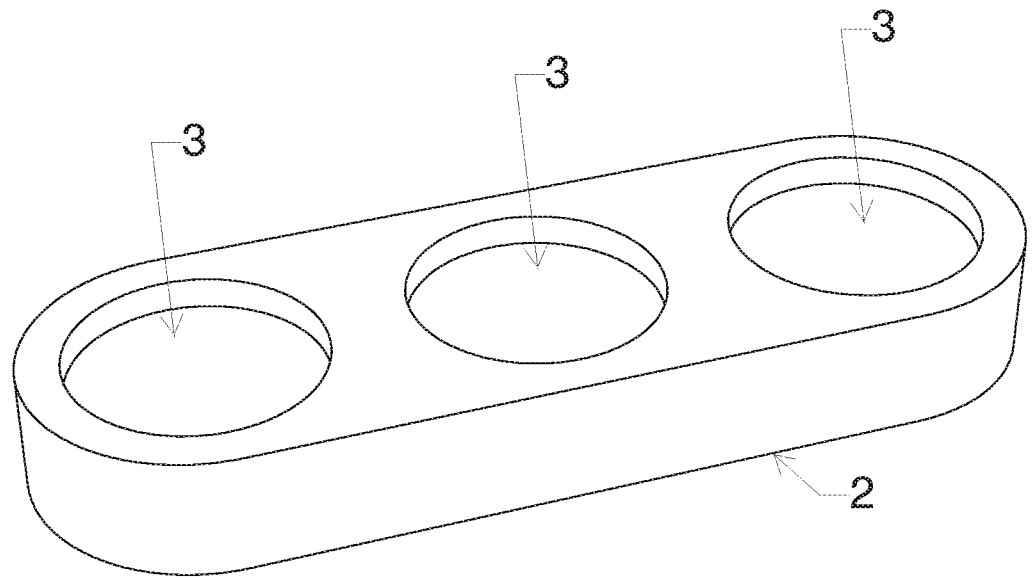
FIG. 157 shows a tray of an example magnetic building set.
Figure 158:
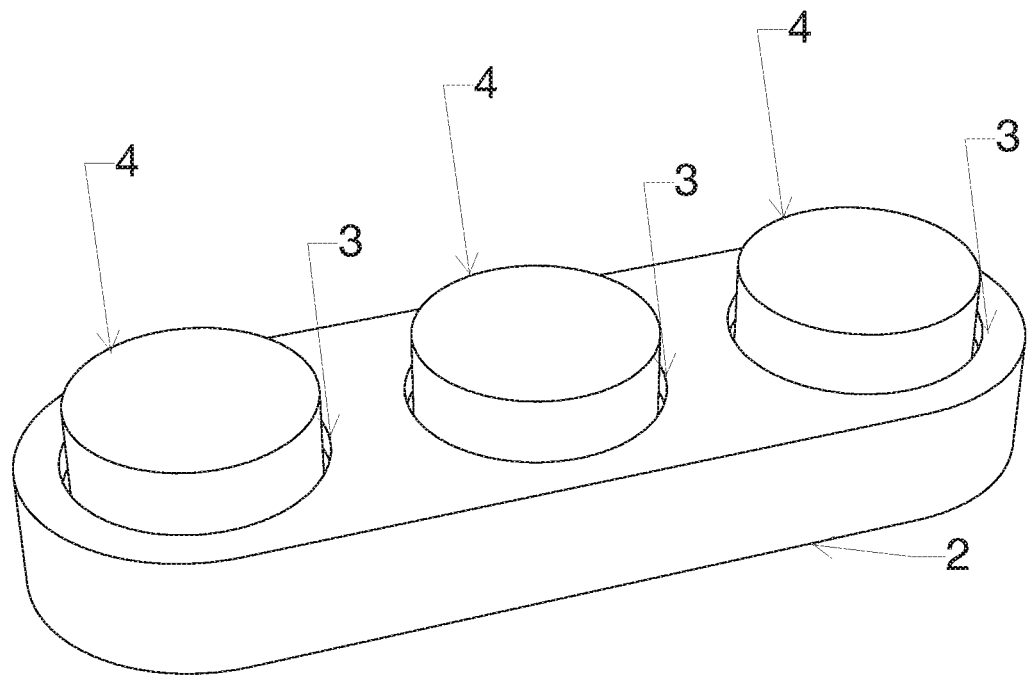
FIG. 158 shows a tray and unit markers of an example magnetic building set.
Figure 159:
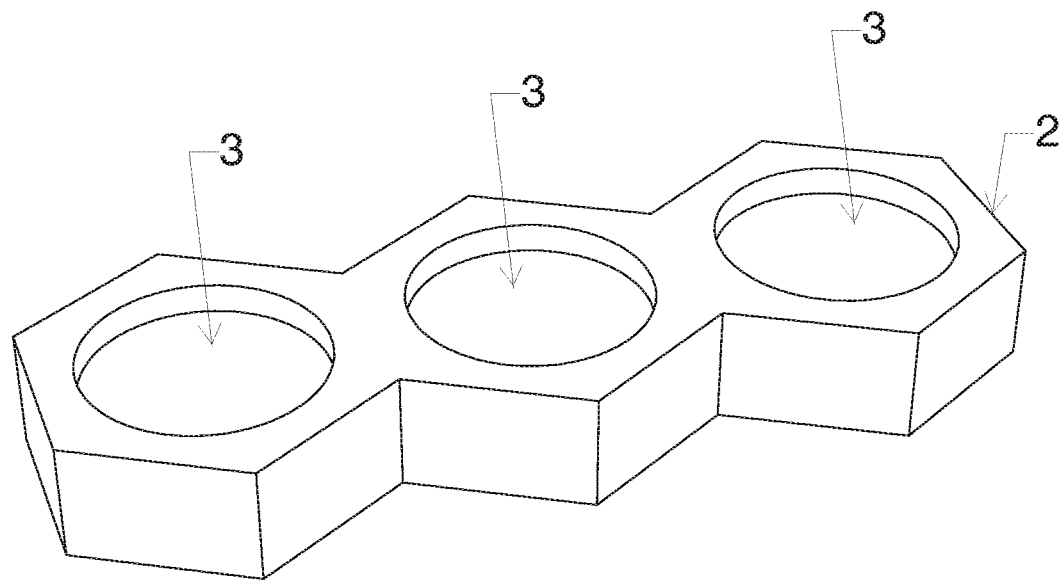
FIG. 159 shows a tray of an example magnetic building set.
Figure 160:
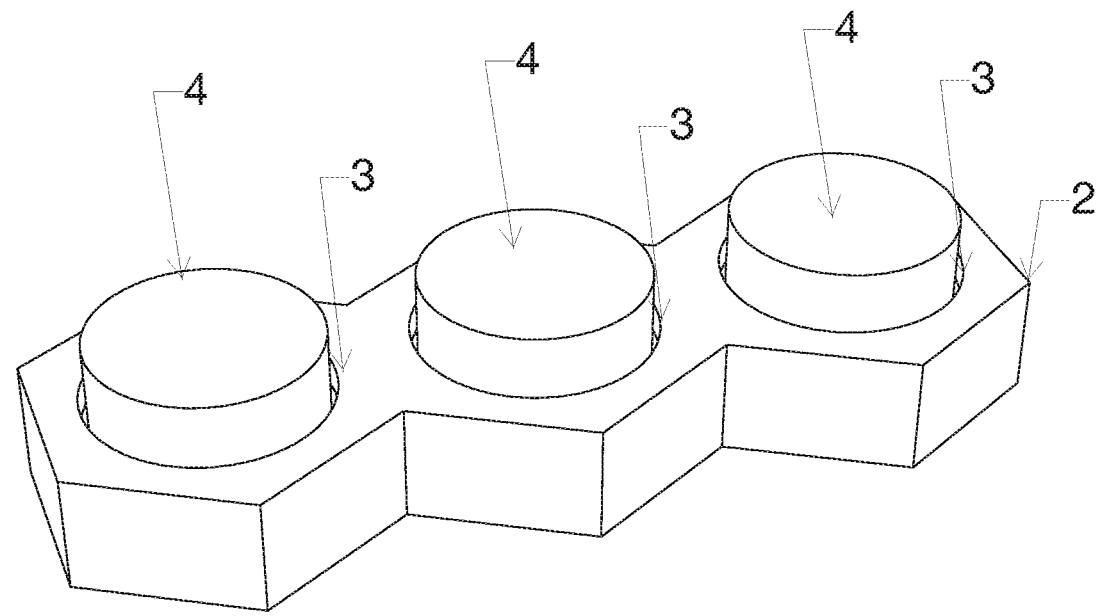
FIG. 160 shows a tray and unit markers of an example magnetic building set.
Figure 161:
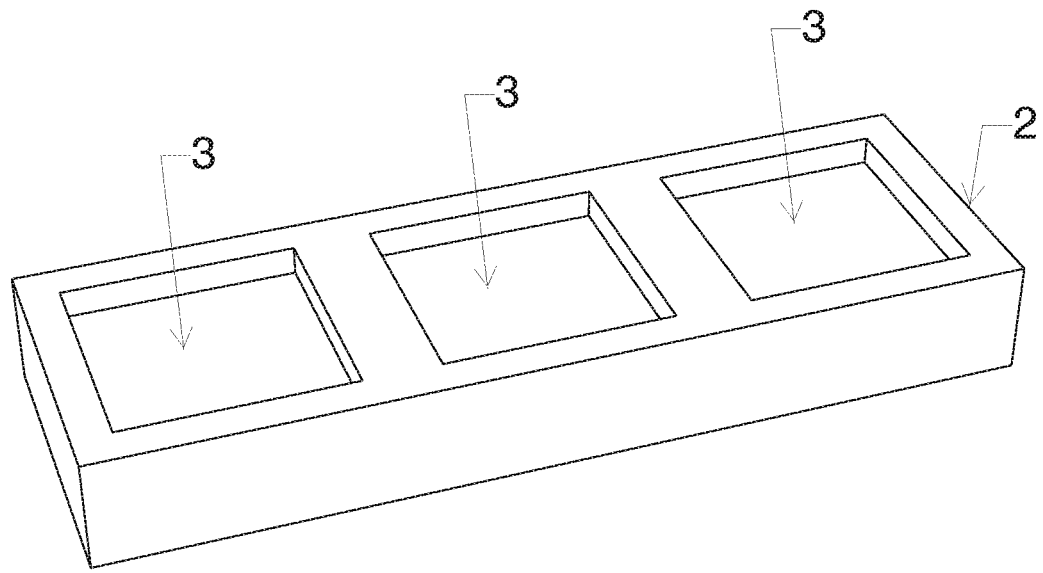
FIG. 161 shows a tray of an example magnetic building set.
Figure 162:
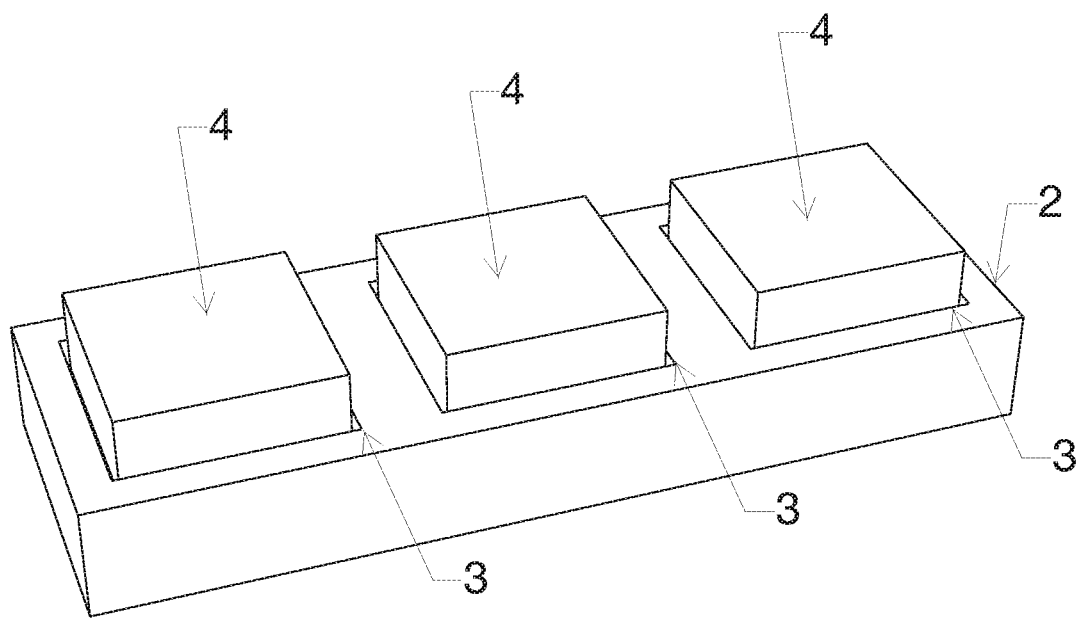
FIG. 162 shows a tray and unit markers of an example magnetic building set.
Figure 163:
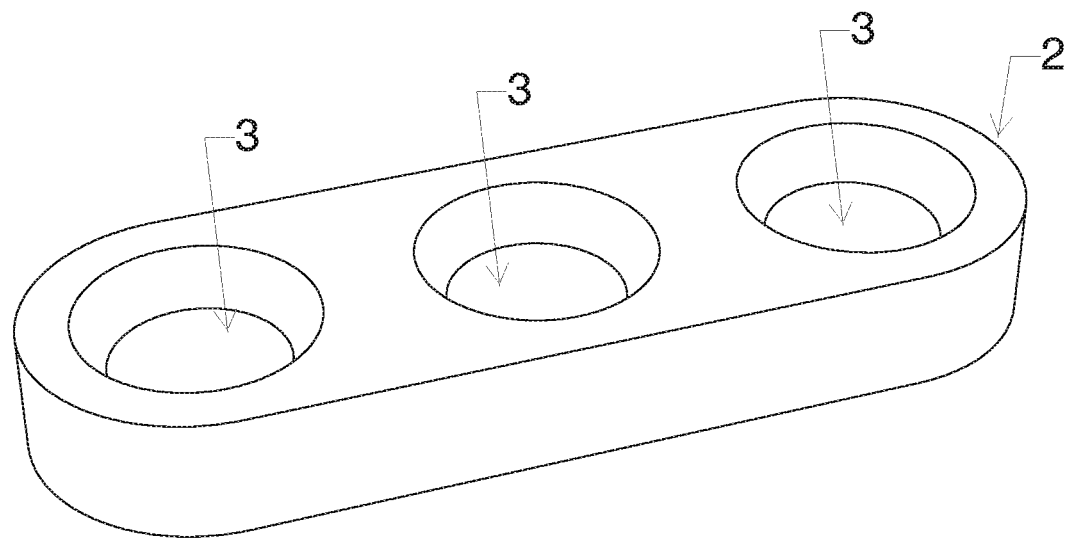
FIG. 163 shows a tray of an example magnetic building set.

With assistance from a teacher, a student may play an example word game called "Vocabulary Challenge—Same Beginning." In an example game, a student is challenged to create as many words as possible that all begin with the same consonant group. To begin an example game, the teacher may select a first tray 2, insert letter markers 34 into the slots 3 to form a common word beginning such as "TR" and place the first tray 2 on a work surface. The teacher may also place on the work surface and adjacent to the game tray 2 a quantity of letter markers 34 as shown in FIG. 154. The teacher then challenges the student to model as many words as they can that beginning with the letters "TR." The student may select a second tray 2 and place it adjacent to and in a co-linear relationship with the first tray 2. The student may then select letter markers 34 from the work surface and insert them into the slots 3 in the second tray 2 to model a word. After the student has modeled a word correctly, the teacher may record the word modeled. The student may either employ the previously selected second tray and remove the letter markers 34 therein or remove the second tray 2 and select a third tray 2 of a different unit length than the second tray 2. In either case, the student repeats the process. The student selects letter markers, inserts them into the tray slots and models a new word. FIG. 155 and FIG. 156 each show an example modeled word.

Other examples of the building system are also contemplated, which may include but are not limited to cards with other operators or symbols such as greater than, less than, or logic operators such as AND, OR, XOR, and NOT. Also contemplated are trays with other example profiles, trays with indents only on a single side, other example marker and tray indent shapes such as squares solids and spheres, trays that are not stackable and trays whose profiles lack the lateral interlocking feature as disclosed hereinabove. These and other examples will be readily understood by those having ordinary skill in the art after becoming familiar with the teachings herein.

In still other examples of the building system, the magnets and/or magnets/magnetic material may be substituted with other removable attachments, such as hook-and-loop fasteners. In an example implementing hook-and-loop fasteners, a smaller area of hook material may be provided on the "weak" side of the marker and a larger area of hook materials on the "strong" side of the marker. The tray indents may be provided with a consistent area of loop material. A first tray, may pull out markers from a second tray of the "strong" side of the marker with the larger hook material area is facing up. Any other suitable attachment mechanism now known or later developed may also be employed. Indeed, in other examples, the attachment mechanism may be omitted entirely.

It is noted that the examples shown and described are provided for purposes of illustration and are not intended to be limiting. Still other examples are also contemplated.

The invention claimed is:

1. A magnetic building set, comprising:
a plurality of trays, each having at least one indent on a first surface of each of the plurality of trays, and at least one indent on a second surface of each of the plurality of trays;
a plurality of unit markers for positioning in the indents on the first and second surfaces of each of the plurality of trays;
a magnetic connection for attaching the plurality of unit markers to the first and second surfaces of each of the plurality of trays, wherein one of the unit markers fitted into in an indent on the first surface of a first of the plurality of trays also fits into an indent on the second surface of a second of the plurality of trays;
indicia on at least one of the unit markers including at least one of numbers, letters, and pictures of objects;
indicia on at least one of the indents including numbers, letters, or pictures of objects;
wherein the magnetic building set is configurable in various exercises and games to teach at least one of numeracy, elementary arithmetic, and spelling;
ten-frame trays having ten indents on an upper surface and ten indents on a lower surface;
place value trays having indents and indicia indicating the number of ones, tens, hundreds, thousands, present in a given number;
solution trays having indents and indicia indicating the number of ones, tens, hundreds, and thousands present in a given number;
fractional value trays having indents and indicia indicating the number of fractional values present in a given number;
fractional value markers having indicia representing a given fractional value;
asymmetrical placement of the magnets such that the attractive or repulsive force between one or more indents within a tray and one or more unit markers placed within the indents depends on the orientation of either or both of the unit marker and the tray; and
one or more game boards, each having a plurality of protrusions for receiving the indents of the trays, ten-frame trays, place value trays, and fractional value trays.

2. The magnetic building set of claim 1, wherein the plurality of trays and the plurality of unit markers are arranged into a plurality of interlocking assemblies of trays and unit markers to form geometric shapes and structures, and wherein there is no physical limit to the number of trays or markers that can be incorporated into the geometric shapes and structures, such that the magnetic building set is employed to teach geometric shapes and basic structural design and assembly techniques.

3. The magnetic building set of claim 2, wherein the plurality of trays placed adjacent to one another on a work surface interlock to form lateral interlocking profiles and tessellated tray assemblies.

4. The magnetic building set of claim 1, wherein:
unit markers inserted into the indents on the first surface of the plurality of trays each represent a single unit, and the plurality of unit markers in a given tray represent a number equal to a quantity;
unit markers inserted into the indents on the second surface of the plurality of trays are not counted as part of the quantity; and
an assembly of trays and unit markers represents a specific numeric quantity for manipulating as a whole, while the unit markers therein are visible and can be viewed, manipulated, arranged and counted individually.

5. The magnetic building set of claim 1, wherein the plurality of trays are reversible, such that when a given tray is flipped over, the indents on the second surface become indents on the first surface, and vice-versa.

6. The magnetic building set of claim 1, further comprising:

a plurality of quantity cards printed with either or both of a numerical representation of a given value or a pictorial representation of the same value; and a plurality of operator cards, each printed on a first side with an operator symbol selected from a plus sign operator, a minus sign operator, a multiplication operator, a division operator, an equals sign, an inequality sign, a "greater than" sign, a "less than" sign, or a logic operator sign selected from AND, OR, XOR, and NOT, and optionally printed on a second side with a different operator symbol selected from the same group.

7. A method of teaching addition and subtraction using a magnetic building set, comprising:

providing a first tray containing unit markers representing a first quantity;

providing a second tray containing unit markers representing a second quantity;

providing a third tray filled with a number of unit markers representing a third quantity;

filling a plurality of adjacent trays by placing unit markers in first-facing indents of the trays to model the dividend component of a division operation, thus forming a dividend tray assembly;

forming a first divisor tray having a first side and a second side;

stacking the first divisor tray onto the unit markers within the first-facing indents of the dividend tray assembly such that the unit markers also rest in second-facing indents on the second side of the first divisor tray;

counting a quantity of unit markers within the dividend tray assembly that are fully visible and not covered by the first divisor tray;

wherein if the quantity of unit markers counted is greater than or equal to the quantity represented by the first divisor tray, a second divisor tray identical to the first divisor tray is assembled and stacked onto the unit markers within the dividend tray assembly adjacent the first divisor tray; and stacking at least the second divisor tray until no more divisor trays can be stacked on the unit markers within the dividend tray assembly.

8. The method of claim 7, wherein the third quantity is equal to either the sum of the first and second quantities, or the first quantity minus the second quantity, the third quantity representing the solution to an addition or subtraction operation.

9. The method of claim 7, wherein the first filled tray contains unit markers to model a factor in a multiplication operation.

10. The method of claim 9, further comprising:

providing a number of additional filled trays containing unit markers such that each additional filled tray is identical to the first filled tray, and such that the total number of additional filled trays, plus the first filled tray, is equal to the quantity by which the factor is to be multiplied; and wherein a sum of the total number of unit markers in the first tray and all additional trays represent the solution to the multiplication operation.

11. The method of claim 7, further comprising a total quantity of divisor trays stacked on the dividend tray assembly is the quotient and thereby the solution to the division operation exercise, wherein if any unit markers remain uncovered by the quantity of divisor trays, then the uncovered unit markers represent the remainder of the division operation exercise.

12. The method of claim 7, wherein students are instructed to manipulate trays and unit markers in various exercises in order to read and compose different words.

13. The method of claim 12, wherein students are instructed to manipulate the plurality of trays and unit markers into specific geometric shapes or structures.

14. A method of teaching numeracy and interpretation of story arithmetic problems using a magnetic building set, comprising:

stating an arithmetic story problem;

providing unit markers that include picture indicia selected to represent basic elements of the arithmetic story problem;

providing the unit markers in indents of one or more trays;

providing the trays onto one or more game boards such that the protrusions of the game board fit into indents of the trays;

and arranging the picture indicia to yield a visual solution to the arithmetic story problem.

15. A method of claim 14, further comprising:

selecting a first tray with a number of indents equal to a number to be squared;

filling the first tray completely with unit markers;

assembling additional filled trays identical to the first filled tray, such that the total number of additional filled trays, plus the first filled tray, is equal to the number to be squared; and counting the total number of unit markers in the first tray and all additional trays, the total number representing a solution to the arithmetic story problem.

16. The method of claim 15, further comprising modeling the arithmetic story problem.

17. The method of claim 14, further comprising providing trays and markers to be manipulated in a plurality of exercises to teach any of counting, number composition and decomposition, subitizing of quantities, arithmetic operations, place value, fractions, squaring of numbers, geometric shapes, arithmetic story problems, and spelling.

* * * * *